United States Patent
Lauer et al.

(10) Patent No.: US 12,434,782 B2
(45) Date of Patent: Oct. 7, 2025

(54) CONVEYING DEVICE, PROCESSING INSTALLATION, METHOD FOR CONVEYING AND/OR PROCESSING OBJECTS

(71) Applicant: Dürr Systems AG, Bietigheim-Bissingen (DE)

(72) Inventors: Michael Lauer, Bietigheim-Bissingen (DE); Dirk Bartsch, Bietigheim-Bissingen (DE); Peter Rempp, Eppingen (DE); Benny Frasch, Hemmingen (DE); Martin Weidle, Gerlingen (DE); Johannes Bayha, Winnenden (DE); Stefano Bell, Kornwestheim (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 798 days.

(21) Appl. No.: 17/421,574

(22) PCT Filed: Nov. 25, 2019

(86) PCT No.: PCT/EP2019/082394
§ 371 (c)(1),
(2) Date: Jul. 8, 2021

(87) PCT Pub. No.: WO2020/143950
PCT Pub. Date: Jul. 16, 2020

(65) Prior Publication Data
US 2022/0081048 A1   Mar. 17, 2022

(30) Foreign Application Priority Data

Jan. 11, 2019 (DE) .......................... 102019200307.9
Jan. 11, 2019 (DE) .......................... 102019200308.7
(Continued)

(51) Int. Cl.
B62D 65/18 (2006.01)
B61B 5/02 (2006.01)
(Continued)

(52) U.S. Cl.
CPC .............. B62D 65/18 (2013.01); B61B 5/025 (2013.01); B62D 53/005 (2013.01); B65G 35/06 (2013.01);
(Continued)

(58) Field of Classification Search
CPC ...... B65D 65/18; B62D 53/005; B62D 65/18; B62D 63/02; B62D 63/04; B65G 35/06;
(Continued)

(56) References Cited

U.S. PATENT DOCUMENTS 376,984 A * 1/1888 Goebel .................. B61B 13/10
                                                    104/161
3,930,277 A   1/1976 Wulff
(Continued)

FOREIGN PATENT DOCUMENTS

AU   2014338685 B2   6/2017
AU   2014338686 B2   12/2019
(Continued)

OTHER PUBLICATIONS

United States Patent and Trademark Office, "Non-Final Office Action," issued in connection with U.S. Appl. No. 17/421,651, Aug. 24, 2023, 11 pages.
(Continued)

*Primary Examiner* — Zachary L Kuhfuss
(74) *Attorney, Agent, or Firm* — Hanley, Flight & Zimmerman, LLC

(57) ABSTRACT

The present invention relates to a conveying device for conveying objects, in particular workpieces. Here, it is provided for the conveying device to comprise a partitioning
(Continued)

floor that has a penetration region, in particular a penetration slot, through which one or more receiving elements extend and/or are guidable for the purpose of receiving at least one object.

15 Claims, 35 Drawing Sheets

(30) Foreign Application Priority Data

| Jan. 11, 2019 | (DE) | .................. | 102019200310.9 |
|---|---|---|---|
| Jan. 11, 2019 | (DE) | .................. | 102019200311.7 |
| Jan. 11, 2019 | (DE) | .................. | 202019100145.3 |
| May 9, 2019 | (DE) | .................. | 102019206729.8 |

(51) Int. Cl.

| B62D 53/00 | (2006.01) |
|---|---|
| B65G 35/06 | (2006.01) |
| B65G 43/00 | (2006.01) |
| B65G 47/00 | (2006.01) |
| B65G 47/52 | (2006.01) |
| B65G 67/02 | (2006.01) |
| B65G 69/28 | (2006.01) |

(52) U.S. Cl.
CPC ............ *B65G 43/00* (2013.01); *B65G 47/00* (2013.01); *B65G 47/52* (2013.01); *B65G 67/02* (2013.01); *B65G 69/2876* (2013.01); *B65G 2201/0294* (2013.01); *B65G 2203/0233* (2013.01); *B65G 2203/042* (2013.01); *B65G 2207/40* (2013.01); *B65G 2814/03* (2013.01)

(58) Field of Classification Search
CPC ........ B65G 43/00; B65G 47/00; B65G 47/52; B65G 67/02; B65G 69/2876; B65G 2201/0294; B65G 2203/0233; B65G 2203/042; B65G 2207/40; B65G 2814/03; Y02T 10/70; Y02T 10/7072; Y02T 90/14; B60L 53/16; B60L 2200/36; B60S 1/62; B61B 5/025
USPC .................................. 104/108, 140, 161, 139
See application file for complete search history.

(56) References Cited

U.S. PATENT DOCUMENTS

| 4,137,984 | A |   | 2/1979 | Jennings et al. |
|---|---|---|---|---|
| 4,658,732 | A | * | 4/1987 | Coester ................. B61B 13/122 |
|   |   |   |   | 104/156 |
| 4,811,685 | A | * | 3/1989 | Murai ..................... B61B 10/04 |
|   |   |   |   | 104/140 |
| 5,014,625 | A |   | 5/1991 | Murai |
| 5,845,582 | A | * | 12/1998 | Coester ................. B61B 13/122 |
|   |   |   |   | 104/156 |
| 6,324,992 | B1 |   | 12/2001 | Morikiyo |
| 6,494,142 | B2 |   | 12/2002 | Masugaki |
| 6,494,304 | B1 |   | 12/2002 | Jaynes et al. |
| 8,406,950 | B2 |   | 3/2013 | Erb et al. |
| 8,496,103 | B2 |   | 7/2013 | Federmann |
| 8,700,205 | B2 |   | 4/2014 | Scheuerman et al. |
| 8,933,593 | B2 |   | 1/2015 | Haberer et al. |
| 9,014,902 | B1 |   | 4/2015 | Murphy |
| 10,232,899 | B1 |   | 3/2019 | Gatta et al. |
| 10,780,930 | B1 |   | 9/2020 | Kentley-Klay et al. |
| 10,864,637 | B2 |   | 12/2020 | Magnanimo et al. |
| 10,957,202 | B2 |   | 3/2021 | Lewandowski et al. |
| 10,960,939 | B1 |   | 3/2021 | Kentley-Klay et al. |
| 11,199,853 | B1 |   | 12/2021 | Afrouzi |
| 11,364,962 | B2 |   | 6/2022 | Von Krauland |
| 12,006,147 | B2 |   | 6/2024 | Becker |
| 12,128,554 | B2 |   | 10/2024 | Bangalore Srinivas |
| 12,180,003 | B2 |   | 12/2024 | Austrheim |
| 2005/0232729 | A1 |   | 10/2005 | Dehne |
| 2007/0189650 | A1 |   | 8/2007 | Moeller |
| 2008/0000069 | A1 |   | 1/2008 | Savoy |
| 2008/0071429 | A1 |   | 3/2008 | Kraimer et al. |
| 2011/0067979 | A1 |   | 3/2011 | Assmann |
| 2012/0205175 | A1 |   | 8/2012 | Masserang et al. |
| 2014/0114526 | A1 |   | 4/2014 | Erb |
| 2014/0186147 | A1 |   | 7/2014 | Song et al. |
| 2015/0128397 | A1 |   | 5/2015 | Kozasa et al. |
| 2016/0214668 | A1 |   | 7/2016 | Ogawa et al. |
| 2016/0376136 | A1 |   | 12/2016 | Miller et al. |
| 2018/0120028 | A1 |   | 5/2018 | Robbin |
| 2018/0142488 | A1 |   | 5/2018 | Boussard et al. |
| 2019/0169007 | A1 |   | 6/2019 | Standard et al. |
| 2019/0225436 | A1 |   | 7/2019 | Lindbo |
| 2020/0109038 | A1 |   | 4/2020 | Nagasawa |
| 2020/0216130 | A1 |   | 7/2020 | Von Krauland |
| 2020/0339350 | A1 |   | 10/2020 | Dooley et al. |
| 2020/0346864 | A1 |   | 11/2020 | Fjeldheim |
| 2022/0073156 | A1 |   | 3/2022 | Lauer et al. |
| 2022/0161879 | A1 |   | 5/2022 | Lauer et al. |
| 2022/0177061 | A1 |   | 6/2022 | Lauer et al. |

FOREIGN PATENT DOCUMENTS

| CN | 1469980 A | 1/2004 |
|---|---|---|
| CN | 1933935 A | 3/2007 |
| CN | 102239455 A | 11/2011 |
| CN | 103303642 A | 9/2013 |
| CN | 103538649 | 1/2014 |
| CN | 203888927 U | 10/2014 |
| CN | 104508724 A | 4/2015 |
| CN | 104993218 A | 10/2015 |
| CN | 204713237 U | 10/2015 |
| CN | 105813934 A | 7/2016 |
| CN | 105874482 A | 8/2016 |
| CN | 106413982 A | 2/2017 |
| CN | 108149989 A | 6/2018 |
| CN | 108361231 A | 8/2018 |
| CN | 109131279 A | 1/2019 |
| CN | 113302111 A | 8/2021 |
| CN | 113302118 A | 8/2021 |
| DE | 202005004466 U1 | 9/2005 |
| DE | 102004047209 A1 | 3/2006 |
| DE | 60302802 | 8/2006 |
| DE | 10 2010 045 010 A1 | 3/2012 |
| DE | 102011085019 A1 | 4/2012 |
| DE | 102011109597 | 2/2013 |
| DE | 10 2013 000 569 A1 | 7/2014 |
| DE | 102013113729 | 6/2015 |
| DE | 10 2015 003 213 A1 | 8/2015 |
| DE | 112015000150 | 5/2016 |
| DE | 20 2015 100 782 U1 | 6/2016 |
| DE | 102015006098 | 11/2016 |
| DE | 102015220495 A1 | 4/2017 |
| DE | 10 2016 014 882 A1 | 6/2017 |
| DE | 20 2016 102 149 U1 | 8/2017 |
| DE | 20 2016 102 752 U1 | 10/2017 |
| DE | 102016113312 A1 | 1/2018 |
| DE | 10 2017 103 931 A1 | 8/2018 |
| DE | 20 2017 102 155 A1 | 8/2018 |
| DE | 102017113343 | 12/2018 |
| EP | 2339376 A1 | 6/2011 |
| EP | 2386876 A1 | 11/2011 |
| EP | 2722687 A1 | 4/2014 |
| EP | 2889713 A2 | 7/2015 |
| EP | 3410248 A1 | 12/2018 |
| EP | 3704001 B1 | 11/2022 |
| JP | S5893682 A | 6/1983 |
| JP | H06-059731 A | 3/1994 |
| JP | H06335655 A | 12/1994 |
| JP | H11188302 | 7/1999 |
| JP | H11 240608 A | 9/1999 |
| JP | 2000043769 A | 2/2000 |
| JP | 2003233423 A | 8/2003 |
| JP | 2004256021 A | 9/2004 |
| JP | 2010156333 A | 7/2010 |

(56) References Cited

FOREIGN PATENT DOCUMENTS

| | | |
|---|---|---|
| JP | 2010194447 A | 9/2010 |
| JP | 2012025306 | 2/2012 |
| JP | 2012058792 A | 3/2012 |
| JP | 2014076720 A | 5/2014 |
| JP | 2014510661 A | 5/2014 |
| JP | 2015159742 A | 9/2015 |
| JP | 2016007679 A | 1/2016 |
| JP | 5851524 B2 | 2/2016 |
| JP | 2018024415 A | 2/2018 |
| JP | 2018523086 A | 8/2018 |
| JP | 2019026002 A | 2/2019 |
| JP | 2020524109 A | 8/2020 |
| KR | 101496902 | 3/2015 |
| KR | 1020180004177 A | 1/2018 |
| WO | 2011/053681 A1 | 5/2011 |
| WO | 2013168706 A1 | 11/2013 |
| WO | 2015121818 A2 | 8/2015 |
| WO | 2016112932 A1 | 7/2016 |
| WO | 2018234105 A1 | 12/2018 |
| WO | 2020143947 | 7/2020 |
| WO | 2020143949 | 7/2020 |
| WO | 2020143950 | 7/2020 |
| WO | 2020143951 | 7/2020 |

OTHER PUBLICATIONS

Japan Patent Office, "Search Report by Registered Search Organization," issued in connection with Japanese Patent Application No. 2021538472, dated Jun. 6, 2023, 35 pages. [English Translation Included].

Japan Patent Office, "Search Report by Registered Search Organization," issued in connection with Japanese Patent Application No. 2021538266, dated Jun. 12, 2023, 19 pages. [English Translation Included].

Japan Patent Office, "Search Report by Registered Search Organization," issued in connection with Japanese Patent Application No. 2021538697, dated Jun. 16, 2023, 26 pages. [English Translation Included].

Japan Patent Office, "Search Report by Registered Search Organization," issued in connection with Japanese Patent Application No. 2021538030, dated Jun. 19, 2023, 22 pages. [English Translation Included].

Japan Patent Office, "Notice of Reasons for Refusal," issued in connection with Japanese Patent Application No. 2021538697, dated Dec. 7, 2023, 14 pages. [English Translation Included].

Japan Patent Office, "Decision of Refusal," issued in connection with Japanese Patent Application No. 2021-538472, mailed Nov. 7, 2023, 4 pages, with English translation.

International Searching Authority, "International Search Report", issued in connection with International Application No. PCT/EP2019/082388, mailed Mar. 12, 2020, 5 pages.

International Searching Authority, "Written Opinion", issued in connection with International Application No. PCT/EP2019/082388, dated Mar. 12, 2020, 18 pages.

International Searching Authority, "International Search Report", issued in connection with International Application No. PCT/EP2019/082392, mailed Mar. 12, 2020, 6 pages.

International Searching Authority, "Written Opinion", issued in connection with International Application No. PCT/EP2019/082392, dated Mar. 12, 2020, 23 pages.

International Searching Authority, "International Search Report," issued in connection with International Application Application No. PCT/EP2019/082394, mailed Mar. 12, 2020, 5 pages.

International Searching Authority, "Written Opinion", issued in connection with International Application No. PCT/EP2019/082394, dated Mar. 12, 2020, 15 pages.

International Searching Authority, "International Search Report," issued in connection with International Application Application No. PCT/EP2019/082395, mailed Mar. 12, 2020, 6 pages.

International Searching Authority, "Written Opinion," issued in connection with International Application Application No. PCT/EP2019/082395, dated Mar. 12, 2020, 15 pages.

United States Patent and Trademark Office, "Final Office Action," issued in connection with U.S. Appl. No. 17/421,651, Apr. 5, 2024, 11 pages.

United States Patent and Trademark Office, "Non-Final Office Action," issued in connection with U.S. Appl. No. 17/421,675, Jun. 5, 2024, 10 pages.

The State Intellectual Property Office of People's Republic of China, "First Office Action," issued in connection with Chinese Patent Application No. 202110892279.9, dated Mar. 27, 2024, 15 pages. [English Translation Included].

The State Intellectual Property Office of People's Republic of China, "First Office Action," issued in connection with Chinese Patent Application No. 202110890385.3, dated Mar. 28, 2024, 13 pages. [English Translation Included].

The State Intellectual Property Office of People's Republic of China, "First Office Action," issued in connection with Chinese Patent Application No. 202110892393.1, dated Mar. 28, 2024, 12 pages. [English Translation Included].

The State Intellectual Property Office of People's Republic of China, "First Office Action," issued in connection with Chinese Patent Application No. 202110890710.6, dated Mar. 28, 2024, 11 pages. [English Translation Included].

The State Intellectual Property Office of People's Republic of China, "First Office Action," issued in connection with Chinese Patent Application No. 202110890463.X, dated Mar. 29, 2024, 14 pages. [English Translation Included].

Automated Guided Vehicle Systems, VDI 2510, Oct. 2005, 40 pages, Verein Deutscher Ingenieure, Düsseldorf, Germany.

Youtube, Clever Autonomy for Mobile Robots—KUKA Navigation Solution, May 26, 2016, 1 page.

Youtube, KMP 1500—Intelligent & Autonomus Mobile Platform, Sep. 13, 2017, 7 pages.

European Patent Office, "Notification of an Objection," issued in connection with European Patent Application No. 19809066.4, dated Jun. 4, 2024, 66 pages. [Machine English Translation Included].

European Patent Office, "Notification of an Objection," issued in connection with European Patent Application No. 19809066.4, dated Jun. 7, 2024, 78 pages. [Machine English Translation Included].

Günter Ullrich, "Fahrerlose Transportsysteme: Eine Fibel—mit Praxisanwendungen—zur Technik—für die Planung," Springer Vieweg, 2nd Edition, 2014, 502 pages. [Machine English Translation Included].

SICK AG, "S300 Sicherheits-Laserscanner: Betriebsanleitung," SICK AG, 8010947/XK33, Oct. 7, 2013, 312 pages. [Machine English Translation Included].

SICK AG, "S3000 Safety Laser Scanner: Operating Instructions," SICK AG, 8009942/TL59, Jan. 29, 2010, 148 pages.

SICK AG, "Industrial Safety Systems: Sicherheits-Laserscanner für mehr Dynamik und Effizienz," SICK AG, 8010738/04-06 MRH, 48 pages. [Machine English Translation Included].

SICK Sensor Intelligence, "Monitoring automated guided vehicles (AGB)—with Safe Motion Control from SICK | SICK AG," YouTube, [https://www.youtube.com/watch7vnRw7D5trwza8], Aug. 30, 2016, 1 page.

United States Patent and Trademark Office, "Non-Final Office Action," issued in connection with U.S. Appl. No. 17/421,651, Aug. 14, 2024, 12 pages.

United States Patent and Trademark Office, "Non-Final Office Action," issued in connection with U.S. Appl. No. 17/421,579, Dec. 4, 2024, 10 pages.

United States Patent and Trademark Office, "Notice of Allowance and Fee(s) Due," issued in connection with U.S. Appl. No. 17/421,675, dated Sep. 20, 2024, 8 pages.

United States Patent and Trademark Office, "Notice of Allowability," issued in connection with U.S. Appl. No. 17/421,675, dated Sep. 27, 2024, 5 pages.

United States Patent and Trademark Office, "Final Office Action," issued in connection with U.S. Appl. No. 17/421,651, dated Feb. 25, 2025, 12 pages.

(56) References Cited

OTHER PUBLICATIONS

United States Patent and Trademark Office, "Notice of Allowance and Fee(s) Due," issued in connection with U.S. Appl. No. 17/421,579, dated Mar. 18, 2025, 8 pages.

United States Patent and Trademark Office, "Notice of Allowance and Fee(s) Due," issued in connection with U.S. Appl. No. 17/421,651, dated May 14, 2025, 8 pages.

United States Patent and Trademark Office, "Corrected Notice of Allowability," issued in connection with U.S. Appl. No. 17/421,579, dated Jul. 25, 2025, 7 pages.

Japan Patent Office, "Notice of Reasons for Refusal," issued in connection with Japanese Patent Application No. 2021538472, dated Jun. 30, 2025, 10 pages. [English machine translation included.].

Malaysian Patent Office, "Substantive Examination Adverse Report and Examiner's Report to the Registrar Under Section 30(1) / 30(2)," issued in connection with Malaysian Patent Application No. PI2021003474, issued Aug. 22, 2025, 4 pages.

\* cited by examiner

CONVEYING DEVICE, PROCESSING INSTALLATION, METHOD FOR CONVEYING AND/OR PROCESSING OBJECTS

RELATED APPLICATION

This application is a National Phase of international application No. PCT/EP2019/082394 filed on Nov. 25, 2019, and claims the benefit of German applications No. 10 2019 200 311.7 filed on Jan. 11, 2019, No. 20 2019 100 145.3 filed on Jan. 11, 2019, No. 10 2019 200 308.7 filed on Jan. 11, 2019, No. 10 2019 200 310.9 filed on Jan. 11, 2019, No. 10 2019 200 307.9 filed on Jan. 11, 2019 and No. 10 2019 206 729.8 filed on May 9, 2019 which are incorporated herein by reference in their entirety and for all purposes.

FIELD OF DISCLOSURE

The present invention relates to a vehicle, which may be used in particular as a constituent part of a conveying device in a processing installation. Further, the present invention relates to methods for conveying and/or processing objects.

BACKGROUND

In processing installations, for example painting installations, in particular roller conveyors, chain conveyors or overhead conveyors may be used for transporting workpieces that are to be painted.

SUMMARY OF THE INVENTION

The object of the present invention is to provide a vehicle and/or a conveying device by means of which objects that are to be transported can be transported simply and flexibly.

According to the invention, this object is achieved by the features of Claim 1.

A vehicle is preferably suitable for conveying objects, in particular vehicle bodies.

Preferably, the vehicle comprises the following:
a base body;
a chassis, by means of which the base body lies and/or is movable on a vehicle-accessible subsurface;
a drive device for driving the vehicle;
a receiving device, which comprises one receiving element, two receiving elements or more than two receiving elements, for receiving at least one object.

The vehicle-accessible subsurface is in particular a floor, for example a solid floor, in particular a factory floor.

The vehicle-accessible subsurface is in particular formed from concrete or asphalt or metal, or comprises concrete, asphalt and/or metal.

The vehicle in particular takes a self-guided and/or autonomous form.

Preferably, the vehicle operates at floor level.

Preferably, the vehicle is controllable automatically and/or is guided or guidable without contact.

It may be provided for the receiving device to comprise exactly two receiving elements.

Preferably, exactly one object, in particular exactly one vehicle body, is receivable by means of the two receiving elements.

A plurality of receiving elements, in particular all of the receiving elements, preferably extend in a common plane that runs in particular vertically and/or parallel to a longitudinal centre axis of the vehicle.

A plurality of receiving elements, in particular all of the receiving elements, preferably extend in a vertical longitudinal centre plane of the vehicle.

In particular, centre axes or longitudinal axes of the individual receiving elements lie in a common plane, in particular a vertical longitudinal centre plane.

Longitudinal axes or centre axes of a plurality of receiving elements, in particular all of the receiving elements, are preferably oriented parallel to one another and/or parallel to the direction of gravity, at least in a condition of the vehicle in which it is arranged on a substantially horizontal vehicle-accessible subsurface.

It may be advantageous if the longitudinal centre axis of the vehicle defines a main direction of travel of the vehicle or two main directions of travel of the vehicle.

One or more receiving elements, in particular all of the receiving elements, are preferably the only elements that project upwards from the base body of the vehicle.

Preferably, one or more receiving elements, in particular all of the receiving elements, as sole components of the vehicle, project above the base body by more than approximately 5% or by more than approximately 10% of a height of a base body.

It may be provided for the one receiving element, the two receiving elements or the more than two receiving elements to be arranged movably on the base body.

In particular, the one receiving element, the two receiving elements or the more than two receiving elements are arranged movably on the base body parallel to the direction of gravity.

In this description, the direction of gravity is in general a vertical direction that is oriented substantially perpendicularly to a vehicle-accessible subsurface on which the vehicle is configured to travel.

As an alternative or in addition, it may be provided for one receiving element, two receiving elements or more than two receiving elements to be connected immovably to the base body.

Moreover, it may be provided for all of the receiving elements to be arranged movably on the base body. As an alternative, it may be provided for all of the receiving elements to be arranged immovably on the base body.

Preferably, the vehicle comprises a lifting drive device by means of which the one receiving element, the two receiving elements or the more than two receiving elements are raisable and/or lowerable in relation to the base body.

In particular, by means of the lifting drive device the one receiving element, the two receiving elements or the more than two receiving elements are configured to be extended from and/or retracted into the base body.

Here, the terms "extend" and "retract" need not necessarily be understood to mean coming completely out or being lowered completely inside. Rather, it is also possible for a portion of a receiving element that projects out of the base body to be lengthened or shortened.

It may be favourable if the vehicle comprises a scraping device which is configured to scrape off contaminants adhering to one or more receiving elements as one or more receiving elements are retracted or lowered. As a result, an undesired contamination of an interior of the base body can preferably be avoided or at least reduced.

It may be favourable if a plurality of receiving elements, in particular all of the receiving elements, are coupled to one another and/or are only jointly movable in relation to the base body.

In particular, it may be provided for a plurality of receiving elements, in particular all of the receiving elements, only to be raisable at the same time and/or only to be lowerable at the same time.

It may be advantageous if a lifting drive device of the vehicle comprises a lifting drive element, wherein the lifting drive element preferably connects a lifting drive motor and two or more than two receiving elements to one another such that the two or the more than two receiving elements are jointly movable by means of the lifting drive motor.

A lifting drive element is in particular a lifting drive belt or a lifting drive chain.

By means of the lifting drive element, preferably the two or the more than two receiving elements are jointly raisable and/or lowerable in relation to the base body.

It may be favourable if the lifting drive element extends through a drive axis of the drive device for driving the vehicle.

As an alternative or in addition, it may be provided for the lifting drive element to extend through below a drive axis of the drive device for driving the vehicle.

Two or more than two receiving elements are preferably arranged on mutually opposite sides of a drive axis of the drive device.

In one embodiment of a receiving element, for example a lubricating device, in particular an integrated lubricating device, may be provided.

The lubricating device is preferably integrated into the receiving element, in particular into a shaft portion and/or a receiving portion of the receiving element, for example being arranged completely within the shaft portion and/or the receiving portion.

The lubricating device preferably comprises a reservoir for receiving lubricant, and a dispensing element for the controllable supply of lubricant from the reservoir to an object that is to be lubricated.

The object that is to be lubricated is in particular a part of a lifting drive device for raising and/or lowering the receiving element in relation to a foundation body on or in which the receiving element is arranged, in particular being displaceably mounted.

For example, it may be provided for the receiving element to be arranged such that it is displaceable on the foundation body by means of a spindle element, in particular being extendable out of the foundation body and/or retractable into the foundation body.

Preferably, the lubricating device takes a form such that the object that is to be lubricated, in particular the spindle element, is configured to have lubricant applied to it, in particular in order to ensure reliable lubrication thereof and thus a reliable lifting operation of the receiving element.

For this purpose, the dispensing element is in particular demand-controlled and/or time-controlled, for example by means of a timing element. For example, it may be provided for the dispensing element to be activated automatically after a predetermined number of lifting cycles of the receiving element, in order to ensure regular dispensing of lubricant to the object that is to be lubricated, in particular the spindle element.

The dispensing element may in particular be a valve, which is arranged on an underside of the reservoir and/or is directed towards the object that is to be lubricated, and which can be opened and closed as required.

The lubricating device, in particular the reservoir and/or the dispensing element, is preferably accessible, for example from above, through the receiving portion and/or by removing the receiving portion, in particular for replacement and/or topping up with further lubricant.

It may be favourable if the drive device has a drive axis that connects two drive elements, in particular drive wheels, of the drive device to one another. The drive axis is preferably oriented substantially transversely, in particular at least approximately perpendicularly, to a longitudinal centre axis and/or main direction of travel of the vehicle.

In particular, it may be provided for the vehicle to have precisely one drive axis.

It may be advantageous if the drive device has a drive axis that connects two drive elements, in particular drive wheels, of the drive device to one another, wherein the drive axis is arranged, with respect to a longitudinal centre axis and/or main direction of travel of the vehicle, at least approximately centrally on the base body of the vehicle.

The wording "at least approximately centrally" should in particular be understood to mean that one or more axes of rotation about which one or more drive elements, for example drive wheels, of the drive axis are rotatable are arranged by at most approximately 20% of a total longitudinal extent of the vehicle away from a horizontal transverse centre axis of the vehicle.

The drive elements, in particular the drive wheels, are preferably arranged at a spacing from one another that is greater than approximately 50%, in particular greater than approximately 70%, of a maximum width of the vehicle and/or the base body.

It may be favourable if one or more support rollers are arranged in each of four corner regions of the vehicle.

The support rollers are in particular non-driven support rollers.

Preferably, the support rollers are support rollers that are freely rotatable about 360° with respect to a substantially vertical axis of rotation.

It may be provided for the drive device to have a drive axis that connects two drive elements, in particular drive wheels, of the drive device to one another, wherein the drive elements are jointly mounted on the base body by means of the drive axis.

The drive axis comprises in particular an axis element that rigidly connects the drive wheels to one another.

The drive axis is thus in particular a rigid axis. Preferably, there is no independent suspension of wheels.

However, in an alternative embodiment, it is also possible for independent suspension of wheels to be provided. In that case, there is preferably provided a coupling device for mechanically coupling the drive elements, in particular the drive wheels, in particular in order to ensure that the drive elements, in particular the drive wheels, are pressed evenly against the vehicle-accessible subsurface.

A plurality of drive elements, in particular drive wheels, of the drive device are preferably drivable independently of one another.

In particular for this purpose, it may be provided for the vehicle to comprise a plurality of drive motors.

For example, in each a drive motor is associated with each drive element, in particular drive wheel.

A drive motor is in particular an electric motor.

It may be favourable if the drive device comprises a drive axis and/or one or more drive elements that are lowerable and/or pressable onto a floor and/or are raisable away from the floor by means of an actuation device.

The drive axis and/or one or more drive elements are preferably integrated into the base body of the vehicle and/or surrounded on five sides by the base body.

The actuation device is preferably accessible at an outer side of the vehicle, for the purpose of actuating it.

In particular, in this way there are preferably provided inaccessible and/or protected drive components of the drive device, wherein at the same time, for example by raising one or more drive elements away by means of the actuation device, the drive device is configured to be deactivated from an outer side of the vehicle, in particular so that the vehicle can be displaced manually in the event of failure of the drive device.

Further, by means of the actuation device, preferably a contact pressure of one or more drive elements, in particular drive wheels, on the vehicle-accessible subsurface is adjustable.

It may be favourable if there is provided an axis element that is mounted to rotate about an axis extending parallel to a longitudinal centre axis of the vehicle and that in particular firmly connects two drive elements, in particular drive wheels, to one another. The drive elements, in particular drive wheels, have axes of rotation that are preferably fixed in relation to one another and are in particular identical to one another.

The axis element is mounted such that it is rotatable or pivotal, in particular by means of a bearing element, on the base body of the vehicle. In particular, a height-variable and/or spring-loaded mounting of the bearing element on the base body is provided. By means of the actuation device, preferably a height of the axis element and/or the bearing element relative to the base body is adjustable.

The bearing element preferably takes substantially a U shape.

Preferably, the bearing element comprises a central part, at each end of which there is arranged a limb. By means of one limb, the bearing element is mounted to be preferably rotatable or pivotal on the base body.

A further limb of the bearing element preferably engages with a spring or is spring-loaded. In particular, the bearing element is movable such that it is resilient in relation to the base body.

The central part of the bearing element is preferably a bearing region on which the axis element is mounted to be rotatable or pivotal.

The U-shaped bearing element in particular surrounds an intermediate space through which there extends a lifting drive element of the lifting drive device.

It may be favourable if the intermediate space is the spatial region delimited by mutually opposing sides of the limbs of the bearing element.

It may be provided for the one receiving element, the two receiving elements or the more than two receiving elements each to have a receiving portion that tapers towards an upper end, as seen in relation to the direction of gravity.

In particular, it may be provided for one or more receiving portions, in particular all of the receiving portions, to take a form that is substantially conical, partially conical, frustoconical or partially frustoconical.

An engagement region, which takes a form that is complementary therewith at least in certain regions, of an object and/or an adapter device for receiving one or more objects can as a result make it possible to position an object on the vehicle in a particularly stable manner. In particular, the tapering configuration of the receiving portion can have the effect of preventing lateral tilting of the object. Even with only one or only two receiving elements, which in particular each take an only pin-shaped, peg-shaped or spike-like form, can stable receiving of an object on the vehicle preferably be made possible as a result.

In one embodiment of the invention, it may be provided for the one receiving element, the two receiving elements or the more than two receiving elements to be configured to be arranged in different locations in relation to the base body.

In this case, the one receiving element, the two receiving elements or the more than two receiving elements project, preferably in a location that is lowest with respect to the direction of gravity, beyond an upper side of the base body and/or out of the base body.

It may be provided for the one receiving element, the two receiving elements or the more than two receiving elements to have a height that, as seen parallel to the direction of gravity, is greater than a height of the base body of the vehicle as seen parallel to the direction of gravity.

One or more receiving elements are in particular formed in one piece or two pieces.

For example, one or more receiving elements each take the form of metal rods.

The one or more receiving elements each preferably comprise a shaft portion that is substantially cylindrical, preferably circle-cylindrical, and at the end of which a respective receiving portion is arranged.

The extent of one or more receiving elements in one or both directions running perpendicularly to the direction of gravity is preferably at most approximately 10%, preferably at most approximately 5%, of a longitudinal extent or transverse extent of the base body of the vehicle.

Here, preferably the base body is the part of the vehicle that forms or comprises a load-bearing structure of the vehicle, in particular a metal frame.

The base body preferably extends over at least approximately 80%, preferably at least approximately 90%, of a total length or total width of the vehicle.

It may be favourable if the vehicle comprises one or more receiving sensors by means of which an object arranged on at least one receiving element is detectable and/or its correct positioning is monitorable.

As an alternative or in addition, it may be provided for the vehicle to comprise one or more receiving sensors by means of which an orientation and/or a location of an object that is arranged at a spacing from the at least one receiving element are detectable.

In particular, by means of at least one receiving sensor an orientation and/or a location of the object are detectable before the at least one receiving element is raised or extended.

In this case, the object that is to be detected or monitored by means of the at least one receiving sensor is in particular an object that is to be conveyed, in particular a vehicle body, or indeed a combination of an object that is to be conveyed and an adapter device for receiving the object.

It may be advantageous if at least one receiving sensor is arranged on the base body.

In particular, it may be provided for two receiving sensors or more than two receiving sensors to be arranged, in a region of the base body that surrounds one or more receiving elements, on this same region.

By means of these one or more receiving sensors, it is possible in particular for an approach and/or a positioning and/or a presence of an object on the receiving element and/or in the region of the receiving element to be detected and/or monitored.

As an alternative or in addition, it may be provided for at least one receiving sensor to be arranged on the receiving element.

In particular, a plurality of receiving sensors may be arranged on a plurality of receiving elements.

In particular, receiving sensors that take the form of contact sensors may be provided.

Receiving sensors that are arranged on the base body are preferably receiving sensors that operate without contact.

At least one receiving sensor preferably interacts with a detection aid on an object that is received or is to be received.

In particular, an opening, for example a hole, in an adapter device may be provided for receiving an object. In that case, in particular this opening may be detected by means of a receiving sensor.

It may be favourable if a cover for covering an interior of the base body is arranged on an upper side of the base body.

The cover is preferably placed on the base body.

Preferably, the cover is arranged and/or takes a form that is at least approximately completely peripherally flush with a placement region of the base body.

For example, it may be provided for the cover to close at least approximately completely peripherally flush with a placement region of the base body.

An upper surface of the vehicle is thus preferably substantially completely planar, in particular if one or more projecting receiving elements are not taken into account.

Thus, the cover is preferably configured such that it cannot be gripped without using tools.

Preferably, the cover is only placed on, and thus is held preferably only by means of gravity and/or laterally clamped against the base body.

The cover covers preferably at least approximately 40%, for example at least approximately 60%, in particular at least approximately 80%, of an upper side of the vehicle, in particular the base body.

The cover is preferably formed in one piece or in multiple pieces. In particular, a plurality of cover elements corresponding to the cover described above are provided.

For example, the cover may be raised away from the base body by means of a suction-cup device.

It may be favourable if a cover for covering an interior of the base body is arranged on an upper side of the base body, wherein the cover preferably takes an at least partly transparent form.

The term "transparent" should in particular be understood to mean that a person can look through the cover and thus at least individual vehicle components that are in the interior of the base body are visible. As a result, there may be a higher inhibition threshold for stepping onto the vehicle, as a result of which a reduced load and/or reduced wear of the vehicle or its components may result.

The cover may for example be transparently tinted.

Preferably, the base body comprises one or more side faces that are for example sloping in form.

One or more side faces preferably extend obliquely, in particular at an angle of between approximately 30° and 70°, to the horizontal and/or vertical.

One or more emergency off switches are preferably arranged on the one or more side faces. As a result, the emergency off switches are particularly readily accessible, as a result of which safety during operation of the vehicle can be enhanced.

The term "emergency off" should in particular be understood to mean an emergency stop, for example the halting of movable and/or moving components, parts and/or vehicles, etc. Optionally, interruption of a power supply may further be provided with an emergency stop.

As an alternative or in addition, for this purpose it may be provided for one or more (further) emergency off switches to be arranged on a (further) vehicle or on one or more other components of a conveying device and/or a treatment installation and/or a logistics installation.

A treatment installation is in particular a processing installation.

Preferably, there is associated with one or more of the emergency off switches, in particular with each emergency off switch, a communication device, in particular a respective communication device. For example, one or more or all of the emergency off switches each comprise a communication device, wherein the communication device is configured to transmit in particular an emergency stop signal to one or more or all of the vehicles in order to put the one or more or all of the vehicles in an emergency stop mode.

In the emergency stop mode, the vehicle is stopped, preferably immediately, and/or moved out of a hazardous region. A braking action is preferably adjusted to a loading condition of the vehicle, in particular in order to avoid damage to an object—in particular a workpiece—arranged on the vehicle and/or to avoid its becoming detached from the workpiece.

It may be favourable if, by means of a communication device, in particular a communication device of an emergency off switch and/or a vehicle, in the event of actuating an emergency off switch an emergency stop signal is transmitted to one or more, in particular all, of the vehicles, in particular directly and/or indirectly by way of a higher-level control installation for controlling and/or monitoring a plurality of vehicles.

One or more, in particular all, of the vehicles preferably each comprise a control device which is configured to process an emergency stop signal, in particular before the vehicle is put in an emergency stop mode.

Preferably, it may be provided for a control device to be configured to check whether the respective vehicle absolutely must be put in the emergency stop mode or not. For example, this check can take account of the following: the location of the vehicle in relation to one or more other vehicles; and/or a spacing between the vehicle and one or more other vehicles; and/or the location of the vehicle in relation to the emergency off switch at which the emergency stop signal was triggered; and/or a spacing between the vehicle and the emergency off switch at which the emergency stop signal was triggered; and/or the speed of the vehicle at the moment of transmission and/or triggering of the emergency stop signal; and/or its predetermined and/or calculated movement path, in particular in relation to one or more other vehicles and/or in relation to the emergency off switch at which the emergency stop signal was triggered.

For example, the check can determine whether there is a risk to the respective vehicle and/or the object—in particular a workpiece—arranged thereon, and/or whether there is a risk from the vehicle and/or an object arranged thereon to one or more items and/or persons, wherein if the result is in the affirmative the vehicle is put in the emergency stop mode, and/or wherein if the result is in the negative the vehicle continues to be operated in a previously prevailing mode.

In particular, it may be provided for the check to determine whether the vehicle receiving an emergency signal is keeping a large enough spacing from other vehicles and/or other items and/or persons and/or the emergency off switch at which the emergency stop signal was triggered, and will keep it because of the predetermined and/or expected movement path. If the result is in the affirmative, the vehicle in particular continues to be operated in a previously prevailing mode. If the result is negative, the vehicle is in particular put in the emergency stop mode.

The vehicle preferably has a communication device by means of which the vehicle communicates or can communicate directly or indirectly, in particular by way of a higher-level control installation, with one or more further vehicles, for example for the purpose of transmitting an emergency stop signal and/or a location signal and/or a condition signal and/or a job signal.

For example, it may be provided for one or more vehicles, which are arranged for example in an area surrounding the vehicle of which the emergency off switch is or has been actuated, to receive the emergency stop signal and to stop as a consequence, in particular to be put in an emergency stop mode.

In this case, the surrounding area is for example a spatial region around an emitting device of a communication device for sending the emergency stop signal, wherein an extent of the spatial region results in particular from a signal strength and/or range of the emitting device. For example, an emitting device that takes the form of a short-range emitter may be provided, by means of which for example an emergency stop signal is transmissible over a distance of at most approximately 20 m, in particular at most approximately 10 m. In that case, only the vehicles in this spatial region receive the emergency stop signal and are consequently put in the emergency stop mode. The vehicles that are arranged outside this spatial region then remain in the previously prevailing operating modes.

As a short-range emitter, a Bluetooth low-energy emitter (BLE emitter) may for example be provided.

In a further embodiment, it may be provided for one or more (further) emergency off switches to be arranged on a vehicle or on one or more other components of a conveying device and/or treatment installation and/or logistics installation. Preferably, there is associated with one or more of the emergency off switches a communication device, for example one or more of the emergency off switches comprise a respective communication device, wherein the communication device is configured to transmit in particular an emergency stop signal to one or more vehicles in order to put the one or more vehicles in an emergency stop mode.

It may be favourable if one or more emergency off switches are configured to trigger different types of emergency stop mode scenario, wherein these different types of emergency stop mode scenario differ from one another for example
a) in respect of an extent or size or dimension of the surrounding area in which the vehicles are put in the emergency stop mode, and/or
b) in respect of the criteria for checking the respective vehicle by the control device, and/or
c) in respect of the targeted control of different groups of vehicles.

It may be advantageous if, depending on their respective location, the vehicles are associated with different regions or zones, wherein preferably there is associated with each region or zone a separate emergency stop mode scenario. It is then preferably possible, by actuating an emergency off switch in a particular region or zone or for a particular region or zone, to put in the emergency stop mode at least the vehicles, or precisely the vehicles, or only the vehicles that are associated with this region or zone. All of the other vehicles outside this region or zone would then preferably remain in a previously prevailing operating mode.

For associating the vehicles with the different regions or zones, it is possible to utilise in particular sensor elements for detecting the vehicles and/or sensor elements on the vehicles for detecting the surrounding area. In particular, location sensors of the vehicles or external light barriers, scanners or other detectors can be utilised.

The regions or zones are in particular treatment regions, for example treatment stations, and/or travel sections, in particular travel sections outside the treatment regions, and/or storage regions.

Preferably, location identification and/or location monitoring of one or more vehicles, in particular all of the vehicles, is performed over every conceivable movement path and/or stopping region of the vehicles. In particular, an uninterrupted and/or spatial and/or temporally continuous location identification and/or location monitoring is provided. This should in particular be understood to mean a repeat rate of the location identification and/or location monitoring of at least 1 per second, in particular at least 10 per second.

It may be favourable if the location of the one or more or all of the vehicles is identified and/or monitored continuously along at least one treatment region, in particular at least one treatment station.

In one embodiment of the invention, it may be provided for a vehicle that is put in an emergency stop mode to emit a signal to one or more further vehicles that are in the area surrounding the vehicle, wherein by means of the signal the one or more vehicles are put in particular in an alert condition in order for example to avoid colliding with the for example suddenly braking vehicle that has been put in the emergency stop mode. For this purpose, the one or more vehicles are braked in particular to a speed that is reduced by comparison with that before. As an alternative or in addition, it may be provided, in the alert condition, for the one or more vehicles to follow a movement path that deviates from the movement path originally provided, in particular in order to bypass a conceivable risk that has prompted actuation of the emergency off switch.

For the purpose of location identification and/or location monitoring of one or more vehicles, in particular all of the vehicles, it is possible for example to provide a locating aid that is integrated in, or arranged on or in, a floor on which the respective vehicle is configured to travel.

A locating aid is or comprises preferably at least one stationary element that is detectable by a detection device arranged on the vehicle, for example a sensor and/or camera, and wherein it is possible to infer the location of the vehicle by means of the stationary element, for example utilising knowledge of the exact location of the locating aid.

A locating aid may be for example an induction arrangement and/or a code strip, in particular a QR code strip.

Preferably, the locating aid extends along a movement path of one or more vehicles and has, along this movement path, location features that are unambiguously associable with a location, such that a location of the vehicle is unambiguously determinable in particular at any point along the movement path. In particular, the determination is performed by means of the control device of the respective vehicle and/or by means of a higher-level control installation, wherein there is a communication between the respective vehicle and the higher-level control installation preferably by way of a secure protocol.

In one embodiment, it may be provided for the vehicle to comprise a plurality of location sensors, which are arranged in particular at different points along a longitudinal centre axis of the vehicle and/or along a direction parallel to a longitudinal centre axis of the vehicle.

One or more location sensors serve in particular to detect one or more locating aids, in particular locating aids that are permanently arranged on a floor and/or integrated into the floor, for example one or more code strips, in particular QR code strips.

It may be favourable if a location is determined by means of a plurality of location sensors at mutually different points along a movement path of the vehicle at the same time.

It may be favourable if, of a plurality of in particular real location sensors, one or more virtual location sensors are calculated by means of the control device of the vehicle. In particular, a virtual location sensor can be calculated that is arranged exactly centrally in the vehicle with respect to a longitudinal direction of the vehicle and/or with respect to a transverse direction of the vehicle and of which preferably likewise calculated sensor values make it possible, because of the central arrangement, in particular to identify the location and/or orientation of the vehicle in an optimum manner.

A higher-level control installation preferably coordinates a plurality of vehicles, in particular all of the vehicles. In particular, by means of the higher-level control installation, information on the locations of the vehicle is usable to compensate safety-relevant deviations in location and/or speed that may in particular result in a hazardous situation, for example by adjusting the movement paths and/or operating parameters of one or more vehicles and/or by putting one or more vehicles in the emergency stop mode.

It may be advantageous if an upper side of the vehicle is arranged set back in relation to an underside of the vehicle. In particular, this allows sloping side faces to be produced in a simple manner. Moreover, this allows an optimised detection region to be produced for detecting a surrounding area by means of sensors (described below), in particular sensor elements of a sensor device.

It may be advantageous if the base body takes a substantially cuboid form, wherein two or four corner regions of the base body are each provided with an outwardly projecting sensor device of the vehicle.

One or more sensor devices preferably each have one or more sensor elements for detecting an area surrounding the vehicle. In a substantially horizontal plane the one or more sensor elements preferably each have, individually or jointly, a detection range of at least approximately 250°, in particular approximately 270°.

The one or more sensor devices are preferably coupled to a control device of the vehicle, wherein the control device preferably takes a form and is arranged such that, depending on sensor values that are detected and/or identified by means of the one or more sensor devices, the vehicle is operable in two, three or more than three different operating modes.

For example, it may be provided for one of the operating modes to be a normal mode, in which there are no unexpected and/or unknown and/or disruptive items arranged on a route or another predetermined region surrounding the vehicle.

As an alternative or in addition, for this purpose it may be provided for one of the operating modes to be a warning mode, in which one or more unexpected and/or unknown and/or disruptive items are arranged in a predefined warning section of a route or another predetermined region surrounding the vehicle.

Further, as an alternative or in addition, it may be provided for one of the operating modes to be a halt mode, in which one or more unexpected and/or unknown and/or disruptive items are arranged in a predefined halt section of a drive path and/or another predetermined region surrounding the vehicle.

A warning section and/or a halt section and/or the different surrounding regions for triggering a warning mode and/or halt mode are preferably produced by predetermined minimum and/or maximum spacings between the unexpected and/or unknown and/or disruptive items and the vehicle, wherein these minimum and/or maximum spacings are preferably variable depending on a current load on the vehicle and/or a current direction of travel and/or a current speed of travel, preferably by means of the control device.

Further, it may be provided for the vehicle to comprise one or more sensor devices by means of which a space surrounding the vehicle is detectable and/or monitorable together with a surrounding space and/or a spatial region of an object being transported by means of the vehicle.

In all embodiments of vehicles, preferably in each case one or more sensor devices of the vehicle are provided by means of which a respective area surrounding the vehicle is detectable.

By means of the one or more sensor devices, in particular a three-dimensional surrounding area—that is a three-dimensional surrounding region—is detectable, wherein the detection itself is preferably carried out in two dimensions or similarly in three dimensions, that is to say that items that are detected within the detected surrounding region are preferably detected with respect to their dimensions and location relative to the vehicle. In particular, the dimensions and location of the detected items are calculated by means of the control device of the vehicle from sensor data of the one or more sensor devices.

The surrounding region is preferably composed of a plurality of zones, or comprises a plurality of zones. The zones may either be overlapping in form, or cover spatial regions that are entirely different from one another.

Preferably, zones of the surrounding region that are different from one another are detectable by means of the one or more sensor devices.

Zones are divided up for example by the selection of boundary lines at different spacings from the vehicle. The surrounding region may be divided up for example into three zones for example in the horizontal direction.

An innermost zone, at the smallest spacing from the vehicle, in particular a zone directly adjoining the vehicle, is for example a protection zone.

This protection zone is preferably a region in which in particular for undisrupted operation no item other than the vehicle itself (and where appropriate the object) is permitted to be arranged. Preferably, in the event of detecting an item in this protection zone, the vehicle is put in a halt mode immediately and/or automatically.

The protection zone takes a ring-shaped form, in particular as seen in horizontal section.

A further zone, adjoining the protection zone, is for example a warning zone. The warning zone surrounds the protection zone, preferably in a ring shape, in particular in relation to a horizontal section through the vehicle, the protection zone and the warning zone.

The warning zone is in particular a region in which no item other than the vehicle itself should be arranged, wherein detection of an item does not yet necessarily result in triggering the halt mode. Rather, in the event of detecting an item in this warning zone, the vehicle is preferably put in the warning mode immediately and/or automatically.

Outside the warning zone there is in particular a free zone, which where required is detectable by the one or more sensor devices but which is not monitored for the presence of items, etc.

The items that are designated as items detected by the at least one sensor device are in particular items that, in an expected normal mode of the vehicle and/or a treatment installation, should not be at the detected location. However, the one or more sensor devices also detect items that are constituent parts of the conveying device and/or the treatment installation and of which the presence is necessary.

The control device of the vehicle and/or a higher-level control installation preferably carry out a check, in particular a calculation, of whether a detected item is an unexpected and/or unknown and/or disruptive item or an item of which the presence is acceptable.

Preferably, this check is performed before the vehicle is put in the warning mode or halt mode.

Depending on a current condition of the vehicle, in particular depending on whether the vehicle is loaded with an object or has no load, and/or depending on the current speed and the direction in which the vehicle is moving, preferably the boundary lines between the zones are varied. For example, at a relatively high speed of the vehicle, preferably the boundary lines in the region in front of the vehicle (with respect to the direction of travel) are shifted away from the vehicle, such that the zones—in particular the warning zone and/or the protection zone—are made larger in front of the vehicle.

In the event of travelling around a bend, for example curving and/or at least partial lateral shifting of the zones may be provided such that they cover as large a spatial region along the actual travel section (movement path) as possible, in particular in the region in front of the vehicle.

The region behind the vehicle (with respect to the direction of travel) usually need not be monitored as carefully, with the result that the parts of the zones—in particular the warning zone and/or the protection zone—that are behind the vehicle can be made smaller.

The control device of the vehicle and/or a higher-level control installation adjust the courses of the boundary lines and/or the dimensions and/or the shape of the zones—in particular the warning zone and/or the protection zone—in relation to the respectively current condition, preferably periodically, for example a plurality of times a minute or second.

As an alternative or in addition, it is in particular always possible to make an adjustment if the vehicle undergoes a change in condition, for example a change in direction, loading, unloading, acceleration, etc.

As a condition feature that in particular affects the courses of the boundary lines of the zones, there may further preferably be used the current location of the vehicle within the conveying device and/or treatment installation.

In particular, in respect of their dimensions and/or shapes the zones may be varied depending on the current location of the vehicle within the conveying device and/or treatment installation.

For example, when the vehicle is approaching a station and there is an expectation that parts of the station will come within the warning zone and/or the protection zone (or that the warning zone and/or the protection zone will extend into the parts of the station), it may be provided for the zones—in particular the warning zone and/or the protection zone—to be made smaller such that the parts of the station lie outside the warning zone and/or the protection zone.

In particular, if straight-ahead travel is expected in the station, a lateral detection of the surrounding area can be reduced or completely deactivated.

As an alternative or in addition, it may be provided as a vehicle approaches a station for a station mode to be activated, in which a maximum speed of the vehicle is reduced in order to compensate the increased risk potential that is the result of reducing monitoring of the surrounding area. Approach to a station may be determined for example by scanning a locating aid and/or by location sensors and/or proximity sensors.

In particular for the purpose of identifying the courses of the boundary lines and/or the dimensions and/or shape of the zones, the following may be used:

speed and direction of travel of the vehicle, in particular determined using a laser scanner and/or incremental encoder, preferably with software support;

Hall-effect sensor signals from one or more drive motors of the drive device.

Preferably, unified signals are calculated from these, in particular a speed of travel and a speed of rotation. If an optionally performed plausibility check gives values indicating inconsistency, then preferably an emergency stop is triggered (in particular, an emergency stop mode is initiated). If the plausibility check gives consistent values, then the courses of the boundary lines and/or the dimensions and/or shape of the zones are preferably identified from these values.

It may further be advantageous if, as an alternative or in addition to dividing up into zones in the horizontal direction, division into zones in the vertical direction is provided.

In particular, it may be provided for a zone within which the vehicle is arranged to be defined in the vertical direction. This zone is in particular a vehicle zone.

The vehicle zone extends in the vertical direction, in particular from the floor on which the vehicle is configured to travel as far as an upper side of the base body of the vehicle or an upper end of one or more receiving elements.

It is thus in particular possible, by detecting the spatial region of the surrounding region that forms or comprises the vehicle zone, to determine whether the vehicle is approaching further vehicles and/or whether the vehicle is itself at risk of colliding with an item.

A further zone in the vertical direction results from the dimensions of the object arranged on the vehicle. This zone, which covers the object, extends in the vertical direction in particular from an underside of the object (where appropriate including an adapter or skid or similar) and/or as far as an upper side of the object, preferably from a lowest point on the object (where appropriate including an adapter or skid or similar) and/or as far as a highest point on the object. In the present document, this zone is designated the object zone.

It may be provided for the object zone to directly adjoin the vehicle zone.

As an alternative, it may be provided for there to be arranged between the object zone and the vehicle zone an intermediate zone, which in particular extends from the upper side of the base body of the vehicle and/or as far as an underside of the object (where appropriate including an adapter or skid or similar), preferably as far as a lowest point on the object (where appropriate including an adapter or skid or similar).

Further, it may be provided for the intermediate zone to extend in the vertical direction at least approximately for the distance by which the one or more receiving elements project out of the base body of the vehicle.

It may be favourable if the zones that are divided up in the vertical direction are overlaid by the zones that are divided up in the horizontal direction, in particular in order, for the combination comprising the vehicle and the object, to enable optimum detection of the surrounding area and to avoid risk.

Preferably, there is associated with the vehicle zone a warning zone and/or a protection zone, such that in particular the question of whether the vehicle comes too close to further vehicles or other items is monitorable.

Further, it may be provided for there to be associated with the object zone a warning zone and/or a protection zone, such that in particular the question of whether the vehicle comes too close to further vehicles or other items is monitorable.

Moreover, it may be provided for there to be associated with the intermediate zone a warning zone and/or a protection zone, such that in particular the question of whether the vehicle comes too close to an item in the region of the one or more receiving elements is monitorable.

The spatial extent, in particular in the horizontal direction, and/or the shape of the warning zone associated with the vehicle zone and/or the protection zone associated with the vehicle zone depend in particular on whether the vehicle is loaded and/or where in the conveying device and/or treatment installation the vehicle is located.

The spatial extent, in particular in the horizontal direction, and/or the shape of the warning zone associated with the object zone and/or the protection zone associated with the object zone depend in particular on whether an object is arranged on the vehicle, the dimensions that this object itself has, and/or where in the conveying device and/or treatment installation the vehicle, together with the object arranged thereon, is located. In particular, if the vehicle has no load—that is to say if there is no object present—it may be provided for monitoring of the surrounding area in the region of the object zone to be completely deactivated.

The spatial extent, in particular in the horizontal direction, and/or the shape of the warning zone associated with the intermediate zone and/or the protection zone associated with the intermediate zone depend in particular on whether there is an object arranged on the vehicle, how far the one or more receiving elements project from the base body, and/or where in the conveying device and/or treatment installation the vehicle, where appropriate together with the object arranged thereon, is located. In particular, it may be provided for monitoring of the surrounding area to be deactivated in the region of the intermediate zone when the vehicle enters a station and/or passes through a station and at the same time the one or more receiving elements project into a partitioning floor or through a partitioning floor.

In one embodiment, it may be provided for each vehicle, autonomously and independently of the other vehicles, for example on the basis of monitoring of the surrounding area, to check and/or monitor the route or movement path that it has as a result of a job, in particular in order to avoid collisions.

In addition, it may further be provided for the vehicles to provide information to one another (directly or indirectly by way of the higher-level control installation) on the respective vehicle condition and/or the respective extents and/or shapes of the zones, in particular the warning zones, protection zones, vehicle zones, object zones and/or intermediate zones. As a result, it is possible for in particular planned overlaps in the zones, which can result for example if two vehicles pass one another closely in opposite directions, to be deliberately tolerated without triggering an unnecessary warning mode.

It may be favourable if an object zone and/or a warning zone and/or a protection zone is associated with one or more or all of the objects, in particular vehicle bodies, even if the respective object is not arranged on a vehicle. In particular, it is also possible to provide such division into zones in storage locations and/or parking locations.

Such an association between zones in particular enables a higher-level coordination of all of the objects, independently of the respective arrangement on a vehicle, as a result of which potential risks of collision between travelling objects (objects arranged on a vehicle) and parked objects (objects not arranged on a vehicle) can also preferably be minimised.

It may be favourable if a width of an opening in a station through which the vehicle for example enters a tunnel below a partitioning floor of the station corresponds to at least a maximum width of the vehicle, preferably at least approximately 105% of a width of the vehicle.

Depending on whether the vehicle is loaded with an object or has no load, it is then preferably possible for the control device to adjust monitoring of the surrounding area that triggers the normal mode and/or the warning mode and/or the halt mode. This can in particular prevent a warning mode or halt mode from being triggered because of an item located above the vehicle even though there is no object on the vehicle, so that the item does not present any obstacle to the vehicle.

In particular, this makes it possible to pass under and/or over bridges and/or return regions of reduced height clearance in normal mode, wherein at the same time there is monitoring to establish that there is no object for conveying arranged on the vehicle that would otherwise cause damage to the object or vehicle.

In the warning mode, a speed of travel of the vehicle is preferably reduced, in particular by comparison with normal mode. Further, in the warning mode a warning device of the vehicle is preferably configured to emit an acoustic warning signal and/or a visual warning signal.

Normal mode of the vehicle is in particular the operating mode of the vehicle in which it is operated in optimum and/or disruption-free operation of an installation comprising the one or more vehicles, in particular a conveying device and/or treatment installation.

Preferably, a higher-level control installation takes a form and is arranged such that individual or a plurality or all the features and/or functions that are included in and hence are connected with this description and the attached claims are performable, and/or such that individual or a plurality or all of the results that are included in and hence are connected with this description and the attached claims are obtainable.

Further, preferably individual or a plurality or all of the vehicles take a form and are arranged such that individual or a plurality or all the features and/or functions that are included in and hence are connected with this description and the attached claims are performable, and/or such that individual or a plurality or all of the results that are included in and hence are connected with this description and the attached claims are obtainable.

Preferably, the higher-level control installation and/or a control device of a vehicle can create a job that the vehicle has to carry out. A job may be for example a conveying job for transporting an object, and/or a charging job for charging up an energy store of the vehicle, and/or a relocating job for moving the vehicle to another predetermined location. Further, a job may be a maintenance job, in which the vehicle travels to a maintenance region, where maintenance is performed on the vehicle.

A job may be created for example automatically, in particular by means of a higher-level control installation. The higher-level control installation creates jobs in particular such that, by means of one or more vehicles, the objects are conveyed such that utilisation of the installations, in particular utilisation of the treatment installation, that is optimised as far as possible is obtainable.

The one or more vehicles preferably move autonomously as they perform automatically created jobs, wherein each vehicle preferably follows a movement path that is optimised with respect to travel time.

Further, it may be provided for jobs to be creatable manually for one or more vehicles. The jobs are creatable manually in the higher-level control installation, in particular by an operator or worker.

For a manually created job, in particular only partly autonomous travel of the respective vehicle is provided. In particular, it may be provided for only previously created movement paths, in particular manually created routes, to be selectable for a manually created job, and for the respective vehicle to be configured to travel only along these movement paths as it performs a manually created job.

One or more vehicles are preferably operable in a set-up mode, in which the respective vehicle does not perform a job but, rather, is prepared—in particular trained—for the purpose of performing jobs later. For example, in the set-up mode different routes, which are selectable later as movement paths for the purpose of performing manually created jobs, are creatable manually.

In the set-up mode, in particular during the manual creation of routes, the vehicle may arrive at a situation that, in the normal mode of the vehicle, would constitute a disruption. For example, it may be that for a manually created route, boundary values that deliberately deviate from a movement path of the vehicle in fully autonomous travel, for example smaller safety clearances, are selected.

In particular when the manual route is created and/or when manually created jobs are performed (or indeed in all the other operating modes), the vehicle can either travel inherently safely, such that it can itself respond reliably to possible risk situations and preferably avoid these, or the vehicle travels with no inherent safety, with the result that it cannot of itself go around or avoid possible risk situations. The last-mentioned case is produced in particular if a sensor device for monitoring an area surrounding the vehicle is faulty or deactivated and/or if one or more other safety devices or safety functions of the vehicle are deactivated, for example because they have been deliberately bypassed.

Further, travel that is not inherently safe may result if the vehicle is oriented exclusively to one or more locating aids, for example one or more QR codes and/or one or more code strips.

If the vehicle travels inherently safely, preferably a faster standard speed and/or a faster maximum speed of the vehicle is provided than when the vehicle travels with no inherent safety.

For example, the standard speed and/or maximum speed of the vehicle when it travels inherently safely is at least approximately three times, in particular at least approximately five times, for example at least approximately ten times, the standard speed and/or maximum speed of the vehicle when it travels with no inherent safety.

In particular in set-up mode, a standard speed and/or maximum speed of the vehicle when it travels with no inherent safety may be between approximately 10 m/min and approximately 20 m/min, preferably between approximately 12 m/min and approximately 18 m/min, for example approximately 15 m/min.

In particular in set-up mode, a standard speed and/or maximum speed of the vehicle when it travels with no inherent safety may be between approximately 0.5 m/min and approximately 5 m/min, preferably between approximately 1 m/min and approximately 3 m/min, for example approximately 2 m/min.

The standard speed of the vehicle is in particular the average speed at which the vehicle moves on a straight section.

In the halt mode of the vehicle, it is preferably braked or brakable to a standstill.

As an alternative or in addition, it is provided in the halt mode for a warning device of the vehicle to be configured to emit an acoustic emergency signal and/or a visual emergency signal. Further, as an alternative or in addition, it may be provided in the halt mode for the control device to be configured to transmit an emergency signal to a higher-level control installation, for controlling and/or monitoring a plurality of vehicles.

Preferably, a warning signal and/or an emergency signal comprises an instruction to clear the route and/or the area surrounding the vehicle.

The warning signal and/or the emergency signal may for example be an announcement spoken by human or mechanical voice.

It may be advantageous if the vehicle is configured to travel in multiple directions, in particular in two directions.

One or more display elements, preferably at each end region of the vehicle, are configured to display, depending on a current direction of travel, whether the respective end region is currently a front region or a rear region of the vehicle.

One or more display elements are in particular arranged and/or formed at all the corner regions of the vehicle.

The one or more display elements preferably at the same time form turn indicator elements which, when travelling around a bend and/or branching off from a main conveying section, display the respectively intended direction of travel of the vehicle.

In one embodiment of the invention, it may be provided for the vehicle to comprise one or more charge connection points for charging up an energy store of the vehicle.

A charge connection point is arranged for example on an underside of the base body. Preferably, for the purpose of charging up the energy store the vehicle is positionable above a corresponding charge connection point of a charging region.

As an alternative or in addition, it may be provided for a charge connection point to be arranged on an upper side of the base body. Preferably, in that case for the purpose of charging the energy store the vehicle is positionable below a corresponding charge connection point of a charging region.

A charging region is in particular part of a charging device at which energy is transferred without contact, for example inductively, and/or with a mechanical coupling.

In particular, precisely one vehicle is chargeable at a charging region at any given time.

Preferably, a charging region comprises a charge connection point on the energy source side. A charge connection point on the store side is preferably arranged and/or formed on the vehicle.

Preferably, energy from the mains network is provided by way of the charge connection point of the charging region.

Preferably, energy from the charge connection point of the charging region is tapped by the charge connection point of the vehicle and supplied to the energy store of the vehicle.

It may be favourable if the charge connection point is configured to be coupled to a corresponding charge connection point of a charging region with contact.

A charge connection point with contact is or comprises for example a sliding contact.

As an alternative or in addition, it may be provided for a charge connection point to be configured to be coupled to a corresponding charge connection point of a charging region without contact.

In particular in this case, an inductive energy transfer may be provided.

It may be advantageous if the vehicle comprises a charge connection point that is arranged on a side wall of the base body and is in particular an additional charge connection point, provided in addition to a charge connection point arranged for example on an underside of the base body.

The charge connection point on a side wall of the base body is in particular a further charge connection point that is configured to be coupled to a corresponding charge connection point of a charging region in particular by means of a plug connection.

In one embodiment of the vehicle, the charge connection point that is arranged on an underside of the base body may be a main charge connection point, through which a major part of the energy required for operation is receivable in the normal mode of the vehicle.

The further charge connection point is in particular a backup charge connection point and/or emergency charge connection point. By way of this further charge connection point, energy is in particular suppliable to the energy store of the vehicle if for whatever reason the vehicle is no longer bringable to a charging region for the main charge connection point.

It may be favourable if at least one charge connection point is arranged and/or formed on at least one receiving element.

It may be provided for the receiving element to comprise one or more contact regions and/or one or more contact elements and/or a control contact arrangement.

The one or more contact regions and/or the one or more contact elements are preferably inaccessible when the at least one receiving element is arranged in a retracted position. The contact regions and/or contact elements are in that case inaccessible, in particular for the purpose of optimised protection of persons, in particular when no objects are being conveyed by the vehicle and thus there are no objects covering the one or more receiving elements.

One or more contact regions and/or one or more contact elements and/or a control contact arrangement are in particular arranged and/or formed on a shaft region and/or a receiving cylinder of at least one receiving element.

Preferably, two contact regions and/or contact elements are arranged and/or formed on sides of the at least one receiving element—in particular the shaft region and/or receiving cylinder of the at least one receiving element—that are opposite one another with respect to a vertical longitudinal centre axis of the vehicle.

As an alternative or in addition, contact regions and/or contact elements that are arranged in particular at different heights on the shaft region and/or receiving cylinder of the at least one receiving element may be provided.

In particular by means of one or more sliding contacts, the one or more contact regions and/or contact elements are preferably configured to make contact with the receiving element in a simple manner, in order that energy can be supplied to the energy store of the vehicle.

It may be advantageous if the vehicle comprises an energy store for storing and providing electrical energy for driving the vehicle, wherein the energy store comprises one or more energy storage units that take the form of a capacitor, in particular a supercapacitor or ultracapacitor.

It may further be provided for the vehicle to comprise an energy store by means of which electrical energy is storable and providable for driving a lifting drive device of the vehicle.

By means of this same energy store, in particular this same energy storage unit or these same energy storage units of the energy store, preferably energy is storable and providable both for driving the lifting drive device and also for driving the vehicle.

Driving of the vehicle is in particular moving the vehicle along.

Preferably, the vehicle comprises an energy store that comprises in particular a plurality of energy storage units.

It may be favourable if the energy store comprises one or more drive energy storage units for storing energy for driving the vehicle as a whole and/or for driving a lifting drive device.

One or more or all of the drive energy storage units may take the form for example of supercapacitors.

As an alternative or in addition, it may be provided for the energy store to comprise one or more buffer energy storage units by means of which energy is providable for example for operating the control device and/or one or more sensor devices and/or one or more communication devices.

One or more or all of the buffer energy storage units may take the form for example of lithium-ion accumulators.

Optionally, it may be provided for one or more or all of the buffer energy storage units to be coupled or couplable to a drive device and/or a lifting drive device of the vehicle, in particular for providing energy for operating the drive device and/or the lifting drive device if the drive energy storage units can no longer provide sufficient energy for this.

It may be provided for the one or more drive energy storage units on the one hand and the one or more buffer energy storage units on the other to have mutually different standard operating voltages and/or charge voltages.

For example, it may be provided for the one or more drive energy storage units to be operable at a voltage, in particular a DC voltage, of at least approximately 48 V.

Further, it may be provided for the one or more buffer energy storage units to be operable at a voltage, in particular a DC voltage, of at least approximately 24 V.

For the purpose of charging the energy store at a charging region, the charging region preferably comprises one or more charge connection points, which each have a plurality of contact regions and/or contact elements for providing voltages of different voltage values.

In particular, there are provided at one or more charge connection points in each case two or more than two pairs of contact regions and/or contact elements that serve to provide different charge voltages.

A contact region may in particular take the form of a large-surface contact and/or a contact element, in particular as a protruding contact element and/or as a sliding contact.

Contact regions on the vehicle side of one or more charge connection points of the vehicle are preferably formed and/or arranged, at least in respect of their spatial form and/or arrangement, at least in certain regions such that they are complementary with the contact regions of the one or more charge connection points on the energy source side.

The contact regions are in particular formed and/or arranged such that the possibility of cross-contact being made between contact regions of contact region pairs that do not belong together is ruled out.

It may be favourable if one or more or all of the charge connection points have in each case at least one pair of contact regions on the outside, which serves in particular to charge the at least one drive energy storage unit.

Further, it may be provided for one or more or all of the charge connection points to have in each case at least one pair of contact regions on the inside, which serves in particular to charge the at least one buffer energy storage unit.

The at least one inside pair of contact regions is in particular arranged between the two contact regions of the at least one outside pair of contact regions.

As an alternative, it is also possible for reversed utilisation of the contact regions to be provided, with the result that the at least one inside pair of contact regions serves for example to charge the at least one drive energy storage unit, while the at least one outside pair of contact regions serves for example to charge the at least one buffer energy storage unit.

Further, it may be provided for one or more or all of the charge connection points to have in each case one or more location contacts which are configured to allow location identification and/or location monitoring of the vehicles to be performed.

For example, one or more pairs of location contacts may be provided that are arranged in particular on the inside, between contact regions of the respective charge connection point, and/or on the outside, such that the contact regions of the respective charge connection point are arranged between the location contacts.

It may be advantageous if one or more location sensors and/or location contacts are used to determine whether a vehicle has come to a location that is required for charging the energy store, in relation to a charge connection point, and if so that one or more charge voltages are activated at the charge connection point, for the purpose of charging the energy store.

It may be favourable if one or more contact regions and/or contact elements for charging the energy store, in particular one or more drive energy storage units and/or one or more buffer energy storage units, at the same time serve as one or more location contacts.

It may be provided for one or more contact regions and/or contact elements and/or one or more location contacts of the vehicle each to have a safety device, for example a relay and/or a contactor, which is configured to temporarily switch off the voltage, for example to avoid short circuits at the energy store when the contact regions and/or location contacts are being used for location identification and/or location monitoring.

As an alternative or in addition, it may be provided for one or more contact regions and/or contact elements and/or one or more location contacts of one or more or all of the charge connection points on the energy source side each to have a safety device, for example a relay and/or a contactor, which is configured to temporarily switch off the voltage, for example to avoid short circuits at the energy source when the contact regions and/or location contacts are being used for location identification and/or location monitoring.

For the purpose of switching between a location identification mode and a charge mode, in particular for the purpose of correspondingly controlling the safety device, preferably a handshake is provided between the vehicle and the charge connection point and/or the higher-level control installation.

In particular, it is possible to determine on the energy source side, by measuring the voltage at the contact regions and/or contact elements, whether a vehicle is correctly positioned at the respective charge connection point. For example, it is possible to infer that a vehicle is correctly positioned if the measured voltage is greater than 0.2 V, in particular greater than 0.5 V.

After the end of the charging procedure, the charge connection point is preferably put back into a location identification mode, in particular by activating the safety device.

Preferably, the vehicle comprises a control device that in particular takes a form and is arranged such that the vehicle is optionally operable in a safety mode or an express mode.

Preferably, the vehicle is optionally operable in the normal mode and/or the warning mode and/or the halt mode a) only in the safety mode or b) only in the express mode or c) in both the safety mode and the express mode.

Preferably, the vehicle is put or is configured to be put in the safety mode if persons are detected in the area surrounding the vehicle and/or if a vehicle is travelling in a region that is accessible to persons.

The detection of persons is in particular the detection of items, which could be persons. Here, it is not absolutely necessary to identify whether it is actually a person, but rather it must be ensured that, in case it is a person, this person is protected from injury.

Further, the vehicle is preferably put or is configured to be put in the express mode if no persons are detected in the area surrounding the vehicle and/or if a vehicle is travelling in a region that is inaccessible to persons.

In particular, the vehicle is operable in the safety mode such that the provisions and/or recommendations from VDI Guideline 2510 are observed.

Preferably, in the safety mode it is provided for one or more sensor devices of the vehicle to monitor an area surrounding the vehicle.

Depending on the results of the sensor monitoring, in the safety mode preferably the control device is configured to select whether the vehicle is operated in normal mode, a warning mode and/or a halt mode.

Preferably, a maximum speed in the safety mode is adapted to existing standards, guidelines and/or recommendations for self-guided vehicles in spaces and/or regions in which there are or may be persons.

In the express mode, preferably no maximum speed is prescribed. Rather, in the express mode the vehicle is preferably controlled by the control device merely such that damage to property is avoided. In particular, when the vehicle has no load, a very high speed can be provided, far greater than the maximum speed in the safety mode. For example, the speed of the vehicle in the express mode is at least approximately 150%, in particular at least approximately 200%, for example at least approximately 300%, of the maximum speed of the vehicle in the safety mode.

It may be advantageous if the vehicle is configured to be put in the safety mode or the express mode by means of a device located on the vehicle, in particular a GPS receiver and/or a real time location system, and/or by means of a device not located on the vehicle, in particular a sensor device, for example by using external safety contacts, etc.

A device that is not located on the vehicle is in particular a monitoring device that monitors or is configured to monitor whether persons have or could have access to an express region in which the vehicle is operated in the express mode. For example, if a monitored access door, as an access to the express region, is opened it may lead to immediately switching the vehicle in the express region from the express mode into the safety mode.

Further, it may be provided for a control device of the vehicle to check the condition of an express region, by means of its own sensors and/or by querying external sensors, before the vehicle is put in the express mode. For example, switchover from the safety mode to the express mode in the express region may be prevented if an internal or external sensor device detects a person in the express region.

Instead of detecting a person, it is also possible to apply other parameters or conditions for safely selecting the express mode.

An express region may be formed and/or provided for example on one or more levels of a processing installation.

It may be advantageous if an express region extends at least approximately completely—in particular to the extent of at least approximately 90%, for example at least approximately 95%, of a usable surface of one or more levels of a processing installation—over said one or more levels.

As an alternative or in addition, it may be provided for a safety region to be formed and/or provided for example on one or more levels of a processing installation.

It may be advantageous if a safety region extends at least approximately completely—in particular to the extent of at least approximately 90%, for example at least approximately 95%, of a usable surface of one or more levels of a processing installation—over said one or more levels.

Further, it may be provided for one or more levels of a processing installation each to have one or more safety regions and one or more express regions.

A level that takes the form of an express region to the extent of at least approximately 50%, in particular at least approximately 80%, for example at least approximately 95%, is preferably a level having workstations of which a majority or all are automatic—that is to say having stations and/or processing regions in a majority or all of which the objects are processed by means of robots or other machines.

A level that takes the form of a safety region to the extent of at least approximately 50%, in particular at least approximately 80%, for example at least approximately 95%, is preferably a level having workstations of which a majority or all are manual—that is to say having stations and/or processing regions in a majority or all of which the objects are processed by persons.

The one or more receiving elements of the vehicle may be positioned for example directly on an object that is to be conveyed.

However, it is also possible to provide for an object that is to be conveyed to be positioned or configured to be positioned on the one or more receiving elements of the vehicle by means of an adapter device.

Thus, the present invention also relates to an adapter device for receiving an object, in particular a workpiece, for example a vehicle body.

Preferably, the adapter device comprises the following:
a central element;
one or more adapter elements that are positioned on the central element and, for the purpose of receiving the object, are geometrically adapted to the object.

One or more engagement regions, in particular introduction openings, in which one or more receiving elements engage for the purpose of receiving the adapter device, are preferably arranged and/or formed in the central element and/or the one or more adapter elements.

Preferably, the central element connects a plurality of adapter elements to one another.

In particular, there are provided on one or more adapter elements respectively one or more receiving pins for receiving one or more objects, for example a vehicle body.

The one or more engagement regions, in particular introduction openings, are preferably arranged and/or formed to be substantially complementary with one or more receiving portions.

In particular, one or more engagement regions, for example introduction openings, take a form that is substantially conical, partially conical, frustoconical or partially frustoconical.

It may be favourable if one or more engagement regions, in particular introduction openings, are arranged and/or formed in an underside of the adapter device and taper in the opposite direction to that of gravity.

The adapter device according to the invention is in particular suitable for use in combination with a vehicle according to the invention.

Thus, the present invention also relates to a combination comprising at least one vehicle and at least one adapter device.

In particular, a plurality of adapter elements of different geometry and/or size may be provided for receiving objects of different geometry and/or size.

In particular, the combination may comprise a modular system for making adapter devices for different types of object, wherein in particular one or more identically formed central elements and adapter elements of different geometry and/or size that are configured to be optionally arranged thereon, in particular screwed thereto, are provided.

The vehicle according to the invention and/or the adapter device according to the invention and/or the combination according to the invention are particularly suitable for use in a conveying device for conveying objects.

Thus, the present invention also relates to a conveying device for conveying objects, in particular workpieces, for example vehicle bodies.

The conveying device here comprises in particular one or more vehicles, for example vehicles according to the invention.

Further, the conveying device preferably comprises one or more stations to which the objects are transportable by means of one or more vehicles, and/or at which the objects are dischargeable and/or receivable.

In particular, at one or more stations the objects are configured to be transferred from the vehicles to a station conveying device and/or to a station receptacle, or are configured to be taken on from these.

In at least one of the stations, preferably two or more than two locations are provided for two or more than two objects.

An object is preferably dischargeable by a vehicle to the station in a first location. An object is preferably receivable by a vehicle in a second location and then transportable away out of the station.

The first location is in particular a discharge location.

The second location is in particular a receiving location.

It may be favourable if the objects are processable during conveying from the first location to the second location, or in an intermediate location arranged between these.

It may be favourable if at least one vehicle takes a form and is arranged such that an object is dischargeable at a station in a first location and then an object that was previously discharged at this first location and has in the meantime been conveyed to a second location of this station is receivable at the second location. In this way, the at least one vehicle is configured in particular to skip one cycle of the conveying device.

The vehicles are preferably further usable while one or more objects remain temporarily in a station, in particular being processed.

The object that is discharged at the first location by means of the at least one vehicle is then received at the second location, in particular after processing of the object in an intermediate location, by means of a further vehicle that in the meantime has discharged a further object at the first location.

The vehicles of the conveying device are thus preferably optimised for the transport procedure. In particular, preferably idle times during treatment of objects are avoided.

It may be favourable if one or more stations comprise a partitioning floor below which the at least one vehicle is movable, in particular while one or more objects are movable above the partitioning floor and/or in order to move one or more objects above the partitioning floor.

In this case, the objects are preferably arranged entirely above the partitioning floor.

The at least one vehicle, in particular the base body and the chassis, is preferably arranged below the partitioning floor, wherein at most one or more receiving elements project through the partitioning floor and/or into the partitioning floor. In particular, a base body of the at least one vehicle is preferably arranged entirely below the partitioning floor.

Preferably, the partitioning floor extends from a discharge location as far as a receiving location.

As a minimum, the partitioning floor preferably extends in the region of an intermediate location, in particular over a complete treatment region, if the station is for example a treatment station.

The partitioning floor is preferably person-accessible and/or machine-accessible.

The partitioning floor may for example take a substantially planar form or take the form of a tunnel.

In particular, the partitioning floor may form a double floor that is arranged substantially parallel to a vehicle-accessible subsurface, in particular a factory floor, on which the conveying device is mounted.

The partitioning floor is preferably substantially fluid-tight, in particular being drip-tight.

It may be favourable if the partitioning floor and/or a station conveying device are raisable and/or lowerable, in particular partially. As a result, in particular objects may be received by one or more vehicles and/or another type of conveying installation, and/or may be transferred to one or more vehicles and/or another type of conveying installation.

It may be favourable if the partitioning floor is oriented substantially parallel to a vehicle-accessible subsurface on which the conveying device is mounted. A spacing between a preferably person-accessible surface of the partitioning floor and a preferably vehicle-accessible surface of the vehicle-accessible subsurface is preferably at most approximately five times, in particular at most approximately four times, preferably at most approximately twice, the height of a vehicle and/or the height of a base body of the vehicle.

It may be favourable if at least one section of the partitioning floor takes a completely enclosed form above a conveying path of a vehicle. As a result, objects that are to be conveyed are preferably completely spatially separated from the at least one vehicle.

In that case, the one or more vehicles and the objects preferably no longer touch one another. In particular, there are no parts projecting through the partitioning floor. In this way, it is possible to ensure particular protection of the vehicles from contamination, overheating, moisture, etc. when the vehicles pass below stations that are affected in these ways.

It may be provided for the completely enclosed section of the partitioning floor to extend at least approximately over an entire longitudinal extent of a processing region for processing the objects.

Preferably, transfer from the vehicle to the station conveying device and/or transfer from the station conveying device to the at least one vehicle are performed outside the processing region.

However, it may also be provided for one or more objects to be brought directly into a processing location by a vehicle. In that case, a station conveying device is preferably dispensable. For the purpose of protecting the vehicle, it may in that case be provided for the vehicle to unload the one or more objects in the processing location and to exit the processing region. At a later point in time, it is possible for the object or objects, of which processing is then finished, to be received again by the same or another vehicle and to be transported on.

The term "processing" in this description is preferably quite generally the carrying out of any kind of step for treatment, manufacture and/or finishing of a product. The term "processing" should in particular be understood to mean the manufacture, treatment, coating, assembly, repair, inspection, etc. of a product or part thereof.

A longitudinal extent of a processing region is in particular an extent of the processing region along a conveying direction and/or a conveying path, for example from an entry point and/or a discharge location of the station to an exit point and/or receiving location of the station.

It may be favourable if the partitioning floor has a penetration region, for example a penetration slot, through which one or more receiving elements of the at least one vehicle extend, or into which one or more receiving elements of the at least one vehicle extend.

The penetration region, in particular the penetration slot, preferably extends along a conveying path of the conveying device and/or predetermines a conveying path of the conveying device.

It may be provided for there to be formed on one or both sides of the penetration region, in particular the penetration slot, a penetration edge region that takes an elevated form, in particular by comparison with the rest of the partitioning floor.

The elevated form relates in particular to a height level in a part of the partitioning floor surrounding the penetration edge region, in particular a floor region of the partitioning floor that is person-accessible.

A penetration opening in the partitioning floor, formed by the penetration region, in particular the penetration slot, is thus preferably arranged above a person-accessible floor level, as a result of which it is possible in particular to prevent loose parts or liquids on the person-accessible floor region of the partitioning floor from passing through the penetration region and reaching the at least one vehicle.

An average free or clearable spacing between two penetration edge regions that are opposite one another in relation to the penetration region is preferably at most approximately four times, for example at most approximately three times, in particular at most approximately twice, an average thickness, horizontally and perpendicularly to the conveying path, of at least one receiving element of the at least one vehicle.

It may be favourable if an average free or clearable spacing between two penetration edge regions that are opposite one another in relation to the penetration region is at most approximately 150%, preferably at most approximately 100%, for example at most approximately 80%, of an average extent, horizontally and perpendicularly to the conveying path, of a central element of an adapter device for receiving at least one object. As a result, the central element of the cover device may at least partly or completely cover the penetration region, in particular the penetration slot, as a result of which in particular an undesired contamination of the vehicle may be avoided or at least reduced.

The penetration edge region may be for example substantially L-shaped in a cross section taken perpendicularly to the conveying path.

As an alternative or in addition, it may be provided for the penetration edge region to extend obliquely in relation to the direction of gravity and/or obliquely in relation to a horizontal direction.

It may be advantageous if the conveying device, in particular the partitioning floor, for example the penetration edge region, comprises one or more closing elements by means of which the penetration region, in particular the penetration slot, is closable, preferably permanently or temporarily.

In particular, it may be provided for the penetration region, in particular the penetration slot, to be closable automatically by means of the one or more closing elements.

As an alternative or in addition, it may be provided for the penetration region, in particular the penetration slot, to be closable by means of one or more closing elements in particular if no receiving element projects through the penetration region.

Further, as an alternative or in addition, it may be provided for the penetration region, in particular the penetration slot, to be closable by means of one or more closing elements in the sections of the penetration region, in particular the penetration slot, where no receiving element is currently projecting through the penetration region.

One or more closing elements are in particular actuable by means of the one or more receiving elements, in particular being configured to be brought into an open position and/or a closed position.

As an alternative or in addition, it may be provided for one or more closing elements to be configured to be moved from an open position into a closed position automatically, resiliently and/or under the action of gravity.

One or more closing elements in particular take the form of slats and/or flaps.

It may be favourable if a conveying device serves to convey objects, in particular workpieces, for example vehicle bodies, wherein the conveying device preferably comprises a partitioning floor.

The partitioning floor preferably has a penetration region, in particular a penetration slot.

Preferably, one or more receiving elements may, for the purpose of receiving at least one object, extend through the penetration region, in particular the penetration slot, preferably upwards in the opposite direction to that of gravity.

It may be provided for the partitioning floor to form a person-accessible floor of a station, a processing region and/or a treatment space of a treatment installation.

One or more vehicles are preferably configured to travel below the partitioning floor, in particular in a travel space formed below the partitioning floor.

The penetration region, in particular the penetration slot, preferably extends along a conveying direction of the conveying device.

It may be advantageous if the partitioning floor comprises one or more closing elements by means of which the penetration region, in particular the penetration slot, is closable.

In particular, it may be provided for the penetration region, in particular the penetration slot, to be closable by means of the one or more closing elements automatically and/or temporarily and/or locally and/or globally.

It may be provided for the penetration region, in particular the penetration slot, to be closable by means of the one or more closing elements in particular if no receiving element projects through the penetration region.

As an alternative or in addition, it may be provided for the penetration region, in particular the penetration slot, to be closable by means of the one or more closing elements in particular in the regions of the penetration region, in particular the penetration slot, where no receiving element is currently projecting through the penetration region.

It may be favourable if one or more closing elements are actuable by means of the receiving element, in particular are configured to be brought into an open position and/or a closed position.

Preferably, a receiving element is configured always to move exactly one closing element or two closing elements from a closed position to an open position.

Preferably, one or more closing elements, in particular all of the closing elements, are configured to be moved automatically from an open position to a closed position, in particular if no receiving element engages with the respective closing element.

One or more closing elements, in particular all of the closing elements, are preferably actuable independently of one another, in particular being configured to be moved from a closed position to an open position independently of one another.

It may be favourable if one or more closing elements are configured to be automatically moved from an open position into a closed position, resiliently and/or under the action of gravity. As a result, it is preferably possible to ensure that the closing elements are always arranged in the closed position, without the intervention of a receiving element, and so the penetration region, in particular the penetration slot, is closed.

One or more closing elements, in particular all of the closing elements, may for example take the form of slats and/or flaps and/or closure panels.

For example, round—in particular circular—closure panels may be provided as closing elements.

It may be favourable if one or more closing elements are deflectable in particular in a horizontal direction in order to temporarily clear the penetration region for the purpose of guiding one or more receiving elements through.

The term "deflection" should be understood in particular to mean linear displacement and/or pivoting.

It may be provided for the partitioning floor to comprise a plurality of closing elements that are arranged to overlap one another in a closed position and/or in an open position thereof.

In particular, it may be provided for the partitioning floor to comprise a plurality of closing elements that are arranged and/or movable on mutually different levels, in particular mutually parallel levels, preferably horizontal levels, in particular being movable relative to one another and/or relative to one or more load-bearing panels of the partitioning floor.

In particular, it may be provided for the partitioning floor to comprise a plurality of closing elements that are arranged and/or movable on a first level, and in addition a plurality of closing elements that are arranged and/or movable on a second level. The first level and the second level are preferably arranged parallel to one another and/or oriented horizontally.

The closing elements that are arranged and/or movable on mutually different levels are preferably arranged succeeding one another and/or adjoining one another in a direction running perpendicularly to the levels.

It may be provided for one or more closing elements, in particular all of the closing elements, to be arranged below one or more load-bearing panels of the partitioning floor.

One or more, in particular all, of the closing elements preferably project at least in a closed position thereof laterally beyond the one or more load-bearing panels, in particular into a penetration region, in particular a penetration slot, that is formed between two mutually opposed load-bearing panels.

In the closed position, one or more, in particular all, of the closing elements preferably project beyond the one or more load-bearing panels by at most approximately 70%, in particular at most approximately 50%, preferably at most approximately 40%, of their total surface area, in particular at their upper side that is uppermost with respect to the direction of gravity.

The one or more closing elements, in particular all of the closing elements, remain directly below the one or more load-bearing panels to the extent of at least approximately 30%, preferably at least approximately 50%, for example at least approximately 60%, of their total surface area, preferably in both the closed position and the open position. As a result, in particular a supporting function of the one or more closing elements, in particular all of the closing elements, against the one or more load-bearing panels may be produced.

The one or more closing elements, in particular all of the closing elements, are preferably person-accessible.

It may be favourable if one or more, in particular all, of the closing elements are supported and/or supportable against one another and/or against one or more load-bearing panels of the partitioning floor, in particular in a closed position and/or in an open position thereof.

It may be provided for one or more, in particular all, of the closing elements to be movable, in particular linearly displaceable, in a direction that runs obliquely, in particular perpendicularly, to a conveying direction and/or in a direction that is at least approximately horizontal.

The one or more, in particular all, of the closing elements are thus movable out of a movement path of one or more receiving elements, preferably obliquely, in particular perpendicularly, to the conveying direction, in particular being slidable to the side by means of the one or more receiving elements.

The one or more receiving elements engage in particular directly with the one or more closing elements in order in particular to move one closing element after another and/or one closing element pair after another out of a closed position and into an open position and thus to be able to move the one or more receiving elements along the penetration region, in particular the penetration slot.

It may be favourable if one or more closing elements, in particular all of the closing elements, are arranged to be rotatable, for example freely rotatable and/or rotatable about 360°, on a closing element receiving means of the partitioning floor.

The one or more, in particular all, of the closing elements take the form for example of closure panels.

It may be favourable if the one or more closing elements, in particular all of the closing elements, are linearly displaceable and preferably at the same time rotatable as they are moved out of the closed position into the open position and/or out of the open position into the closed position.

In one embodiment of the invention, it may be provided for the one or more closing elements, in particular all of the closing elements, together to form a closure of the penetration region, in particular the penetration slot, wherein the closure has less height than a maximum transverse extent of the penetration region, in particular the penetration slot, for example at most approximately 80%, preferably at most approximately 50%, for example at most approximately 20%, of a maximum width of the penetration region, in particular the penetration slot. As a result, it is preferably possible to create an optimised travel space below a person-accessible surface of the partitioning floor, with the result that, in particular when the one or more receiving elements are in a completely retracted condition, a vehicle is configured to travel below the partitioning floor even if there is no actuation of the closing elements.

One or more closing elements, in particular all of the closing elements, are preferably received by means of one or more closing element receiving means.

In particular, a separate closing element receiving means is associated with each closing element.

It may be favourable if the one or more, in particular all, of the closing element receiving means are arranged, in particular movably arranged, on a load-bearing structure of the partitioning floor.

It may be favourable if the partitioning floor comprises a restoring device by means of which the closing elements, and/or the closing element receiving means together with the closing elements arranged thereon, are movable, in particular after actuation thereof, from an open position into the closed position.

The restoring device comprises in particular a restoring element that comprises or forms in particular one or more closing element receiving means.

Preferably, a restoring element is associated with each closing element receiving means, or a separate closing element receiving means is arranged on each restoring element.

Each restoring element is preferably arranged such that it is movable on a restoring element receptacle, in particular a separate restoring element receptacle.

The restoring element receptacle is in particular fixed to a load-bearing structure of the partitioning floor.

It may be favourable if the restoring element is arranged such that it is displaceable, in particular linearly displaceable, on the respective restoring element receptacle.

For example, it may be provided for the restoring element to be arranged resiliently on the respective restoring element receptacle by means of a spring device, in particular a pressure spring.

When the closing elements are actuated, the closing elements, together with the closing element receiving means and/or the restoring elements, are thus moved, in opposition to the action of for example a spring device, relative to the respective restoring element receptacle and thus relative to the load-bearing structure.

By means of the restoring device, in particular by means of the spring device, for example by means of the pressure spring, after disengagement of the respective receiving element the respective closing element, together with the closing element receiving means and/or the restoring element, is then put back into the closed position.

For the purpose of restricting movement of the restoring element in relation to the restoring element receptacle, there may be provided for example an abutment element, which is arranged such that it is displaceable in particular in a guide opening and in so doing defines two end positions of the restoring element in relation to the restoring element receptacle and thus of the respective closing element in relation to the penetration region, in particular the penetration slot.

Preferably, there is formed between a closure region, which is formed by means of the closing elements and which at least temporarily fills and/or closes in particular the penetration region, for example the penetration slot, a person-accessible region, in particular a part of a person-accessible surface of the partitioning floor.

The further person-accessible surface of the partitioning floor, which is formed in particular by one or more load-bearing panels, is arranged vertically offset, preferably by at most approximately 200%, preferably at most approximately 150%, of a maximum height of a closing element. As a result of using particularly flat closing elements, for example with a maximum height of at most approximately 5 cm, for example at most approximately 2 cm, it is possible to create a person-accessible surface of the partitioning floor that is offset as little as possible and thus has little risk of injury to persons.

In one embodiment of the invention, it may be provided for the partitioning floor to comprise one or more centring devices and/or opening devices that are arranged and/or formed on one or more closing elements.

By means of a centring device, it is possible for example to additionally centre a receiving element and/or a vehicle comprising the receiving element.

For this purpose, a centring device comprises for example two centring elements that are arranged in the penetration region and are formed in particular with lead-in chamfers and can thus bring about centring in the middle of the receiving element in the penetration region, in particular in the penetration slot.

Preferably, an opening device can comprise one or more opening elements.

A lead-in chamfer of an opening device may be oriented in particular obliquely to the horizontal and/or obliquely to the vertical, and make it possible for example to actuate one or more closing elements as a result of moving one or more receiving elements in the vertical direction.

By means of an opening device of this kind, it is possible in particular for a vehicle that is arranged entirely below the partitioning floor and of which one or more receiving elements are likewise arranged entirely below all the closing elements to actuate one or more closing elements from below the partitioning floor in order to move one or more receiving elements through the penetration region from below the partitioning floor and to bring them into engagement for example with an object arranged above the partitioning floor.

It may be advantageous if the conveying device comprises a station conveying device by means of which the objects are conveyable independently of the vehicles, wherein the station conveying device is preferably integrated in a partitioning floor of the station.

The objects are conveyable by the station conveying device, preferably independently of the vehicles, from a discharge location to a processing location and/or to a receiving location and/or to further stations and/or to a buffer region for buffering objects that are to be conveyed.

The station conveying device may be for example a roller track, a rail-borne conveyor or a chain conveyor, or comprise a roller track, a rail-borne conveyor and/or a chain conveyor.

In particular, rollers of the roller track, which are for example configured to be driven individually, are integrated into the partitioning floor.

Further, it is possible in particular to integrate one or more rails of a rail-borne conveyor into the partitioning floor.

It may be favourable if the conveying device has a plurality of vehicles that are stackable.

In particular, the conveying device comprises a plurality of vehicles of identical form that are stackable above one another and/or on one another.

For this purpose, the conveying device may comprise for example a stacking device for stacking and/or unstacking a plurality of vehicles.

A stack of vehicles may be advantageous in particular for transport and/or housing them.

By means of the stacking device, it is possible in particular to separate a plurality of vehicles stacked above one other, once they have been transported.

The stacking device may for example comprise a lifting unit by means of which one or more vehicles are configured to be raised in relation to a vehicle-accessible subsurface, in particular such that an upper side of the lifting unit onto which a vehicle has been rolled before it is raised is flush with an upper side of a vehicle or of an intermediate element (described below) such that the vehicle on the lifting unit can roll onto the further vehicle.

Here, the lifting unit comprises in particular a side wall that takes a form that is at least partly complementary with a side wall of the vehicles.

In particular, the vehicle-accessible surface of the lifting unit is adapted, at least on one side, to the shape of an upper side of the vehicles and/or the shape of intermediate elements, for the purpose of stacking the vehicles.

Further, the use of one or more rack units may be provided, wherein the stacking device is preferably configured to put the vehicles into the rack units, in particular into individual rack bays of the rack units.

The vehicles may be stacked for example directly on one another.

In particular if one or more receiving elements project out of a base body of the respective vehicle, they may impede stacking of this kind, however.

For this reason, it may be favourable if one or more intermediate elements—in particular vehicle-accessible intermediate elements—are introduced between two respective vehicles or are mounted on a vehicle before a further vehicle is arranged on this vehicle.

The one or more intermediate elements in particular provide a spacing between the base bodies of the vehicles that are to be stacked on one another in order to prevent a collision with one or more receiving elements.

Further, one or more intermediate elements may serve to anchor the vehicles to one another.

Further, it may be favourable if, by means of an intermediate element, a charge connection point is provided in order in particular also to be able to charge the energy stores of vehicles that are arranged on a further vehicle and are thus not moveable directly over a charge connection point of a charging region.

In one embodiment of the invention, it is provided for the conveying device to comprise one or more charging regions for charging an energy store of the at least one vehicle.

One or more charging regions are preferably arranged at one or more stations of the conveying device to which the objects are transportable by means of the at least one vehicle, and/or at which the objects are dischargeable and/or receivable.

One or more charging regions are further preferably arranged, in relation to a conveying path of at least one vehicle, between two stations of the conveying device to which the objects are transportable by means of the at least one vehicle, and/or at which the objects are dischargeable and/or receivable.

It may be provided for one or more charging regions to be arranged in or on a conveying path of at least one vehicle. Here, a conveying path is in particular a path along which objects are conveyable by means of the at least one vehicle.

Preferably, a complete conveying path or complete route of each vehicle comprises a conveying path along which one or more objects are conveyed, and a return conveying path along which the respective vehicle travels in order to be brought, for example from an end station, at which an object is finally discharged from the conveying device, back to a starting station, at which the objects first come into contact with the conveying device.

A return conveying path is in particular a path on which the vehicles have no load.

It may be favourable if one or more charging regions are arranged in or on a path section that permanently or temporarily forms a section of a conveying path of one or more vehicles and a section of a return conveying path of this or these vehicles or one or more other vehicles.

In particular, it may be provided for one or more charging regions to be arranged in or on a path section that alternately forms a section of a conveying path of one or more vehicles and a section of a return conveying path of this or these vehicles or one or more other vehicles.

It may be favourable if one or more charging regions are arranged at a multidirectional conveying region at and/or through which one or more vehicles pass in different directions of travel.

It may be advantageous if one or more charging regions are arranged in or at a crossing region at which one or more conveying paths and/or one or more return conveying paths of one or more vehicles cross.

By providing suitable locations for the charging regions, it is possible in particular to minimise a line length between an energy source and the respective charging region.

One or more charging regions are preferably stationary charging regions at which the at least one vehicle is stationary for the purpose of charging the energy store and/or during charging of the energy store.

In this arrangement, it may be provided for one or more charging regions to be arranged such that they lie directly in the conveying path for example with no possibility of bypassing it. One or more vehicles are then configured to be brought into the one or more charging regions, in particular without any deviation, and to be brought to a standstill there for the purpose of charging the respective energy store. After the charging procedure, the vehicle is put in motion again and once more follows the conveying path.

As an alternative or in addition, however, it may also be provided for one or more charging regions to be arranged off the track of a (for example) optimised or shortest conveying path. The at least one vehicle in that case briefly departs from the optimised and/or shortest conveying path in order to charge the respective energy store in the one or more charging regions. After the charging procedure, the one or more vehicles then go back to the (for example) optimised or shortest conveying path.

In particular if there are relatively long intervals of time and/or space between a plurality of vehicles that are conveyed along a common conveying path, it is possible to provide a halt directly on the optimised and/or shortest conveying path for the purpose of charging the respective energy store. As a result, a particularly compact embodiment of the conveying device may preferably be achieved.

In the case of vehicles that succeed one another at short intervals in time and/or space, on the other hand, removal of a vehicle that is to be charged from the predetermined (in particular optimised and/or shortest) conveying path may be advantageous in order not to block succeeding vehicle.

All the features above may also be provided in the case of non-stationary charging regions, that is to say mobile charging regions. In such mobile charging regions, in particular a speed that is slower than normal speed, or indeed normal speed itself, is in particular provided as the speed of travel of the vehicle.

It may be favourable if one or more charging regions are mobile charging regions past which the at least one vehicle is movable during charging of the energy store, and/or through which the at least one vehicle is movable during charging of the energy store.

It may be advantageous if a mobile charging regions comprises a plurality of charge connection points that are arranged such that they are distributed in particular above a spatial region greater than the dimensions of the vehicle in the horizontal direction.

In particular, the charge connection points of a mobile charging region are preferably arranged successively along a charging section, with the result that the charge connection points of the mobile charging region are preferably successively passed through, in particular travelled over, by a vehicle travelling along the charging section.

Preferably, it is only ever some of the charge connection points of the mobile charging region that are covered by the vehicle as it moves along the charging section, or when it is located on the charging section.

It may be favourable if a supply of power and/or current at the charge connection points of the mobile charging region is controlled by means of a control device and/or a higher-level control installation such that it is only ever the charge connection points that are covered by a vehicle that carry current and/or are live. The other charge connection points, which are not covered by this or another vehicle, are then preferably disconnected and/or currentless. As a result, an undesired risk of electrocution of persons can preferably be avoided.

For determining which charge connection point or points is or are covered by a vehicle, it is in particular possible to identify and/or monitor the location of the respective vehicle, in which case the fact of its or their being covered is for example reckoned.

As an alternative or in addition, it may be provided for one or more charge connection points, in particular all of the charge connection points, each to comprise one or more sensor devices that can determine in particular the presence of a vehicle at, in particular above, the respective charge connection point, wherein only if a vehicle is identified by means of the one or more sensor devices is a current and/or voltage applied, in particular activated, at the respective charge connection point for charging an energy store of the vehicle.

A sensor device of this kind may in particular be a contact device that interacts with a vehicle, in particular a corresponding mating contact, for example in order to detect the presence of the vehicle and/or directly or indirectly to close a circuit for the purpose of charging the energy store. For this purpose, the contact device is in particular an electrical and/or mechanical and/or electromagnetic contact device other than a charging contact of the charge connection points.

For the purpose of detecting the presence of a vehicle in a particular part of a charging section, it is possible in particular to provide one or more contact bars, in particular contact bars providing spatial resolution, for determining the location of the respective vehicle.

A charge connection point may be arranged for example below a vehicle, to the side of the vehicle and/or above the vehicle.

Preferably, the charge connection point is inaccessible to persons in the normal mode of the vehicle and/or the conveying device.

It may be advantageous if the conveying device, in particular one or more vehicles, for example all of the vehicles, each comprise an activation device which is configured to temporarily activate, in particular make live, one or more charge connection points of the respective vehicle and/or one or more charge connection points of the respective charging region, for the purpose of charging the respective energy store. For example, it may be provided for contact regions to be activated—in particular by pivoting out contact elements and/or sliding open cover elements, etc.

In this context, an activation device is in particular actuated by an interaction between the vehicle and the charging region.

It may be favourable if the activation device is directional, such that in particular at least one charging region that is arranged in at least one multidirectional conveying region can activate different contact regions for vehicles that are oriented in different directions. In particular, this preferably allows incorrect polarities to be avoided.

One or more charging regions may for example be arranged and/or formed at or in a penetration region of a partitioning floor of the conveying device.

For example, it may be provided for one or more closing elements to form contact elements of the charging region for the purpose of bringing contact regions into contact at the vehicle—in particular one or more receiving elements.

As an alternative or in addition, it may be provided for one or more closing elements to be actuation elements for actuating an activation device for the purpose of activating one or more contact regions of the vehicle.

It may be favourable if one or more charging regions are arranged and/or formed on an underside of a partitioning floor of a station of the conveying device.

The one or more charging regions are in that case configured to be brought into contact in particular from below, with a charge connection point of the vehicle that corresponds with the charge connection point of the charging region preferably being arranged and/or formed on an upper side of the vehicle.

A charge connection point of the vehicle projects in particular from below against the partitioning floor of the conveying device, wherein the energy store of the vehicle can be charged in particular when the vehicle is stationary. As an alternative, it is also possible for mobile charging to be provided, in which the energy store of the vehicle is charged while the vehicle is travelling into the station, through the station and/or out of the station.

Preferably, the conveying device comprises a plurality of such stations.

It may be provided for one or more charging regions to be arranged on a floor on which the at least one vehicle is configured to move. The one or more charging regions are arranged and/or formed in particular directly below a partitioning floor of a station of the conveying device.

It may be favourable if one or more charging regions take the form of a charging bay into which one or more vehicles are configured to be brought for the purpose of charging the respective energy store, in particular in a deviation from a (for example optimised and/or shortest) conveying path and/or a (for example optimised and/or shortest) return conveying path of the vehicle.

One or more charging bays are preferably holding regions for temporarily housing one or more vehicles.

As an alternative or in addition, it may be provided for one or more charging bays to be maintenance regions for carrying out maintenance work on one or more vehicles.

A holding region is in particular a region in which the respective vehicle waits for a subsequent job, or in which the vehicle is held until a previously allocated job is due.

In one embodiment, it may be provided for a holding region to be provided for a plurality of vehicles, wherein the vehicles are in particular configured to be arranged in particular in a row one behind the other, in particular in a holding queue. The vehicles preferably arrive at and leave the holding region in accordance with the FIFO principle (first in, first out).

It may be advantageous if there is arranged in the holding region a charging region, in particular a charge connection point on the energy source side, only in a front-most holding location of the holding region, in particular in relation to a main direction of travel of the vehicles in the holding region and/or in relation to a row in which a plurality of vehicles is configured to be arranged one behind the other. As a result, in particular it is always the one or more energy stores of the vehicle that is next to receive a job that is/are charged.

As an alternative or in addition, it may be provided for a plurality of charging regions, in particular a plurality of charge connection points on the energy source side, to be arranged in the holding region, in particular in a plurality of holding locations of the holding region.

For example, it is possible for a respective charging region, in particular a respective charge connection point on the energy source side, to be arranged in a front-most holding location and in a rear-most holding location of the holding region. As a result, in particular the energy stores of the vehicles entering the holding region can be charged, with the result that a relatively long idle time in the holding region is possible for vehicles, and/or a shorter charging time is producible in the front-most holding location.

For the purpose of conserving charge in the energy stores of the vehicles which are being held at holding points that do not serve as a charging region, it may be provided for the vehicle that is arranged in the front-most holding location to leave the holding location after a predetermined idle time and to join the back of a row of waiting vehicles. The other vehicles then move up. As a result of this regular swapping, by and by all the waiting vehicles reach a charging region, with the result that the energy stores of all the waiting vehicles are chargeable regularly.

It may be favourable if a charging state of one or more energy stores of the vehicle is checked for example by the vehicle and/or by a higher-level control installation before the vehicle is moved away from a charging region for the purpose of carrying out a job.

Further, in particular, it may be provided for the vehicle to start carrying out the job only once the charging state of the one or more energy stores is sufficient for carrying out the job completely, and preferably additionally for travel to a charging region after the job.

Optionally, moreover, a safety backup may be provided, for example such that carrying out the job only starts once the charging state is for example at least 5%, in particular at least 10%, above the charging state required for carrying out the job completely, in absolute terms (in relation to the total capacity of the one or more energy stores) or in relative terms (in relation to the quantity of energy required for carrying out the job).

In particular, a maintenance region is a region in which the maintenance and/or servicing of one or more vehicles is carried by appropriately trained personnel.

In one embodiment of the invention, it may be provided for one or more charging regions to be arranged at a discharge location of a station and/or a receiving location of a station such that an energy store of the vehicle is chargeable in particular during a positioning procedure for positioning a vehicle in relation to the station, in particular for the transfer or taking on of an object.

The discharge location and receiving location are in particular regions at which one or more objects are transferred from the vehicle to a station conveying device or from the station conveying device to the vehicle. Because for this purpose very precise positioning of the vehicle in relation to the station is required, the positioning procedure can only be carried out a slower speed than a maximum speed of the vehicle, for example at less than approximately 0.5 m/s. The vehicle covers correspondingly small sections of the route during the positioning procedure, with the result that the energy store of the vehicle can be charged during the positioning procedure, for example using sliding contacts, or by induction.

It may be advantageous if the conveying device extends on a plurality of levels and comprises one or more charging regions that are arranged in a handover device for handing over one or more vehicles from one level to another level.

The handover device is in particular an elevator or other lifting device for handing over one or more vehicles from one level to another level.

In this case, the levels of the conveying device are in this case preferably further levels of a treatment installation on which different or indeed identical treatment procedures are carried out.

The handover device may in this case take a form in particular such that one or more vehicles are configured to be handed over, at the same time or only one after the other. In this case, on the one hand handover with one or more objects arranged on the one or more vehicles, or without objects, may be provided for.

It may be advantageous if the conveying device comprises one or more charging nodes that each comprise a plurality of charging regions for charging a plurality of vehicles at the same time.

The charging regions of one or more charging nodes are preferably arranged and/or formed such that a plurality of vehicles are chargeable at the charging regions in different orientations or in identical orientations, i.e. parallel to one another.

One or more charging nodes are preferably arranged at points at which a plurality of conveying paths and/or return conveying paths cross and/or overlap.

It may be advantageous if the conveying device comprises one or more safety regions and one or more express regions, wherein the one or more vehicles are preferably configured to be put in the safety mode by means of a control device in the one or more safety regions, and wherein the one or more vehicles are preferably configured to be put in the express mode by means of the control device in the one or more express regions.

The safety region is in particular accessible to persons.

The express region is in particular a region that is at least temporarily inaccessible to persons. If one or more sensor devices determine that persons are gaining or could gain access to the express region, this is detected and the safety mode is activated, preferably automatically, in the express region as well for all vehicles there.

The express region is in particular a region that is spatially separated and/or blocked off from the safety region.

One or more express regions preferably comprise one or more return conveying paths or return conveying path sections in which the one or more vehicles have no load.

In particular, when the respective vehicle has no load, there are no objects that are to be conveyed on it.

The at least one express region can thus in particular take a form that is so flat that no object is receivable on the one or more vehicles when they are in the express region.

The express region is in particular adjusted to a height of the vehicle with no objects arranged thereon.

It may be advantageous if one or more express regions and/or one or more safety regions are connected to one another by means of one or more passageways.

The one or more passageways are in particular openings through which one or more vehicles can travel out of the express region and into the safety region and/or out of the safety region and into the express region.

The one or more passageways preferably have, at least in certain regions, a shape that is at least approximately and/or at least in certain regions complementary with a shape of one or more vehicles.

As a result, in particular undesired access to the express region by persons can be avoided.

It may be provided for one or more passageways to be arranged in or on one or more stations of the conveying device.

As an alternative or in addition, it may be provided for one or more passageways to be formed by one or more stations of the conveying device.

In this way, one or more stations preferably separate an express region from a safety region.

For example, it may be provided here for one or more vehicles to convey an object that is to be conveyed to a station and for example to transfer it to a station conveying device. The one or more vehicles are then moved for example through the station and into the express region, and may be moved on in particular at an accelerated speed, in particular in order to take on further jobs.

The one or more objects arranged in the station are then, for example by means of a station conveying device and/or one or more other vehicles, removable—for example conveyable further—from the station in particular to one or more other stations and/or a buffer device for intermediate storage of the objects.

It may be favourable if one or more express regions are formed by a double floor that is person-accessible and/or vehicle-accessible.

In particular, it may be provided for the express region to be an intermediate space between a factory floor and an additional floor that extends parallel to the factory floor.

A spacing between the factory floor and the additional floor is preferably less than four times, preferably less than three times, preferably at most approximately twice, the height of a vehicle, in particular the height of a base body of the vehicle.

Instead of a factory floor, it is also possible for there to be another vehicle-accessible subsurface.

The region on the additional floor, or the region in which there is no additional floor, is in particular a safety region.

The additional floor may be for example a partitioning floor or comprise a partitioning floor.

The conveying device preferably comprises a plurality of types of station, wherein of at least two types of station preferably a plurality of respective stations are provided.

The vehicles are controllable by the control device, preferably depending on the occupancy of stations of a respective type. In particular, preferably the feeding of objects to the stations may be selected depending on the respective occupancy of stations of a respective type.

In one embodiment of the invention, it may be provided for the objects that are to be conveyed to be conveyable by one or more vehicles in a predetermined order to and/or through a respective one of the stations of different types. By means of a control device, preferably a single station of a respective type of station is selectable, in particular
 a) depending on a current occupancy of the individual stations of a respective type of station, and/or
 b) depending on the equipment of the individual stations of a respective type of station, and/or
 c) depending on a configuration of the individual stations of a respective type of station, and/or
 d) depending on a current maintenance condition or degree of contamination of the individual stations of a respective type of station.

The conveying device is suitable in particular as a constituent part of a processing installation for processing objects, in particular workpieces, for example vehicle bodies.

Thus, the present invention also relates to a processing installation for processing objects.

The processing installation preferably comprises a conveying device, in particular a conveying device according to the invention.

The processing installation according to the invention preferably has individual or a plurality of features and/or advantages described in connection with the conveying device according to the invention and/or the vehicle according to the invention.

It may be favourable if one or more stations of the conveying device, which are connected to one another by an industrial conveying arrangement for the purpose of conveying objects by means of vehicles of the conveying device, are processing stations of the processing installation.

By means of one or more vehicles of the conveying device, preferably objects to be processed are thus configured to be fed to different processing stations of the processing installation one after the other.

It may be favourable if the conveying device comprises a transfer region at which one or more objects are transferable from a vehicle to a station conveying device or another type of receiving device.

The transfer region may in particular form a receiving location and/or a discharge location or be a constituent part thereof.

In a transfer location of the transfer region, the vehicle is preferably located such that, for example as a result of one or more receiving elements of the vehicle being retracted or lowered, an adapter device and/or the object are lowerable and/or depositable at a station conveying device or another receiving device.

This preferably makes the adapter device and/or the object separable from the vehicle.

If a plurality of vehicles are to transfer a plurality of objects at rapid intervals in time, it may be advantageous if the vehicles are not moved away from the transfer location in opposition to a direction in which they came in through an entry region, since otherwise the further vehicles would have to be halted at a relatively great spacing from the transfer region.

Preferably, at least one entry region of the transfer region through which the vehicle can access a transfer location of the transfer device is spatially separated from at least one exit region of the transfer region through which the vehicle is configured to move away from the transfer location.

As an alternative or in addition, it may be provided for a direction of entry along which the vehicle is configured to enter the transfer region to be transverse, in particular at least approximately perpendicular, to an exit direction along which the vehicle is configured to exit from the transfer region.

The vehicle is in particular rotatable in the transfer location, preferably about its own vertical axis, in particular centre axis, for example by two drive wheels turning in opposite directions.

The rotation is for example about at least approximately 90°, such that the vehicle can leave the transfer location preferably in an exit direction that is oriented at least approximately perpendicularly to the direction in which it came in.

It is then possible for a further vehicle to be moved through the entry region and into the transfer location directly afterwards, preferably with negligible idle time, in order ultimately to be able to feed a further object to the station.

Further, the present invention relates to methods for processing and/or conveying objects.

Here, the objects are conveyed in particular by means of one or more vehicles, in particular vehicles according to the invention, and/or by means of a conveying device, in particular a conveying device according to the invention.

As an alternative or in addition, it may be provided for the objects to be processed in and/or by means of a processing installation, in particular a processing installation according to the invention.

The methods preferably have individual or a plurality of features and/or advantages described in connection with the vehicle, the conveying device and/or the processing installation.

It goes without saying that in principle all the features and/or advantages of the vehicle, the adapter device, the conveying device, the processing installation and/or the methods are freely combinable with one another in order to obtain particular configurations of the invention.

Further preferred features and/or advantages of the invention form the subject matter of the description below and the representation in the drawings of exemplary embodiments.

BRIEF DESCRIPTION OF THE DRAWINGS

FIG. 28 shows an illustration, corresponding to FIG. 26, of the transfer region from FIG. 26, wherein the vehicle has rotated into a transverse orientation in order to leave the transfer region in an exit direction that is oriented transversely to a direction in which it came in;

Like or functionally equivalent elements are provided with the same reference numerals in all the Figures.

DETAILED DESCRIPTION OF THE DRAWINGS

Figure 11:
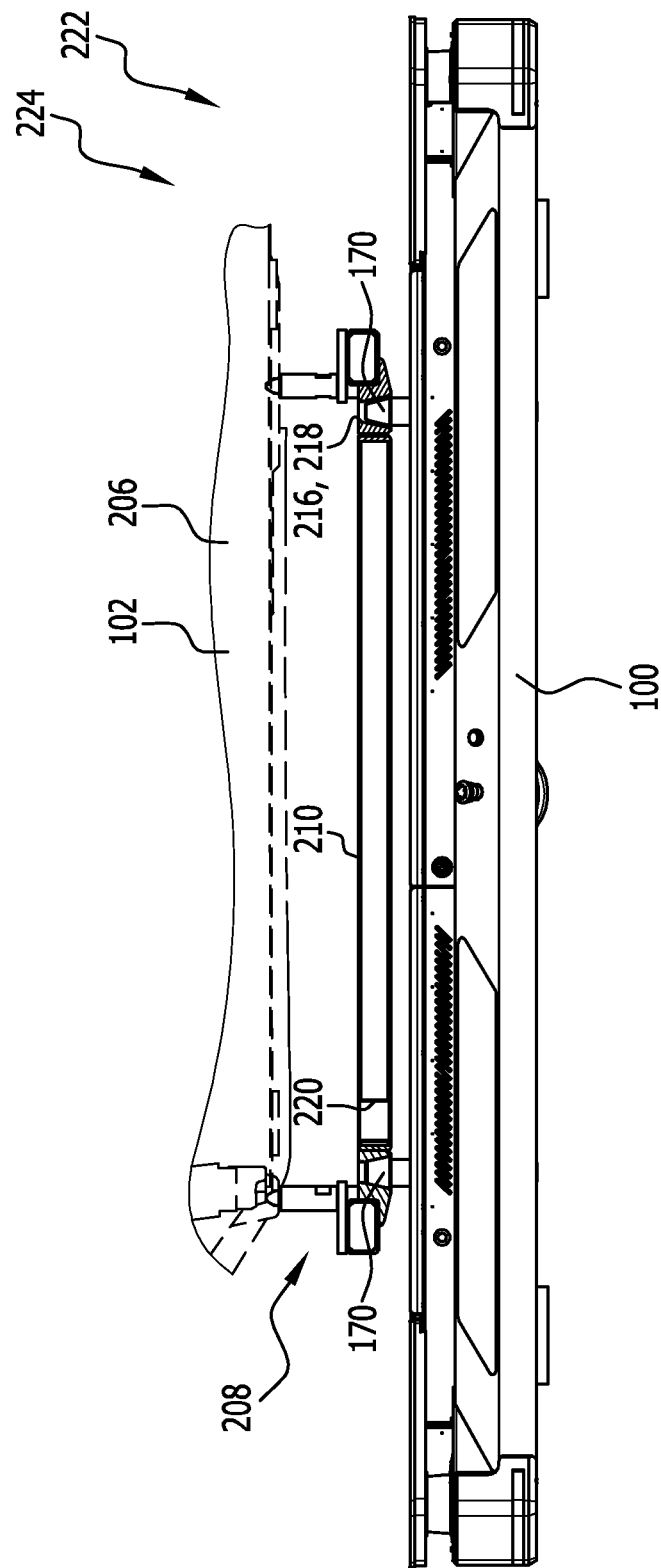
FIG. 11 shows a schematic side view of the vehicle from FIG. 1, the adapter device from FIG. 9 and an object (partially illustrated) that is arranged thereon.

A first embodiment, illustrated in FIGS. 1 to 8, of a vehicle that is designated 100 as a whole is in particular a driverless transport vehicle for transporting objects 102 (in this regards, see for example FIG. 11).

As can be seen in particular from FIGS. 1 to 8, the vehicle 100 comprises a substantially cuboid base body 104 that forms a structure for bearing the vehicle 100.

Further, the vehicle 100 comprises a chassis 106 that comprises a plurality of support rollers 108, for example four, and a drive device 110.

The support rollers 108 are arranged in particular in four corner regions 112 of the vehicle 100, on an underside 114 of the vehicle 100.

The support rollers 108 are in particular partly recessed into the base body 104 of the vehicle 100, with the result that the vehicle 100 has as small an overall height as possible.

The support rollers 108 are in particular mounted to be freely rotatable about 360°, about substantially vertical axes of rotation 116.

In particular, the support rollers 108 are non-driven wheels.

The drive device 110 comprises for example two drive elements 118 that take the form for example of drive wheels 120.

There is preferably associated with each drive element 118 a drive motor 122 of the drive device 110, such that the drive elements 118 are drivable independently of one another.

The drive motors 122 and the drive elements 118 are preferably rigidly connected to one another by means of an axis element 124.

In this arrangement, the drive elements 118 are mounted to be rotatable in particular at mutually opposite ends of the axis element 124.

The axis element 124 is mounted to be rotatable or pivotal on the base body 104 of the vehicle 100, by means of a bearing element 126 of the drive device 110.

For this purpose, the bearing element 126 is substantially C-shaped in form and/or comprises a central part 128 and two limbs 130 that project away from the central part 128 in the same direction.

An end of a limb 130 that is remote from the central part 128 preferably forms a bearing point 132 at which the bearing element 126 is mounted to be rotatable or pivotal on the base body 104 of the vehicle 100.

The further limb 130 of the bearing element 126 preferably interacts with a spring element 134 such that the pivotal movement and/or rotary movement of the bearing element 126 in relation to the bearing point 132, in particular about a bearing axis 136 that is predetermined by the bearing point 132, is a spring-loaded movement.

The bearing axis 136 is in particular substantially parallel to a main direction of travel 138 of the vehicle 100, this direction 138 preferably being at the same time parallel to a horizontal longitudinal centre axis 140 of the vehicle 100.

Provided in the central part 128 of the bearing element 126 is in particular a pivotal connection 142 for connecting the bearing element 126 to the axis element 124.

In particular, the axis element 124 is mounted to be pivotal on the bearing element 126 by means of the pivotal connection 142.

A pivot axis 144 about which the axis element 124 is pivotal in relation to the bearing element 126 is preferably parallel to the bearing axis 136 and/or parallel to the longitudinal centre axis 140 and/or parallel to the main direction of travel 138.

Moreover, the pivot axis 144 is preferably arranged substantially centrally between the two drive elements 118 and/or substantially centrally between the two drive motors 122.

Because the pivot axis 144 and the bearing axis 136 are offset parallel to one another, rotating the bearing element 126 about the bearing axis 136 can raise or lower the pivotal connection 142 and thus also the axis element 124 together with the drive elements 118 arranged thereon.

Figure 4:
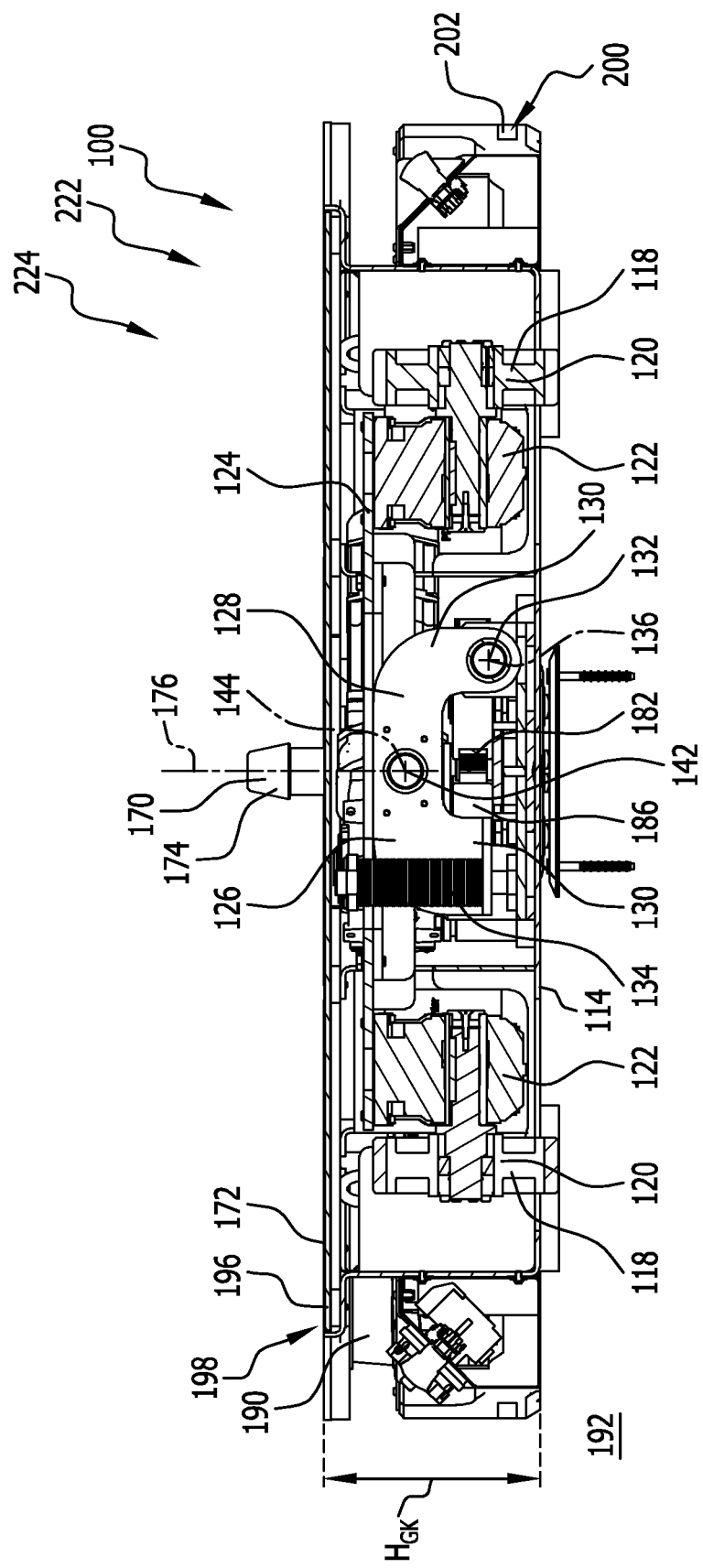
FIG. 4 shows a schematic vertical section through the vehicle from FIG. 1, along the line 4-4 in FIG. 3.

As can be seen in particular from FIG. 4, as a result, in particular the drive wheels 118 can be positioned such that they project out of the base body 104 by different extents.

Figure 2:
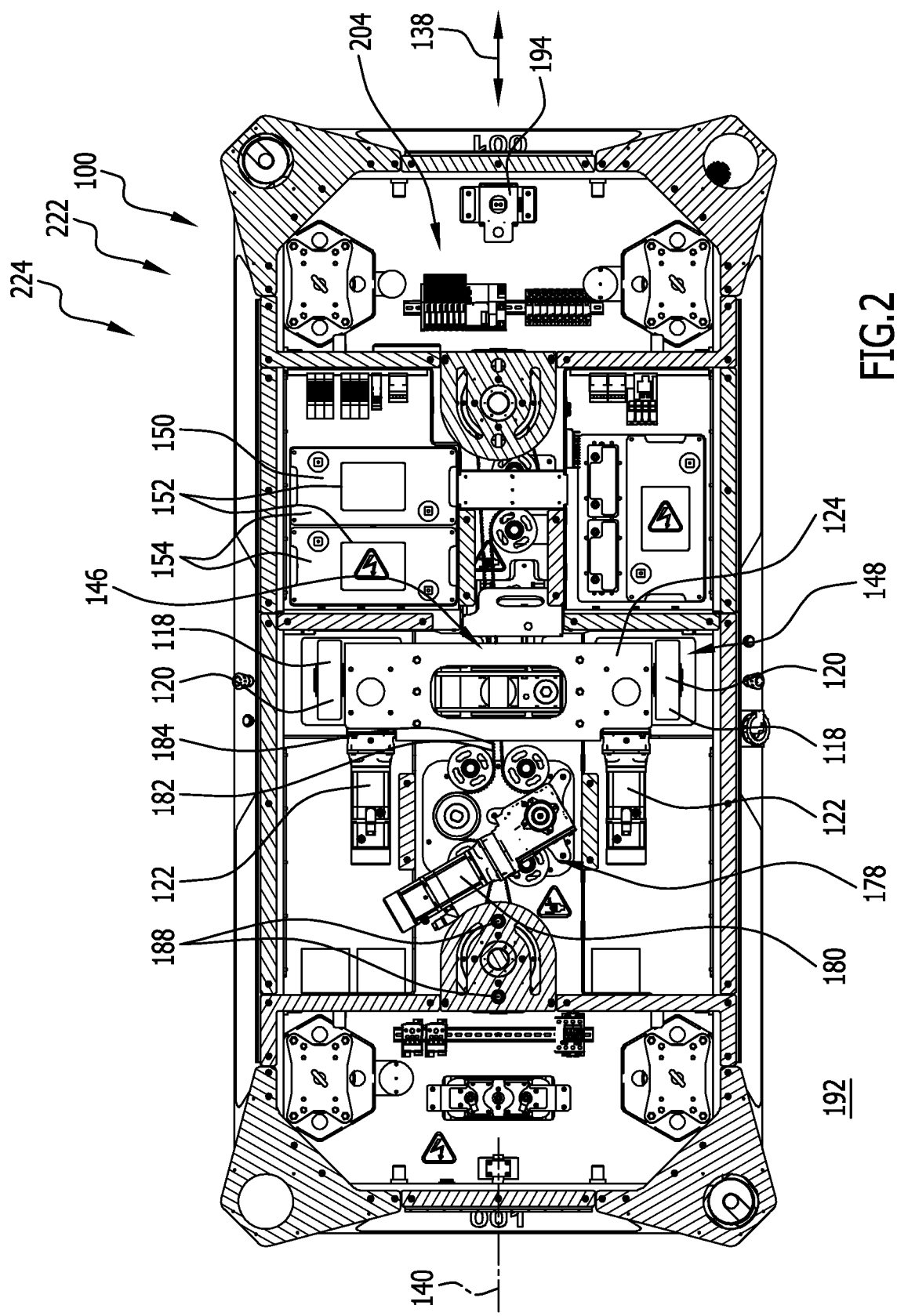
FIG. 2 shows a schematic horizontal section through the vehicle from FIG. 1.

An actuation device 146 that is visible for example in FIG. 2 preferably serves to adjust an orientation of rotation of the bearing element 126 about the bearing axis 136. In particular, this can be done by displacing the spring element 134 or displacing a mating piece that engages with the spring element 134.

Ultimately, the actuation device 146 can preferably be used to adjust how far out of the base body 104 the drive elements 118 project.

Because the drive device 110, in particular the axis element 124 and the drive elements 118, are arranged substantially centrally on the base body 104 in relation to the longitudinal centre axis 140 of the vehicle 100, the vehicle 100 can be manoeuvred particularly compactly. In particular, the vehicle 100 can be turned on the spot by driving the drive elements 118 in different directions of rotation by means of the respective drive motor 122.

As can be seen in particular from FIG. 4, the drive elements 118 are rigidly connected to one another by means of the axis element 124, with the result that a drive axis 148 formed thereby is substantially a rigid axle.

The drive motors 122 of the vehicle 100 are preferably supplied with electrical energy by an energy store 150 of the vehicle 100.

The energy store 150 comprises in particular a plurality of energy storage units 152, for example a plurality of super-capacitors 154.

The energy store 150 is chargeable by means of a charging device 156.

Figure 7:
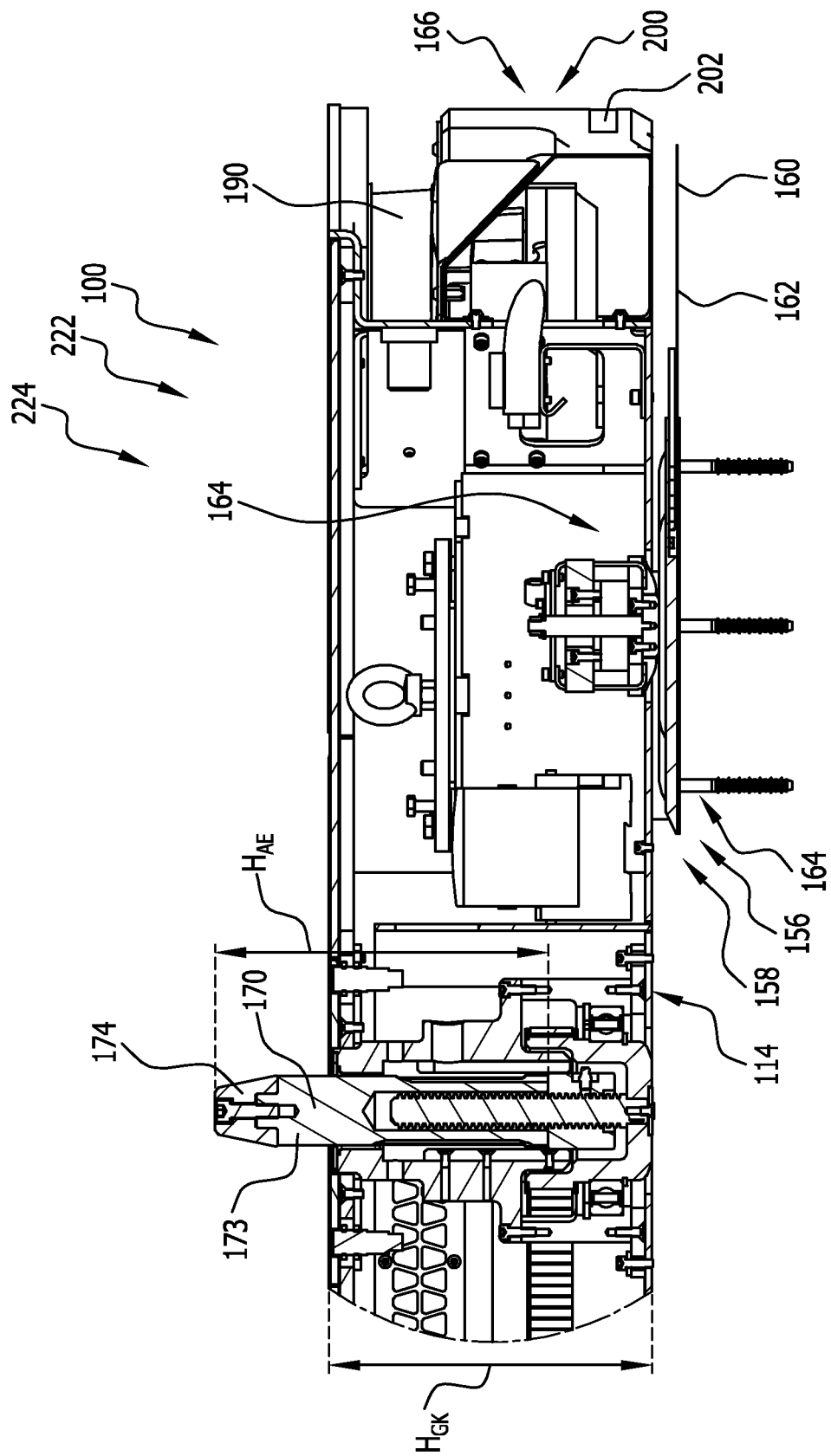
FIG. 7 shows an enlarged illustration of the region VII in FIG. 6.

The charging device 156 comprises in particular a charging region 158 that is arranged for example on a vehicle-accessible subsurface 160, in particular a factory floor 162 (see in particular FIGS. 4 and 7). The charging region 158 comprises in particular a charge connection point 164 that is secured for example to the vehicle-accessible subsurface 160, for example being screwed in place.

Figure 3:
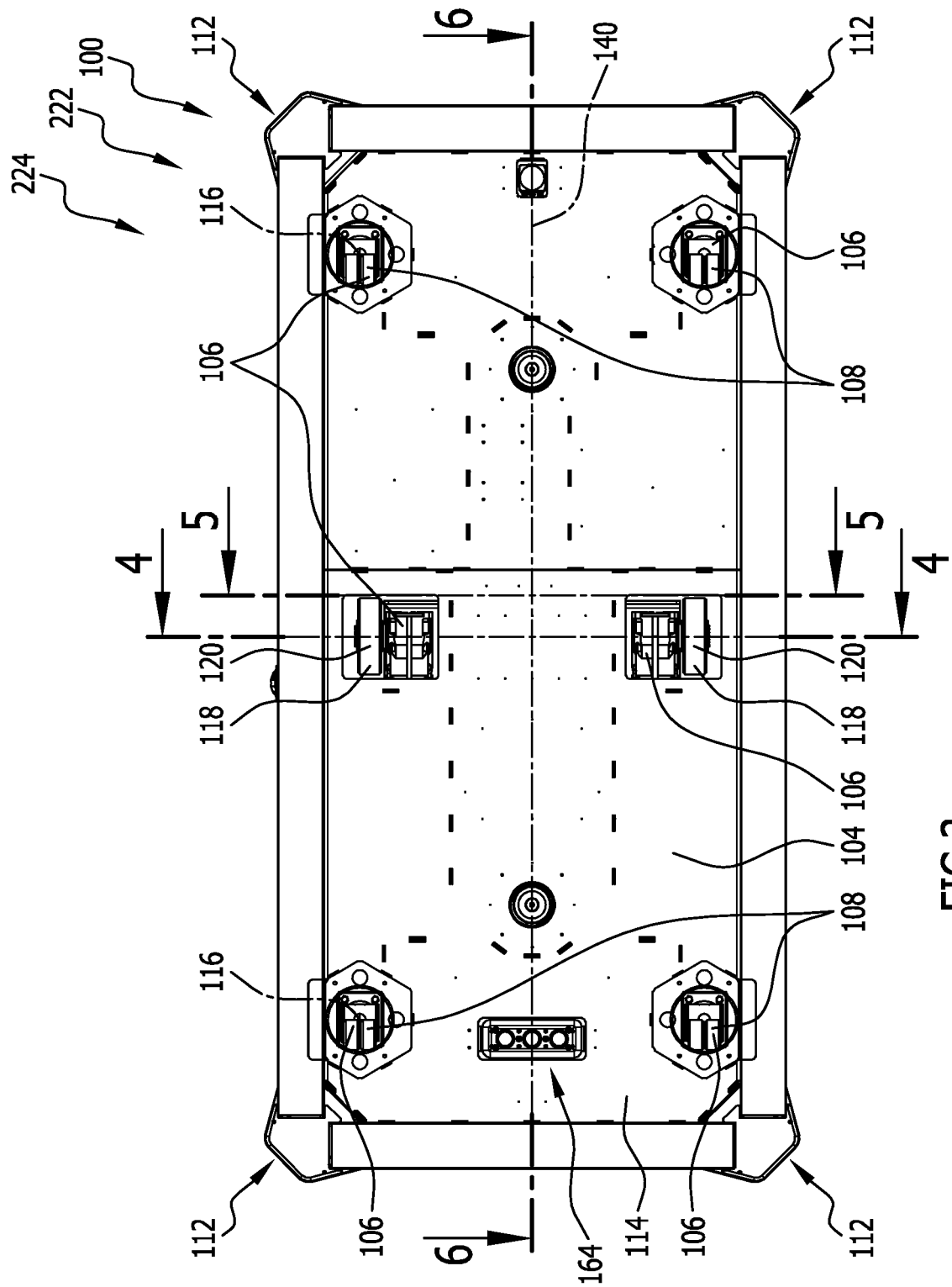
FIG. 3 shows a schematic plan view of an underside of the vehicle from FIG. 1.

A charge connection point 164 of the vehicle 100 that is couplable to the charge connection point 164 of the charging region 158 is preferably arranged on the vehicle, in particular on the underside 114 of the vehicle 100 (see for example FIG. 3).

The charge connection points 164 may for example have or form a sliding contact arrangement. Other mechanical or contactless variants for transfer are also conceivable. For example, an inductive transfer of energy may also be provided.

In an alternative embodiment (not illustrated) of the vehicle 100, one or more additional charge connection points 164 may be arranged and/or formed for example in a side wall 166 of the vehicle 100, in particular of the base body 104.

For example, conventional plug connections may be provided for connecting up a charge cable.

Further, as an alternative or in addition, a charge connection point 164 of the vehicle 100 may be provided on one or more receiving elements (described below).

As can be seen in particular from FIGS. 1, 2, 7 and 8, the vehicle 100 comprises a receiving device 168 by means of which one or more objects 102 are receivable.

In particular, the receiving device 168 comprises one or more, for example two, receiving elements 170 that project out of the base body 104 of the vehicle 100 at an upper side 172 thereof.

The receiving elements 170 in particular take the form of a rod or pin.

Preferably, the receiving elements 170 take a form that, at least in certain regions and/or at least approximately, is cylindrical, for example circle-cylindrical.

The receiving elements 170 preferably have a height HAE that corresponds at least approximately to a height HGK of the base body 104 of the vehicle 100.

Each receiving element 170 preferably comprises a shaft portion 173 adjoined by a receiving portion 174.

The receiving portion 174 preferably tapers in the opposite direction to that of gravity g—in cases where the vehicle 100 is on a horizontal plane and the upper side 172 of the base body 104 is oriented upwards.

Figure 7A:
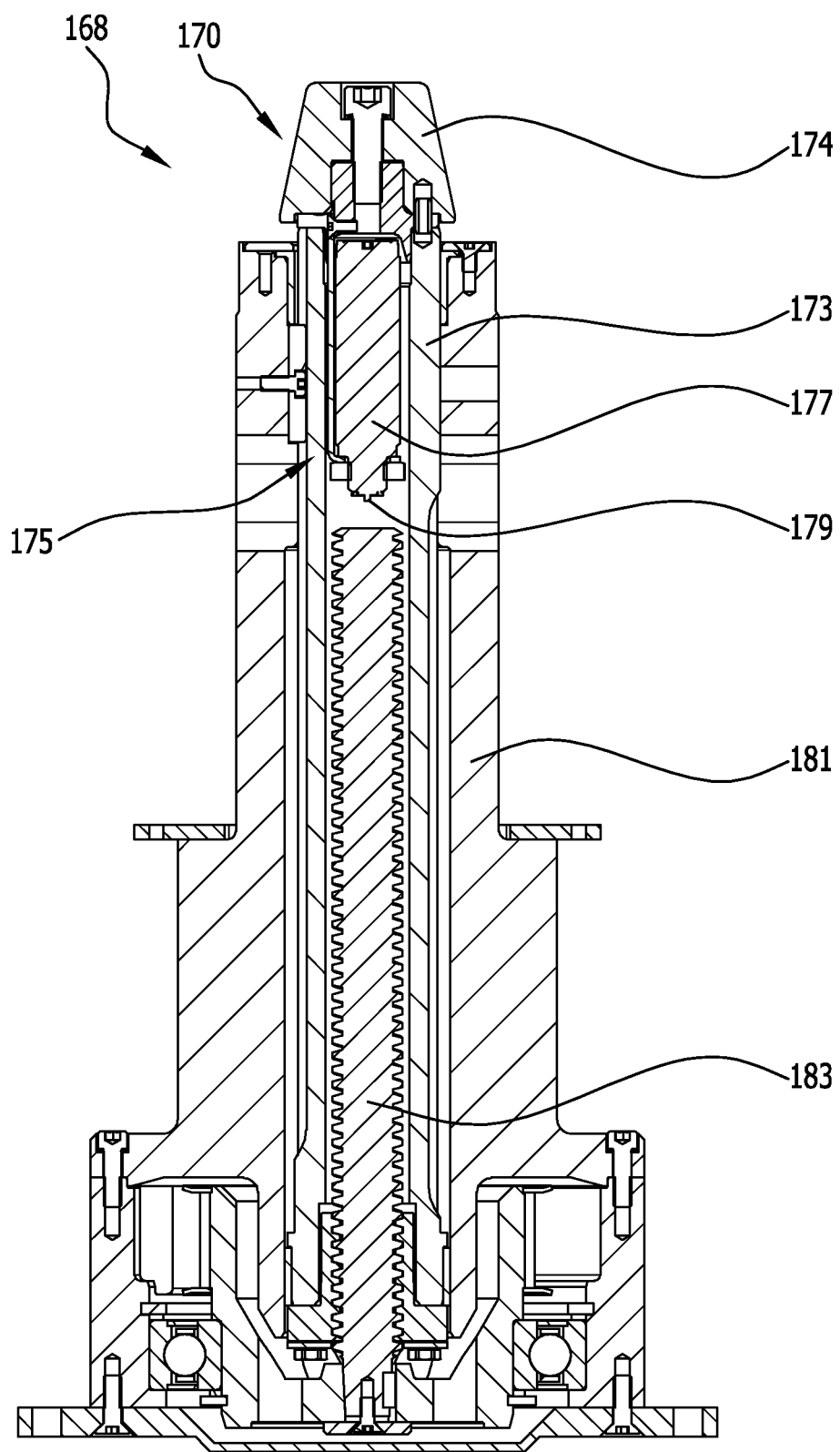
FIG. 7a shows a vertical section through an alternative embodiment of a receiving element of the vehicle.

As can be seen in particular from FIG. 7*a*, in an alternative embodiment of a receiving element 170 a lubricating device 175, which is for example integrated, may be provided.

The lubricating device 175 is preferably integrated into the receiving element 170, in particular into the shaft portion 173 and/or the receiving portion 174, for example being arranged entirely inside the shaft portion 173 and/or the receiving portion 174.

Preferably, the lubricating device 175 comprises a reservoir 177 for receiving lubricant, and a dispensing element 179 for the controllable supply of lubricant from the reservoir 177 to an object that is to be lubricated.

The object that is to be lubricated is in particular a part of a lifting drive device 178 for raising and/or lowering the receiving element 170 in relation to a foundation body 181 on or in which the receiving element 170 is arranged, in particular being displaceably mounted.

For example, it may be provided for the receiving element 170 to be arranged such that it is displaceable on the foundation body 181 by means of a spindle element 183, in particular being extendable out of the foundation body 181 and/or retractable into the foundation body 181.

Preferably, the lubricating device 175 takes a form such that the object that is to be lubricated, in particular the spindle element 183, is configured to have lubricant applied to it, in particular in order to ensure reliable lubrication thereof and thus a reliable lifting operation of the receiving element 170.

For this purpose, the dispensing element 179 is in particular demand-controlled and/or time-controlled, for example by means of a timing element. For example, it may be provided for the dispensing element 179 to be activated automatically after a predetermined number of lifting cycles of the receiving element 170, in order to ensure regular dispensing of lubricant to the object that is to be lubricated, in particular the spindle element 183.

The dispensing element 179 may in particular be a valve, which is arranged on an underside of the reservoir 177 and/or is directed towards the object that is to be lubricated, and which can be opened and closed as required (see FIG. 7*a*).

The lubricating device 175, in particular the reservoir 177 and/or the dispensing element 179, is preferably accessible, for example from above, through the receiving portion 174 and/or by removing the receiving portion 174, in particular for replacement and/or topping up with further lubricant.

Figure 6:
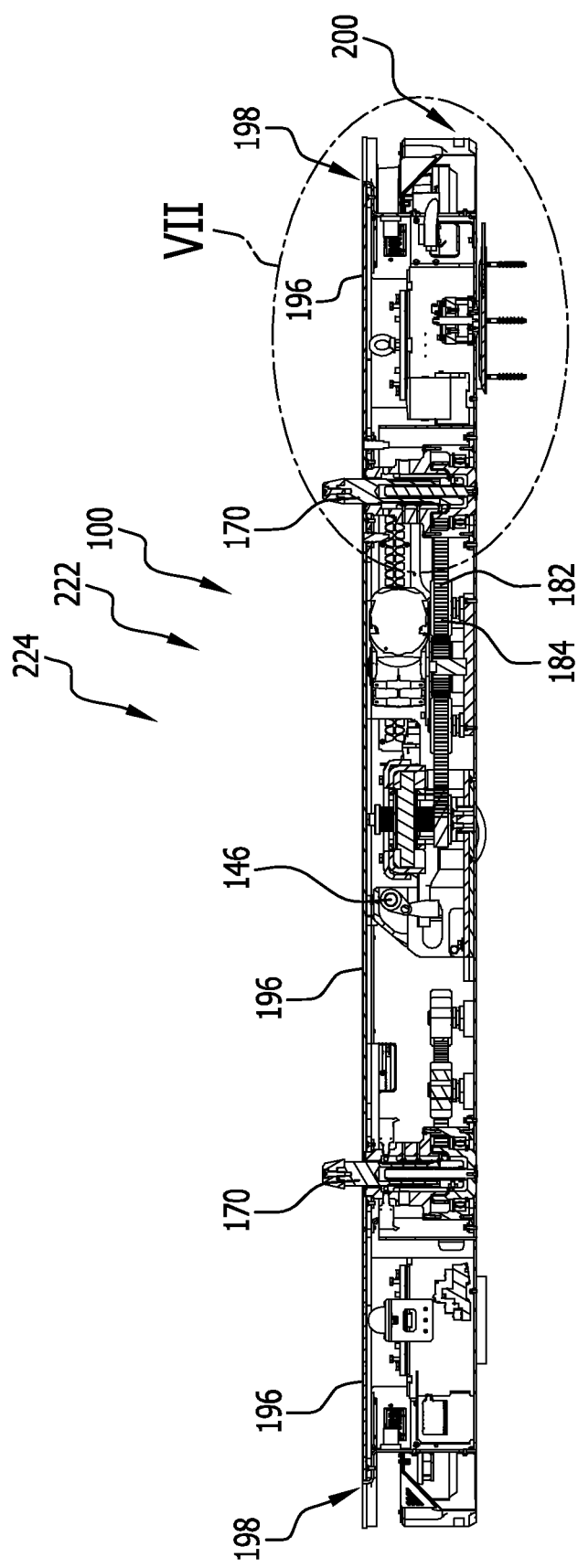
FIG. 6 shows a schematic vertical section through the vehicle from FIG. 1, along the line 6-6 in FIG. 3.

As can be seen in particular from FIGS. 4 and 6, the receiving elements 170 are arranged such that their centre axes lie on a vertical longitudinal centre plane 176 of the vehicle 100.

In particular by means of a lifting drive device 178, the receiving elements 170 are movable, in particular are extendable upwards out of the base body 104 and are at least partly retractable again.

For this purpose, the lifting drive device 178 comprises in particular a lifting drive motor 180 that is for example an electric motor and is drivable using energy from the energy store 150.

Further, the lifting drive device 178 comprises a lifting drive element 182, for example a lifting drive belt 184, by means of which the receiving elements 170 are coupled to one another and moreover to the lifting drive motor 180.

The two receiving elements 170 are thus movable in particular jointly by means of the lifting drive motor 180.

Because the receiving elements 170 are preferably arranged along the longitudinal centre axis 140 of the vehicle 100 on mutually opposite sides of the drive device 110, it is advantageous for the purpose of permanently coupling the two receiving elements 170 by means of the lifting drive element 182 if the lifting drive element 182 extends as far as both the one and the other receiving element 170.

Figure 8:
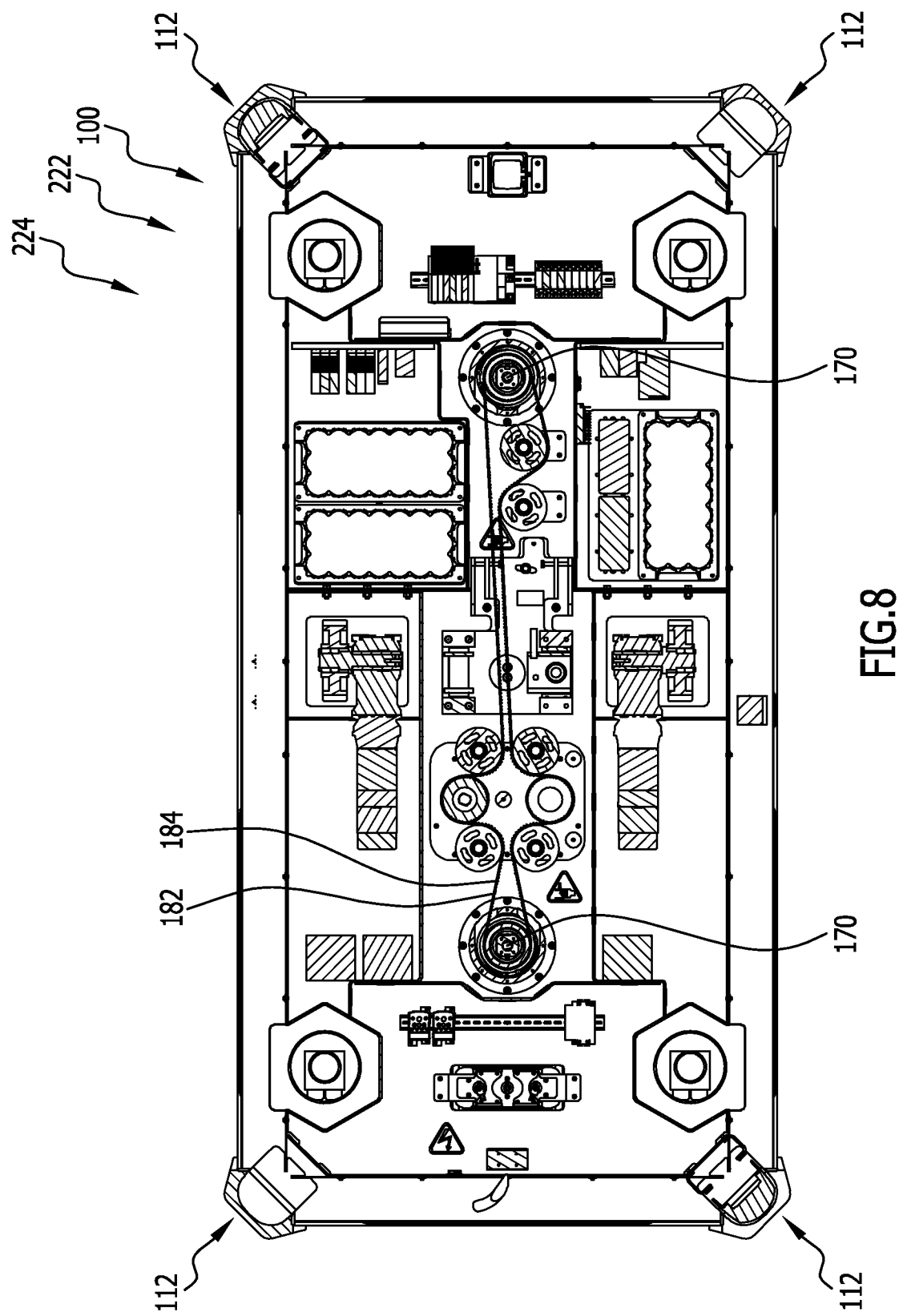
FIG. 8 shows a schematic horizontal section through the vehicle from FIG. 1, along the line 8-8 in FIG. 5.

As can be seen in particular from FIG. 8, the lifting drive element 182, which takes the form for example of a lifting drive belt 184, is for this purpose guided through the drive device 110.

In so doing, the lifting drive element 182 extends in particular through an intermediate space 186 that is formed between the two limbs 130 of the bearing element 126.

In relation to the axis element 124 and/or the bearing element 126, it can moreover be seen from FIG. 4 that the lifting drive element 182 preferably also extends below the drive device 110.

Thus, the receiving elements 170 are mechanically coupled in a particularly simple manner, as a result of which reliable actuation thereof is possible for the purpose of receiving one or more objects 102.

Preferably, the vehicle 100 comprises one or more receiving sensors 188 which are configured to detect whether an object 102 and/or an adapter device (described below) is arranged on the vehicle 100.

Figure 1:
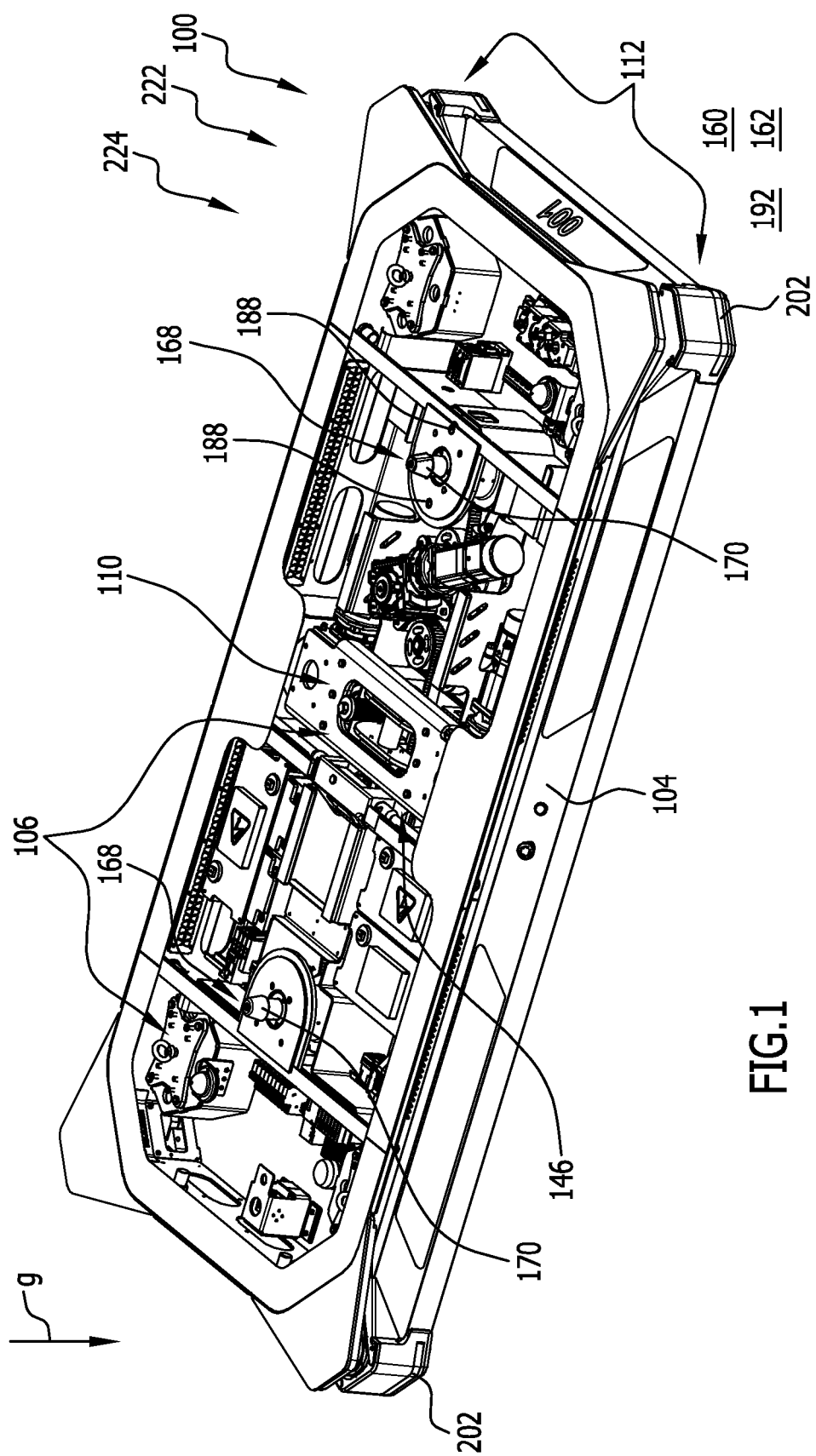
FIG. 1 shows a schematic perspective illustration of a first embodiment of a vehicle.

The receiving sensors 188 are in particular arranged along the longitudinal centre axis 140 of the vehicle 100, in front of and behind one of the receiving elements 170 (see in particular FIGS. 1 and 2).

More detail is given about the detection method below, in connection with the description of the adapter device.

Figure 5:
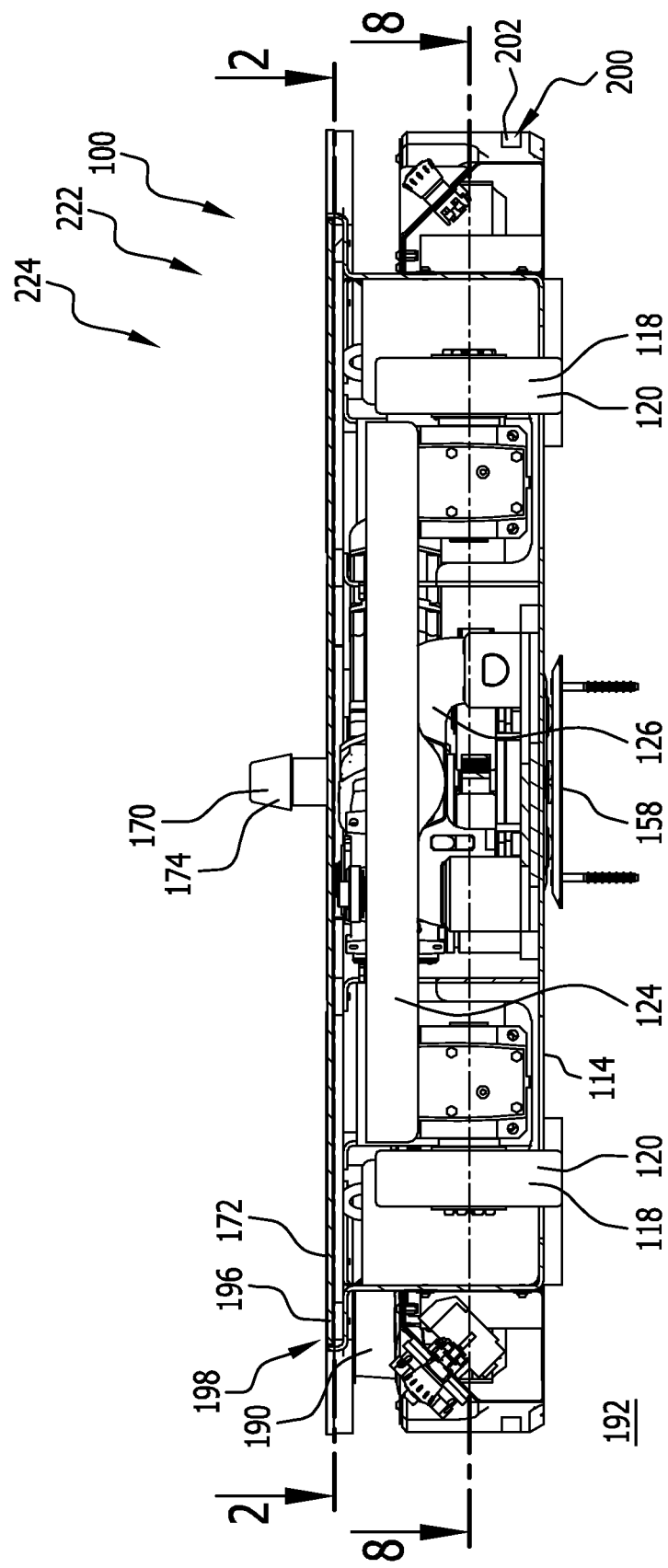
FIG. 5 shows a schematic vertical section through the vehicle from FIG. 1, along the line 5-5 in FIG. 3.

As can be seen in particular from FIG. 5, the vehicle 100 comprises one or more sensor devices 190 that are arranged in particular in corner regions 112 of the vehicle 100, in particular of the base body 104.

In particular, in each case exactly one sensor device 190 is provided at two corner regions 112 that are diametrically opposite one another.

By means of the sensor devices 190, it is possible for an area 192 surrounding the vehicle 100 to be monitored, in particular in order to enable an autonomous driving mode of the vehicle 100.

Moreover, there may be provided for example on an upper side 172 of the base body 104 a barcode reader 194 by means of which for example information on an object 102 that is arranged or to be arranged on the vehicle 100 is detectable, in particular by scanning a barcode that is arranged for example on the object 102 and/or on the adapter device.

The base body 104 is preferably provided with a cover 196 on its upper side 172.

The cover 196 is in particular a plate that is placed on and lies on a placement region 198 that runs peripherally in a closed ring and closes substantially flush with the placement region 198.

This means that the cover 196 is preferably also positioned on the base body 104 without any additional securing elements, in particular without enabling the cover 196 to be raised away by unauthorised persons without tools.

The cover 196 is preferably transparent, for example transparently tinted.

Thus, components of the vehicle 100 that are arranged within the base body 104 are preferably identifiable through the cover 196.

The transparent form taken by the cover 196 may in particular have the effect of warning off or inhibiting, to dissuade persons from stepping onto the upper side 172 of the base body 104. As a result, for example safety during operation of the vehicle 100 can be optimised.

Further, the vehicle 100 preferably comprises a warning device 200 which, in the event that a disruptive object—such as a person on a drive path—is detected by the sensor device 190, can emit a warning.

The warning device 200 is for example an acoustic warning device and/or a visual warning device by means of which accordingly an acoustic warning signal such as a warning sound or a warning announcement and/or a visual warning signal such as a flashing light is generated and can be emitted to the surrounding area.

For example, for the purpose of an acoustic warning one or more display elements 202 of the vehicle 100 can generate a flashing warning signal.

The vehicle 100, in particular individual, a plurality or all of the above-mentioned components, are preferably controllable by means of a control device 204 of the vehicle 100.

Here, the control device 204 can in particular act entirely autonomously or alternatively communicate with a higher-level control installation.

Objects 102 may be arranged for example directly on the vehicle 100, for example on the receiving elements 170.

In particular for the purpose of arranging large and/or heavy objects 102 such as vehicle bodies 206, the use of an adapter device 208 may on the other hand be advantageous.

Figure 9:
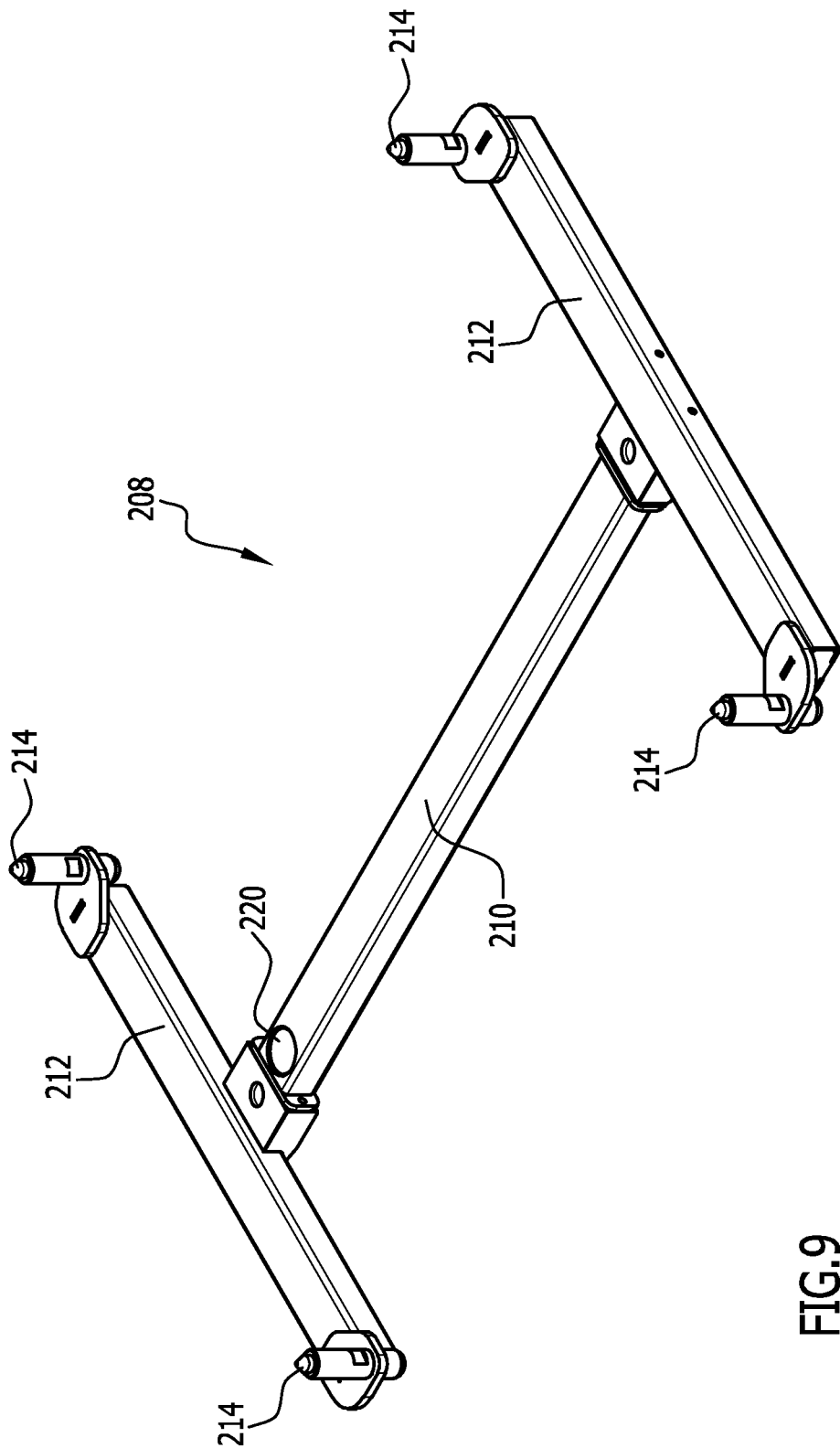
FIG. 9 shows a schematic perspective illustration of an adapter device that is positionable on the vehicle from FIG. 1 and serves to receive an object.
Figure 10:
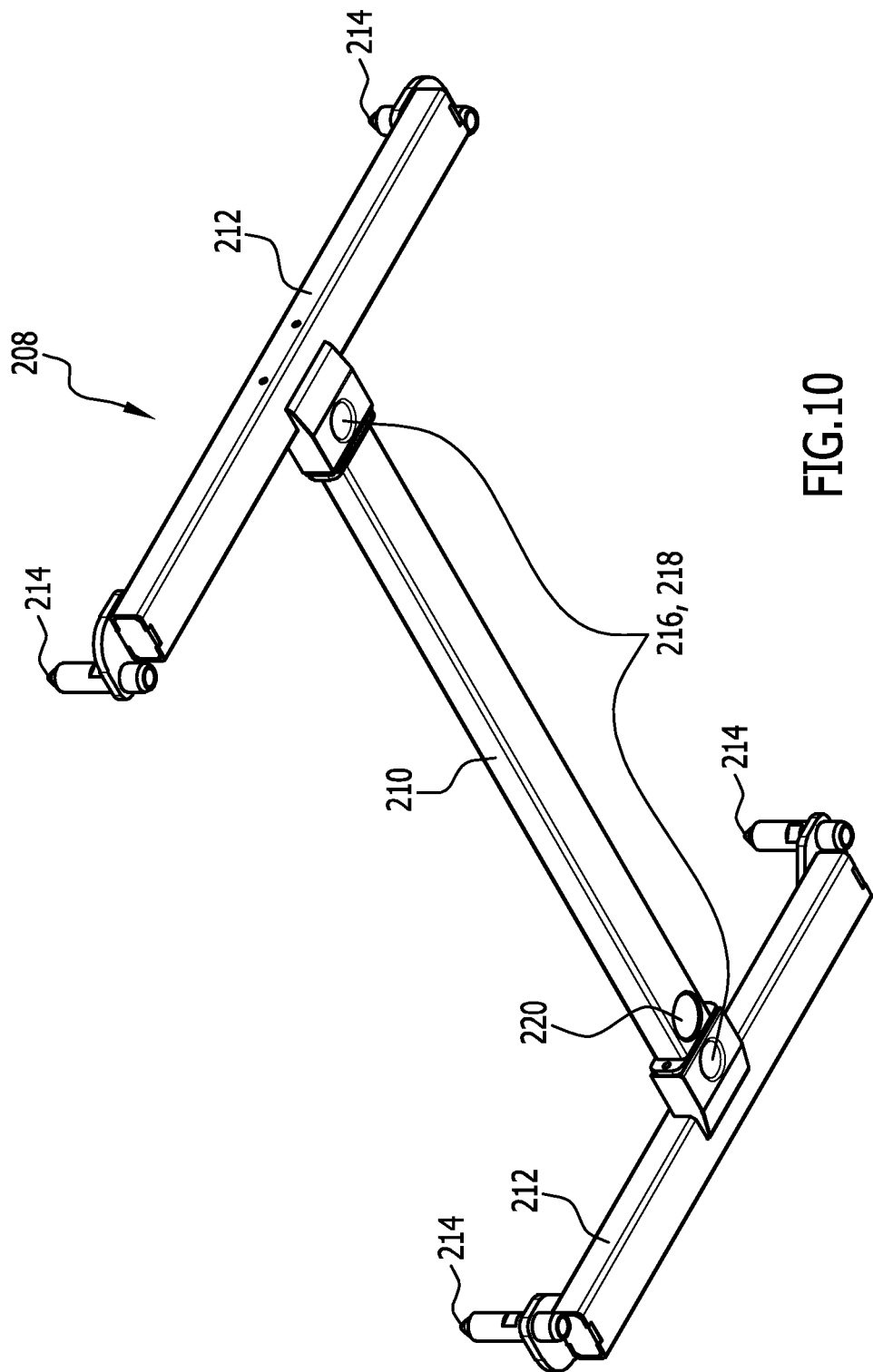
FIG. 10 shows a further schematic perspective illustration of the adapter device from FIG. 9.

An adapter device 208 is illustrated by way of example in FIGS. 9 to 11.

The adapter device 208 comprises in particular a central element 210 that connects two or more than two adapter elements 212 to one another.

The adapter elements 212 are adapted to the object 102 to be conveyed. For example, each adapter element 212 has respectively one, two or more than two receiving pins 214 that project upwards for example in the opposite direction to that of gravity g and, for the purpose of receiving an object 102 that takes the form for example of a vehicle body 206, engages with the underside thereof.

In respect of geometry, size, number and/or form of the receiving pins 214, the adapter elements 212 are adapted to the objects 102 to be conveyed.

As can be seen in particular from FIG. 10, the adapter device 208 is provided with two engagement regions 216, for example introduction openings 218, in which the receiving elements 170, in particular the receiving portions 174 of the receiving elements 170, can engage.

The introduction openings 218 in particular take a conically tapering form in order to make a stable connection between the adapter device 208 and the receiving elements 170.

In the embodiment of the adapter device 208 illustrated in FIGS. 9 to 11, the engagement regions 216, in particular the introduction openings 218, are arranged in the adapter elements 212. However, it may also be provided for them to be provided and/or formed in the central element 210.

As can further be seen from FIGS. 9 and 10, the adapter device 208 comprises a detection aid 220 that takes the form for example of a penetration opening. The detection aid 220 is arranged, in particular with respect to a longitudinal direction of the adapter device 208, in front of or behind an engagement region 216, in particular an introduction opening 218, in particular at the same spacing as that between one or both receiving sensors 188 and a receiving element 170 of the vehicle 100.

Because only one detection aid 220 is provided, it is possible for the receiving sensors 188 to monitor whether the adapter device 208 is arranged in a correct rotational orientation on the vehicle 100, since either the detection aid 220 (that is to say, in the case of a penetration opening, the absence of an item arranged directly above the receiving sensor 188) or alternatively the central element 210 is detectable, depending on whether the adapter device 208 is arranged in a desired orientation on the vehicle 100 or not.

By means of the further receiving sensor 188 that is not associated with the detection aid 220, it is preferably possible to monitor the presence of an adapter element 212, as a result of which it is determinable whether or not an adapter device 208 is arranged on the vehicle 100 at all.

It goes without saying that numerous further detection variants are conceivable, for example the use of contact-making sensors on the receiving element 170, in particular the receiving portion 174, in order to make a mechanical or electrical contact for the purpose of detecting and/or monitoring the adapter device 208.

The vehicle 100 is in particular a constituent part of a conveying device 222.

The conveying device 222 comprises in particular a plurality of vehicles 100 that are substantially identical in form.

The conveying device 222 is for example a constituent part of a processing installation 224, in particular an installation for manufacturing motor vehicles.

In particular if the conveying device 222 comprises numerous vehicles 100 all of which are substantially floor-based, it may be advantageous to stack the vehicles 100 at least temporarily.

Figure 12:
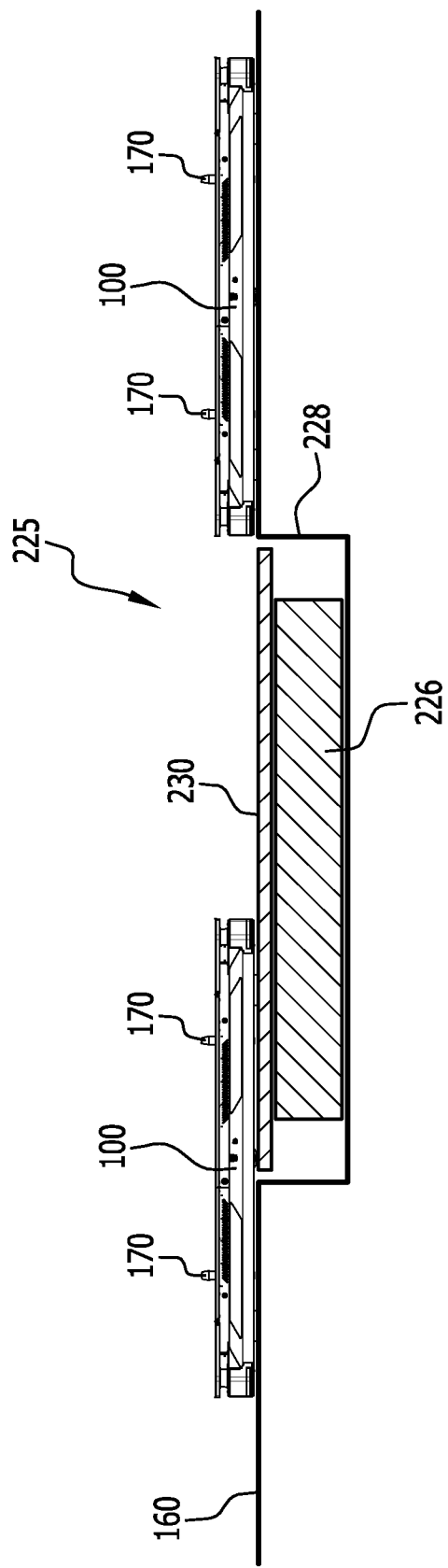
FIG. 12 shows a schematic side view of a stacking device for stacking and/or unstacking vehicles.
Figure 13:
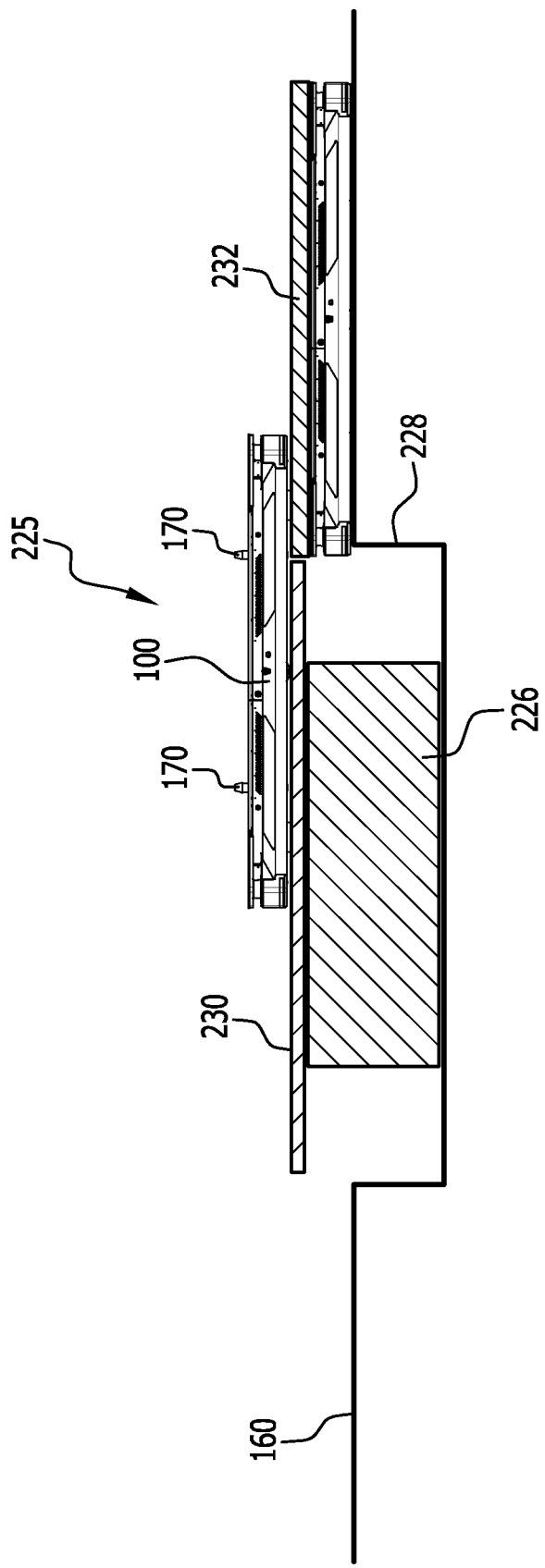
FIG. 13 shows a schematic illustration, corresponding to FIG. 12, of the stacking device, wherein a lifting unit of the stacking device is arranged in a raised position.

For this reason, the conveying device 222 preferably comprises a stacking device 225 that is illustrated by way of example in FIGS. 12 and 13.

The stacking device 225 in particular comprises a lifting unit 226 that makes it possible to raise one or more vehicles 100 to different vertical levels.

For this purpose, the lifting unit 226 is arranged for example in a recess 228 and comprises for example a lifting floor 230, which is preferably positionable substantially flush with a vehicle-accessible subsurface 160.

In this way, a vehicle 100 can drive in particular off the vehicle-accessible subsurface 160 and directly onto the lifting floor 230 of the stacking device 225.

The vehicle 100 can then be raised in particular by means of the lifting unit 226.

A further vehicle 100, arranged in particular directly next to the recess 228 and/or directly next to the lifting unit 226, then forms the base of a stack of a plurality of vehicles 100.

As can be seen in particular from FIG. 13, the vehicle 100 driven onto the lifting floor 230 can, once it has been raised by the lifting unit 226, be driven onto the vehicle 100 arranged next to it and thus be stacked on the other vehicle.

Depending on how far one or more receiving elements 170 project out of the upper side 172 of the base body 104 of the respective vehicle 100, these receiving elements 170 may be an obstacle to stacking.

For this reason, in one embodiment it may be advantageous if one or more intermediate elements 232 are placed on the vehicle 100 that forms the base of the stack of vehicles 100, in order to enable the further vehicle 100 then to travel onto it.

The vehicles 100 that are stacked on one another are preferably connectable to one another by means of one or more safety devices (not illustrated). For example, the receiving elements 170 of the lower vehicle 100 could be extended in order to engage in corresponding engagement regions on an underside 114 of the upper vehicle 100 and thus fix the vehicles 100 in relation to one another.

It goes without saying that more than only two vehicles 100 are stackable on one another by means of the stacking device 225.

Moreover, a plurality of vehicles 100 that are stacked on one another are unstackable in the reverse order. This may be advantageous in particular for transporting the vehicles 100 from a site where they are manufactured to a site where they are used, in order to minimise the transport area required for transport.

Preferably, the conveying device 222 comprises one or more stations 234 to which the objects 102 are conveyable by means of a plurality of vehicles 100.

The stations 234 are in particular processing stations 236 if the conveying device 222 is a constituent part of a processing installation 224.

For example, there are arranged in the processing stations 236 one or more robots 238 for treating a surface of the objects 102, in particular the vehicle bodies 206.

As an alternative or in addition to robots 238, it is also possible for the processing stations 236 to be provided for manual functions.

Figure 14:
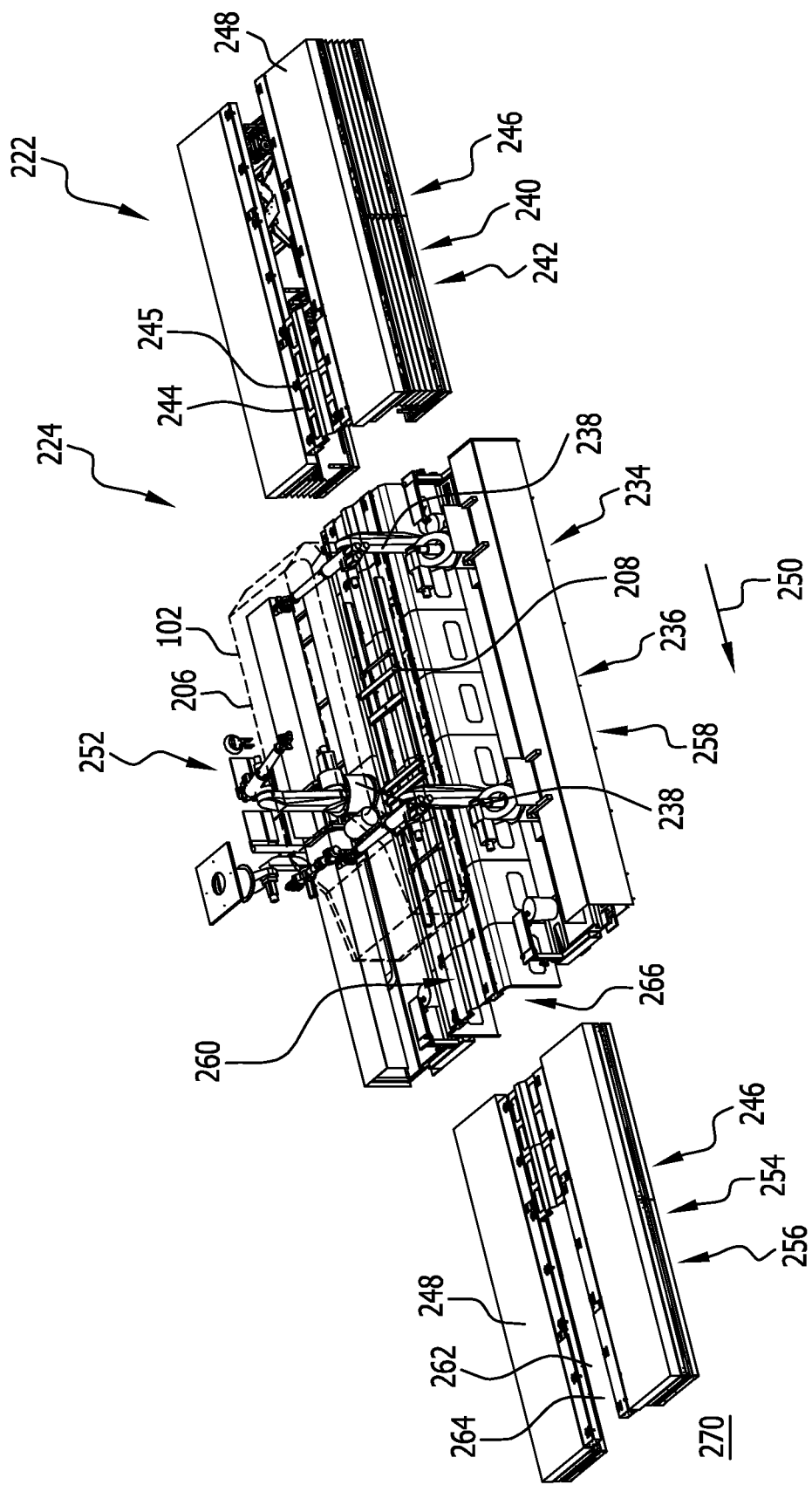
FIG. 14 shows a schematic perspective illustration of parts of a conveying device that is used in a processing installation.
Figure 15:
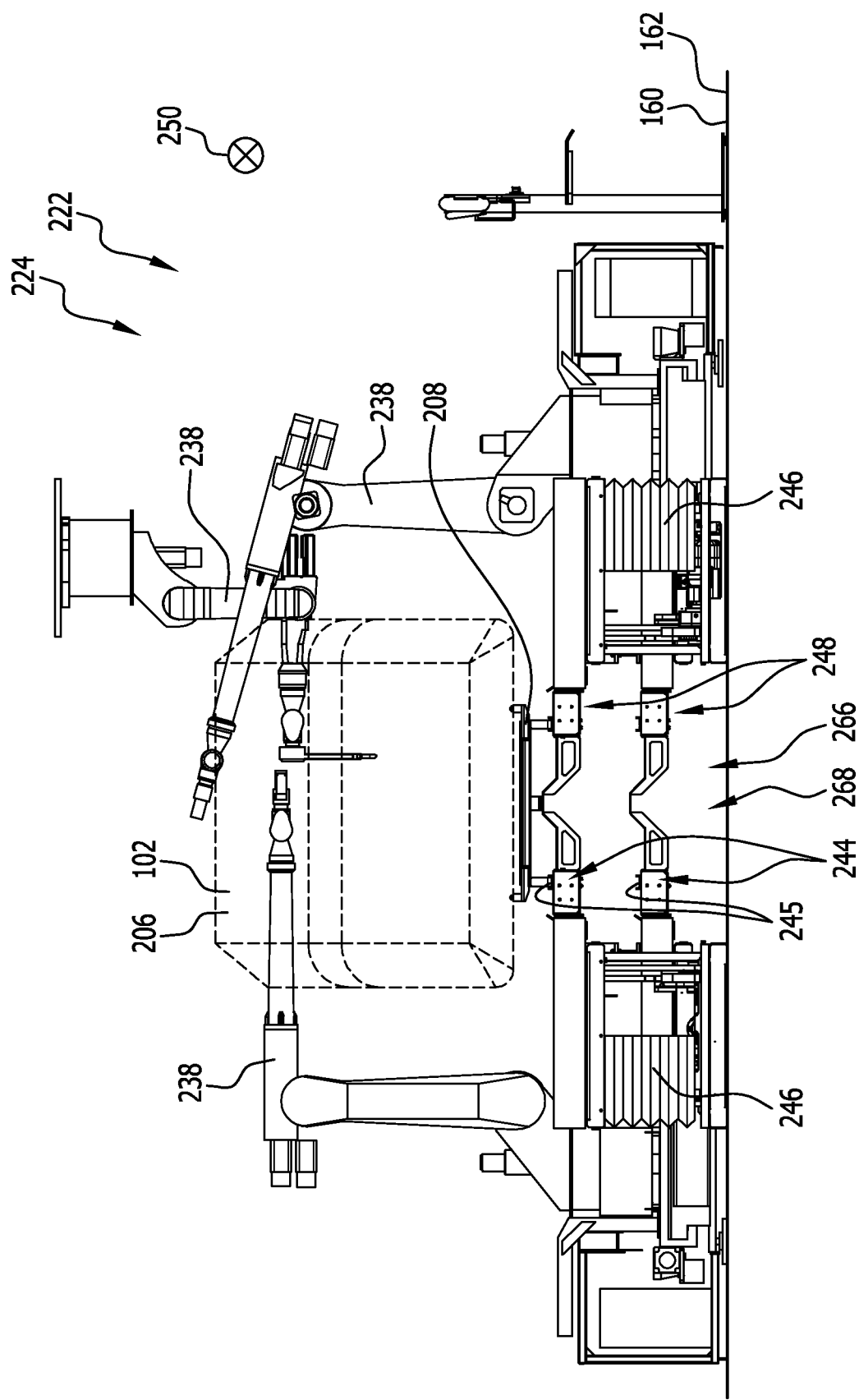
FIG. 15 shows a schematic plan view of a front end of the conveying device from FIG. 14, with the direction of view along the conveying direction.

As can be seen in particular from FIGS. 14 and 15, a station 234 preferably comprises a first location 240, which is in particular a discharge location 242 and serves to transfer an object 102 from a vehicle 100 to a station conveying device 244.

The station conveying device 244 is in particular a roller track 245. In addition or as an alternative, a chain conveyor and/or a rail-borne conveyor may be provided.

The station 234 comprises, at the first location 240, in particular a lifting device 246 by means of which the station conveying device 244 is raisable and lowerable in order to raise the object 102 away from the vehicle 100.

As an alternative or in addition, it may be provided for the receiving elements 170 of the vehicle 100 to be lowered when the vehicle 100 is arranged at the first location 240, in order to deposit the object 102 on the station conveying device 244 and thus to transfer it to the station conveying device 244.

As can be seen in particular from FIG. 15, the station 234 in particular comprises one or more partitioning floors 248 that are arranged above a vehicle-accessible subsurface 160, in particular above a factory floor 162, and below which the vehicle 100 can pass.

The object 102 is by contrast arranged above the partitioning floor 248.

The station conveying device 244 is in particular integrated into the partitioning floor 248.

Thus, in the first location 240 in particular the partitioning floor 248 can be raised or lowered by means of the lifting device 246 in order to raise the object 102 away from the vehicle 100.

The object 102 is conveyable through the processing station 236 in particular in the conveying direction 250 by means of the station conveying device 244.

In particular, the object 102 is conveyable from the first location 240, through a processing region 252 of the processing station 236, and to a second location 254 of the station 234.

The second location 254 is in particular a receiving location 256 at which the object 102 is transferable from the station conveying device 244 to a vehicle 100 that is to say the object 102 is receivable by the vehicle 100.

The second location 254 is also provided in particular with a lifting device 246 in order to raise and lower the partitioning floor 248, which is also provided at the second location 254, in order ultimately to transfer the object 102 to the vehicle 100.

The three-part representation of the station 234 in FIGS. 14 and 15 serves to provide a simplified illustration of the functionally different locations. It goes without saying that, in a real embodiment of the conveying device 222, the station conveying device 244 is uninterrupted in form in order, also in reality, to convey the object 102 from the first location 240 to the second location 254.

In the intermediate location 258 that is formed between the first location 240 and the second location 254 by the processing region 252, the vehicle body 206 is processable, in particular treatable.

In particular, a surface treatment, sealing of seams and/or inspection of the object 102 may be carried out by means of one or more robots 238 and/or by means of manual processing.

In particular if it is possible for contamination to occur in the processing region 252, it may be advantageous if the partitioning floor 248 takes a closed form, at least in the processing region 252. Thus, the partitioning floor 248 comprises a closed section 260 that extends along the conveying direction 250, in particular over an entire length of the processing region 252.

At the first location 240 and/or the second location 254, the partitioning floor 248 preferably has a penetration region 262 that takes the form in particular of a penetration slot 264 and extends along the conveying direction 250.

In particular, one or more receiving elements 170 of the vehicle 100 can project through this penetration region 262, in order to position the object 102 above the partitioning floor 248 while the vehicle 100 is being moved below the partitioning floor 248.

In particular when the receiving elements 170 are retracted, the vehicle 100 may also pass through below the closed section 260 of the partitioning floor 248 without risking collision with the partitioning floor 248.

For this purpose, the partitioning floor 248 has in particular an elevated portion that is for example triangular in cross section and extends along the conveying direction 250, and thus provides a free space for the receiving elements 170 below the partitioning floor 248.

The region below the partitioning floor 248 is in particular a travel space 266 that is not accessible to persons.

Thus, there is no danger from the vehicles 100 in this travel space 266, so the vehicles 100 are configured for example to travel at relatively high speed.

The region below the partitioning floor 248 may thus in particular be an express region 268, in which the vehicles 100 are operable in an express mode.

Outside the station 234, in particular when there are persons in the area surrounding a vehicle 100 with no spatial separation therefrom, this vehicle 100 is preferably operable in a safety mode. The region outside the express region 268 is thus in particular a safety region 270.

As can further be seen from FIGS. 14 and 15, the adapter device 208 may also take the form of a skid, in particular in order to enable simple conveying of the object 102 on a station conveying device 244 that takes the form of a roller track 245.

One or more engagement regions 216, in particular the introduction opening 218, are then preferably arranged and/or formed on a cross strut, or a central element arranged on cross struts, of the adapter device 208 that takes the form of a skid.

With a view to efficient utilisation of the vehicles 100 in the conveying device 222, it may be advantageous if, for the purpose of conveying an object 102, the vehicle 100 is not permanently associated with the same object 102.

For example, utilisation of the vehicle may be optimised in that an object 102 that is to be conveyed by a vehicle 100 and is at the first location 240 of a station 234 is transferred to the station conveying device 244. An object 102 which has previously been transferred to the station conveying device 244 and which has already been processed in the processing station 236 and conveyed to the second location 254 by means of the station conveying device 244 can now be received and transported further by this vehicle 100.

In this way, the vehicle 100 preferably skips at least one cycle when conveying the objects 102 through the station 234.

Figure 16:
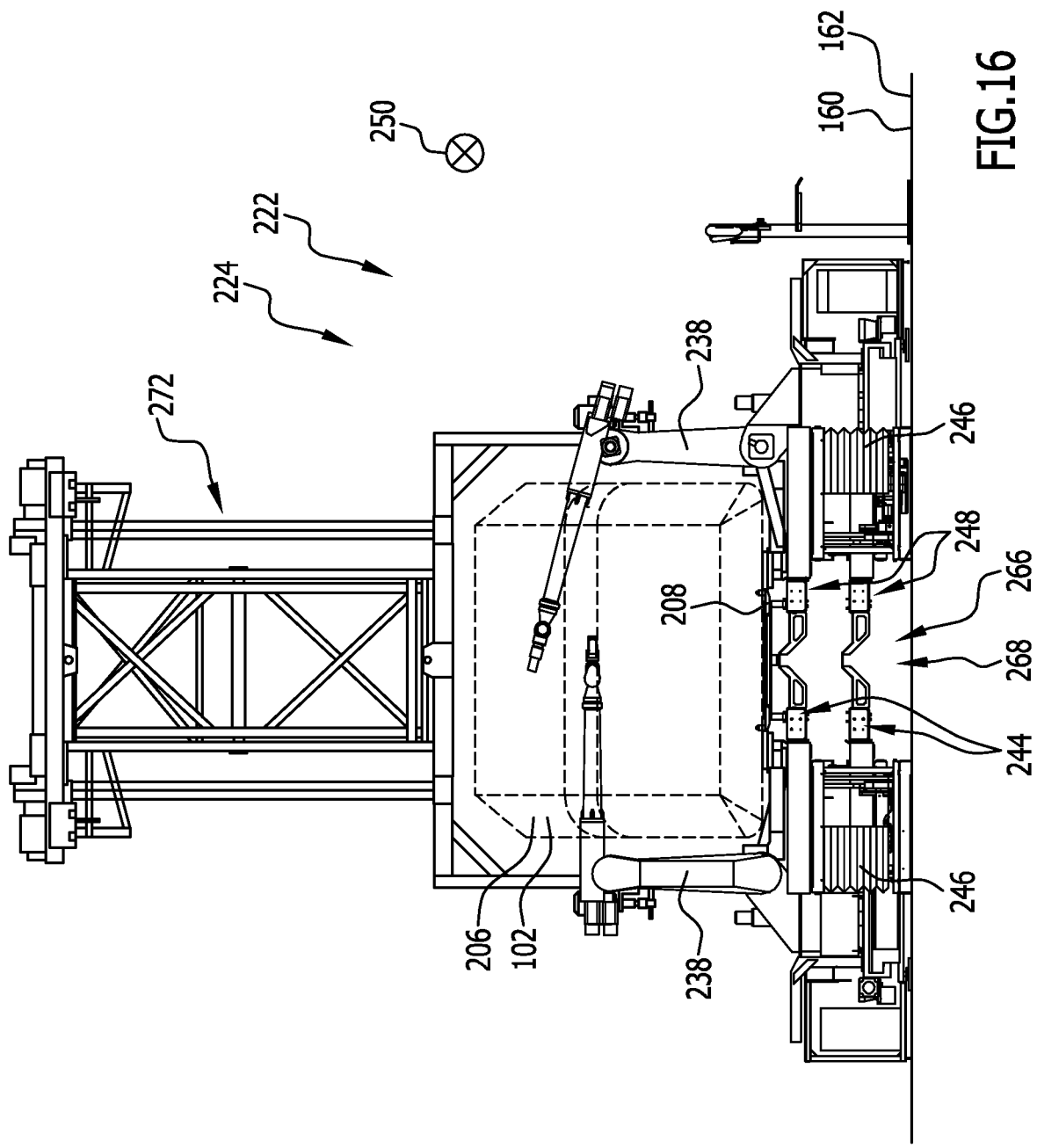
FIG. 16 shows a schematic illustration, corresponding to FIG. 15, of an alternative embodiment of a conveying device, in which an overhead conveyor is provided as the station conveying device, wherein the overhead conveyor is arranged in a lowered position.
Figure 17:
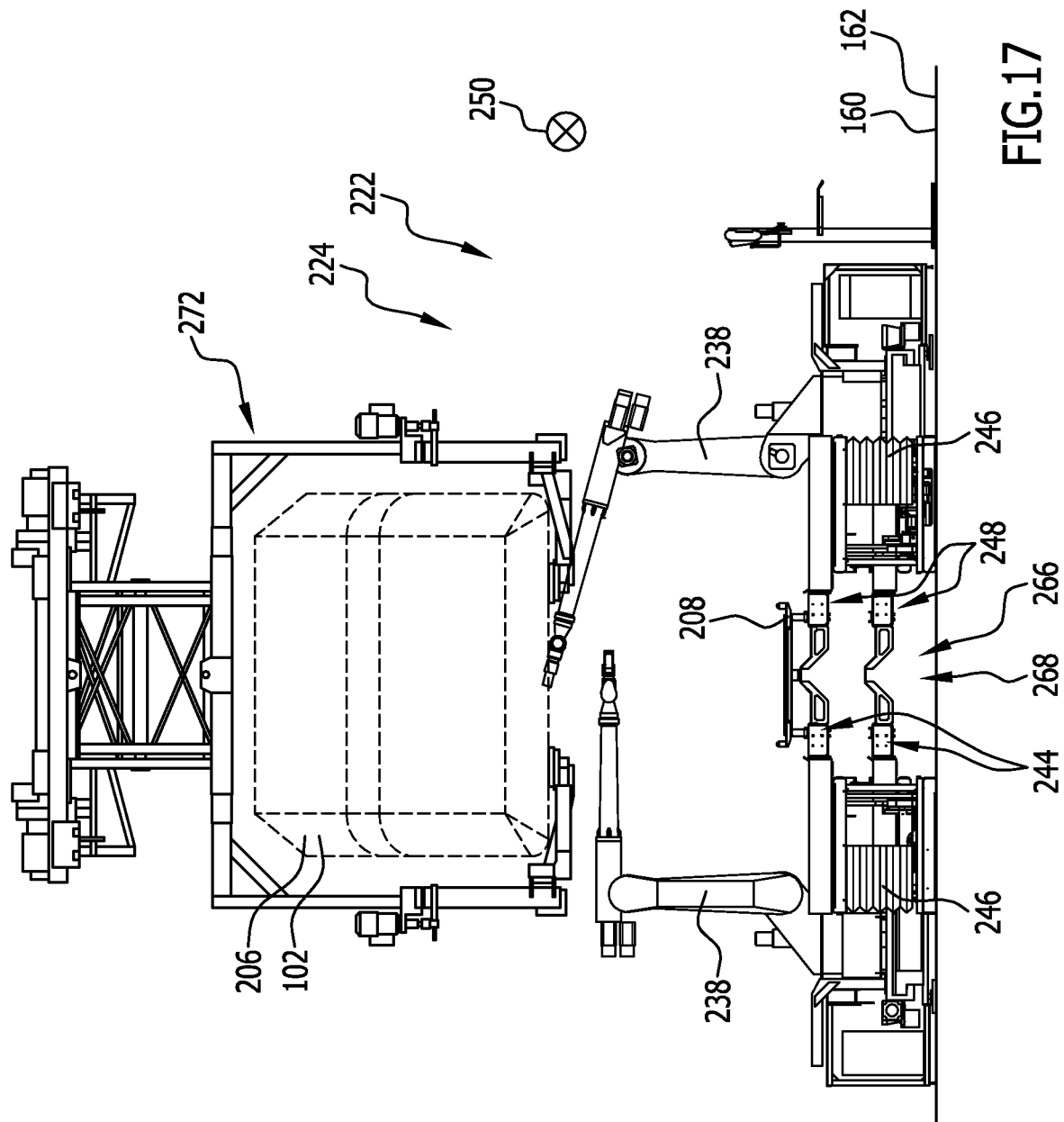
FIG. 17 shows a schematic illustration, corresponding to FIG. 16, of the conveying device from FIG. 16, wherein the overhead conveyor is arranged in a raised position.

An alternative embodiment of a station 234 that is illustrated in FIGS. 16 and 17 differs from the embodiment illustrated in FIGS. 14 and 15 substantially in that, in the processing region 252, the objects 102 do not remain on the station conveying device 244 that takes the form of a roller track 245. Rather, a lifting installation 272 is provided for raising the objects 102 from the station conveying device 244 and/or the adapter device 208.

In particular, the lifting installation 272 is an overhead conveyor and/or an electric overhead track, or it enables raising of the object 102 at least in a manner that is stationary in the horizontal direction.

By means of the lifting installation 272, in particular an underside of the object 102 may be made accessible to robots 238 and/or for manual processing, for example in order to apply an underbody protection or seam sealing to an underside of the object 102, in particular a vehicle body 206.

Otherwise, the embodiment of the station 234 that is illustrated in FIGS. 16 and 17 corresponds, as regards its structure and functioning, to the embodiment illustrated in FIGS. 14 and 15, so in this respect reference is made to the description thereof above.

In the conveying device 222, one or more stations 234 according to the embodiment illustrated in FIGS. 14 and 15 may likewise be provided according to the embodiment illustrated in FIGS. 16 and 17, in particular in order to carry out different processing steps on the object 102.

Figure 18:
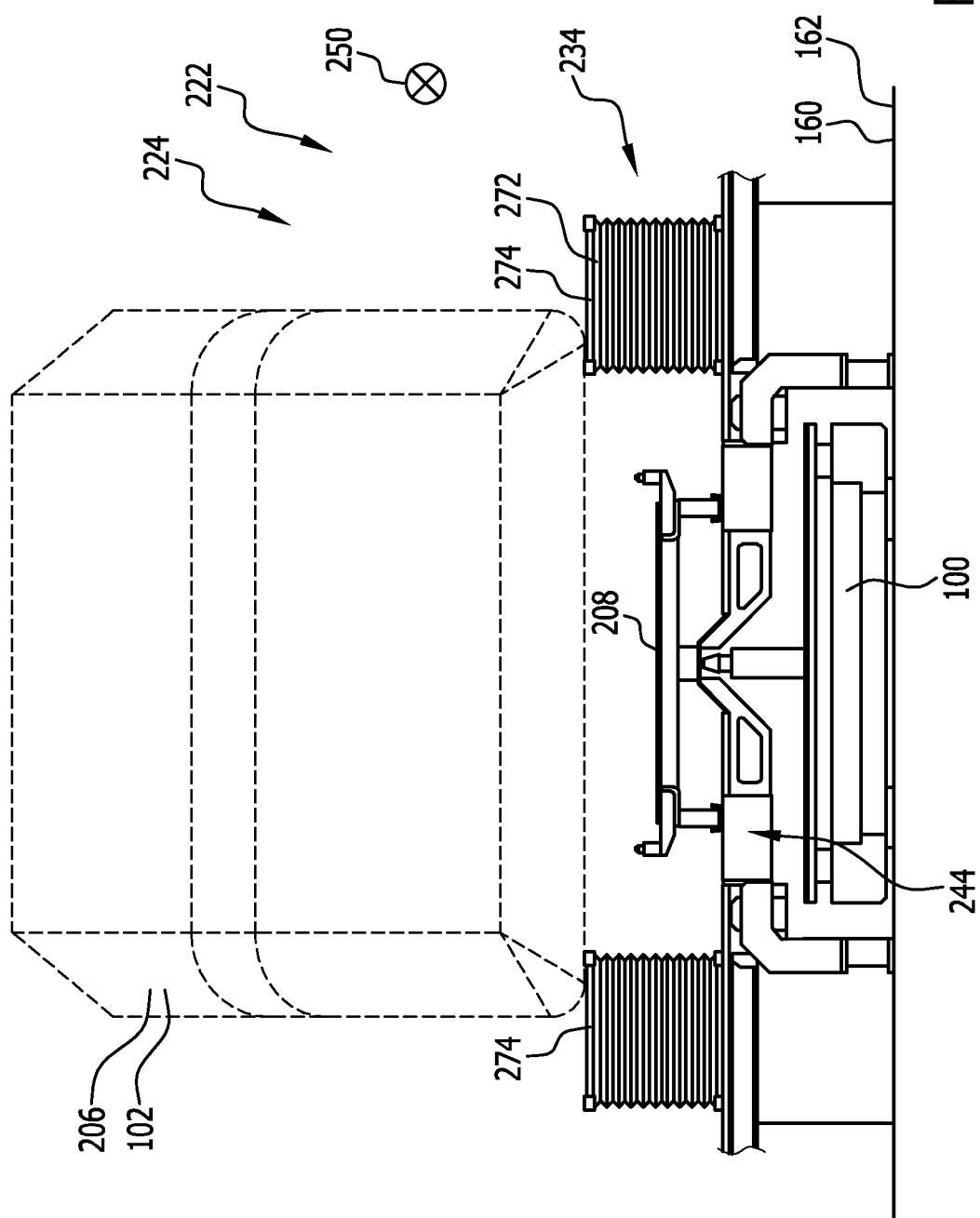
FIG. 18 shows a schematic illustration, corresponding to FIG. 15, of a further alternative embodiment of a conveying device, in which a station with lifting tables for raising an object is provided.

A further alternative embodiment of a station 234, illustrated in FIG. 18, differs from the embodiment illustrated in FIGS. 16 and 17 substantially in that the lifting installation 272 takes the form of lifting tables 274 arranged on both sides of the station conveying device 244.

This too allows objects 102 to be brought to different vertical levels in order to carry out different processing steps on the object 102.

Otherwise, the alternative embodiment of the station 234 that is illustrated in FIG. 18 corresponds, as regards its structure and functioning, to the embodiment illustrated in FIGS. 16 and 17, so in this respect reference is made to the description thereof above.

The embodiment of a station 234 that is illustrated in FIG. 18 may also be provided once or multiple times in a conveying device 222, for example as an alternative or in addition to one or more of the embodiments according to FIGS. 14 and 15 and/or as an alternative or in addition to one or more of the embodiments according to FIGS. 16 and 17.

In FIGS. 19 to 23, different variants of the partitioning floor 248 and the penetration region 262 are illustrated on a larger scale in order to clarify its function and variants thereof.

Each of the embodiments illustrated in FIGS. 19 to 23 of the partitioning floor 248 and/or the penetration region 262 may in principle be provided in any conceivable station 234, in particular any of the embodiments described above and/or illustrated in FIGS. 14 to 18.

Figure 19:
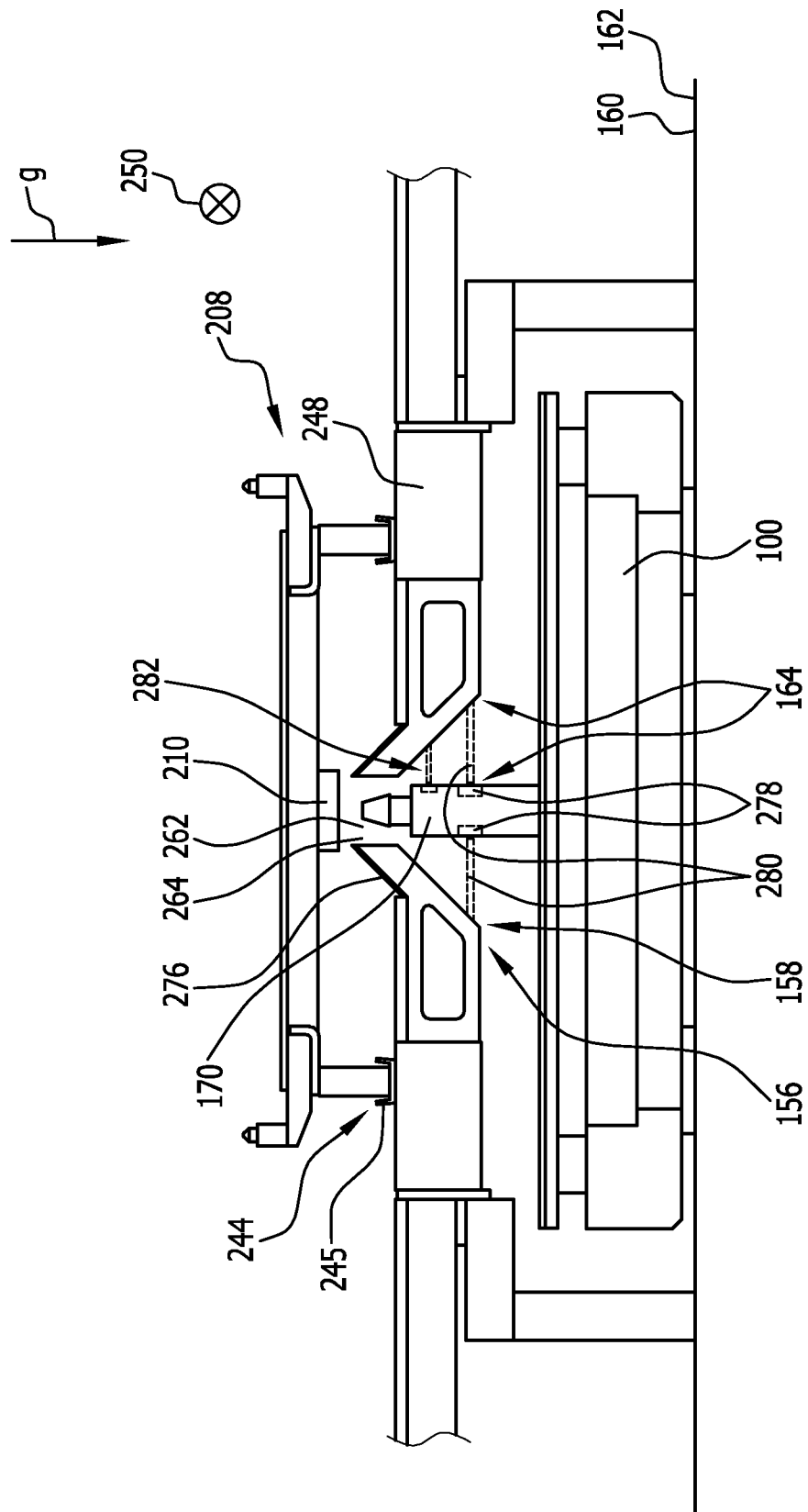
FIG. 19 shows a schematic illustration of a partitioning floor of a station, by means of which a vehicle and an adapter device and, where appropriate, an object arranged thereon are separated from one another, wherein the partitioning floor has a penetration region that takes the form of a penetration slot and is limited on both sides by obliquely extending penetration edge regions.

An embodiment of the partitioning floor 248 that is illustrated in FIG. 19 corresponds substantially to the embodiment illustrated in FIGS. 14 to 18, wherein the penetration region 262 is completely open, and in particular a closed section 260 is not provided.

For the purpose of minimising contamination of the vehicle 100 below the partitioning floor 248, it may for example be provided for the central element 210 of the adapter device 208 to have a width, transversely to the conveying direction 250, that is greater than a width of the penetration slot 264.

By means of the central element 210, the penetration slot 264 may thus preferably be at least partly covered.

The two regions of the partitioning floor 248 that delimit the penetration region 262 are designated penetration edge regions 276 below, and in the embodiment illustrated in FIG. 19 they are for example oriented obliquely in relation to the direction of gravity g. The penetration edge regions 276 extend obliquely upwards, in particular from the partitioning floor 248. As a result, in particular it is possible to prevent objects from falling or rolling into the penetration slot 264 in undesired manner. Moreover, as a result of a suitable configuration of the penetration edge regions 276, a risk to persons potentially posed by the penetration slot 264 can be minimised.

In particular, the penetration edge regions 276 are a constituent part of the elevated portion formed in the partitioning floor 248 in order to provide room for the receiving elements 170 to move.

As can be seen in dashed lines in FIG. 19, in one embodiment of the vehicle 100 and/or the conveying device 222, a charging device 156 for charging an energy store 150 of the vehicle 100 may, as an alternative or in addition to the embodiments already described and/or illustrated, also be formed such that in the region of one or more receiving elements 170 there is a transfer of energy from a charging region 158 to the vehicle 100.

For this purpose, a receiving element 170 is provided for example with one or more contact regions 278 that form a charge connection point 164 of the vehicle 100.

A charge connection point 164 that is to be brought into engagement herewith is for example formed by one or more contact elements 280, which are in particular arranged on the partitioning floor 248 and project in the direction of the receiving element 170, in particular towards the contact regions 278.

In particular, the contact elements 280 form sliding contacts that enable an in-contact transfer of energy from the charging region 158 to the vehicle 100.

In particular for optimised control of the charging procedure, it is further possible to provide a control contact arrangement 282. As an alternative or in addition, it is possible for the transfer of information that is required for optimisation of the charging procedure to be carried out wirelessly, for example over a WLAN.

Figure 20:
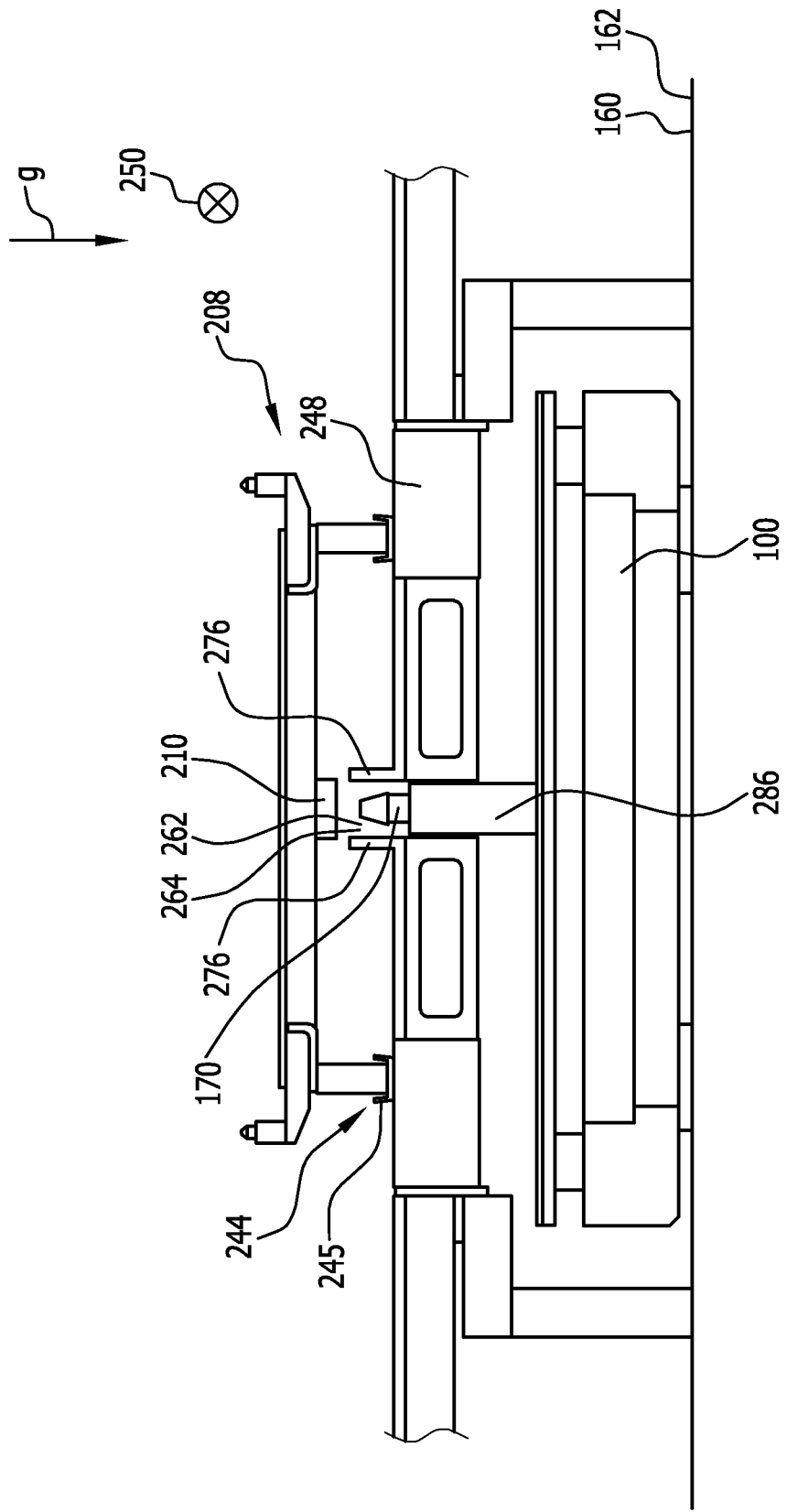
FIG. 20 shows a schematic illustration, corresponding to FIG. 19, of an alternative embodiment of the partitioning floor, in which substantially L-shaped penetration edge regions are provided.

A further embodiment of the partitioning floor 248, illustrated in FIG. 20, differs from the embodiment illustrated in FIG. 19 substantially in that the penetration edge regions 276 project substantially parallel to one another and/or substantially perpendicularly upwards from the partitioning floor 248 and are thus substantially L-shaped.

Otherwise, the embodiment of the partitioning floor 248 that is illustrated in FIG. 20 corresponds, as regards its structure and functioning, to the embodiment illustrated in FIG. 19, so in this respect reference is made to the description thereof above.

Figure 21:
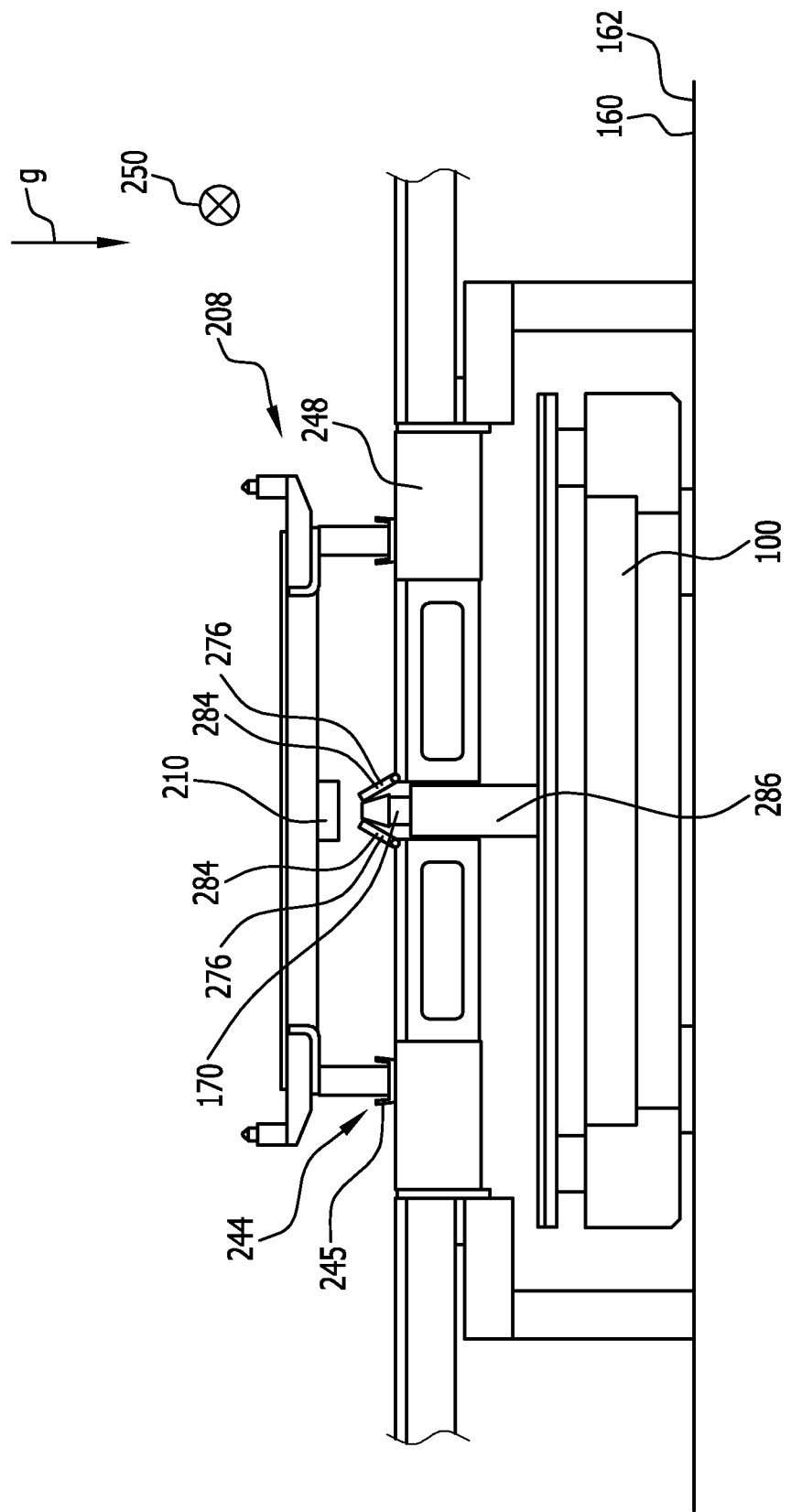
FIG. 21 shows a schematic illustration, corresponding to FIG. 19, of a further alternative embodiment of the partitioning floor, in which the penetration region is closable by means of closing elements, wherein the closing elements are for example flaps.

An embodiment of a partitioning floor 248 that is illustrated in FIG. 21 differs from the embodiment illustrated in FIG. 20 substantially in that the penetration edge regions 276 are arranged and/or formed to be pivotal on the partitioning floor 248.

In this way, the penetration edge region 276 comprises in particular one or more closing elements 284 that are preferably arranged to be pivotal on the partitioning floor 248 and make it possible to close off the penetration region 262, in particular the penetration slot 264.

Preferably, the closing elements 284 are spring-loaded and/or arranged and/or formed such that they automatically come to a closed position that is for example substantially horizontal, without being actuated, as a result of gravity.

When a vehicle 100 is guided below the partitioning floor 248, it is possible, depending on an extended position of the receiving elements 170, for the closing elements 284 to open by being pressed open by the receiving elements 170, in particular being raised. As soon as the receiving element 170 or elements 170 has passed the individual closing elements 284, these preferably automatically go back into the closed position.

Preferably, numerous closing elements 284 are arranged one behind the other along the conveying direction 250 and are mutually independently actuable.

In this way, preferably it is only ever the closing elements 284 with which a receiving element 170 is currently in engagement and/or at which it is arranged that are in the open position.

Otherwise, the embodiment of the partitioning floor 248 that is illustrated in FIG. 21 corresponds, as regards its structure and functioning, to the embodiment illustrated in FIG. 20, so in this respect reference is made to the description thereof above.

Figure 22:
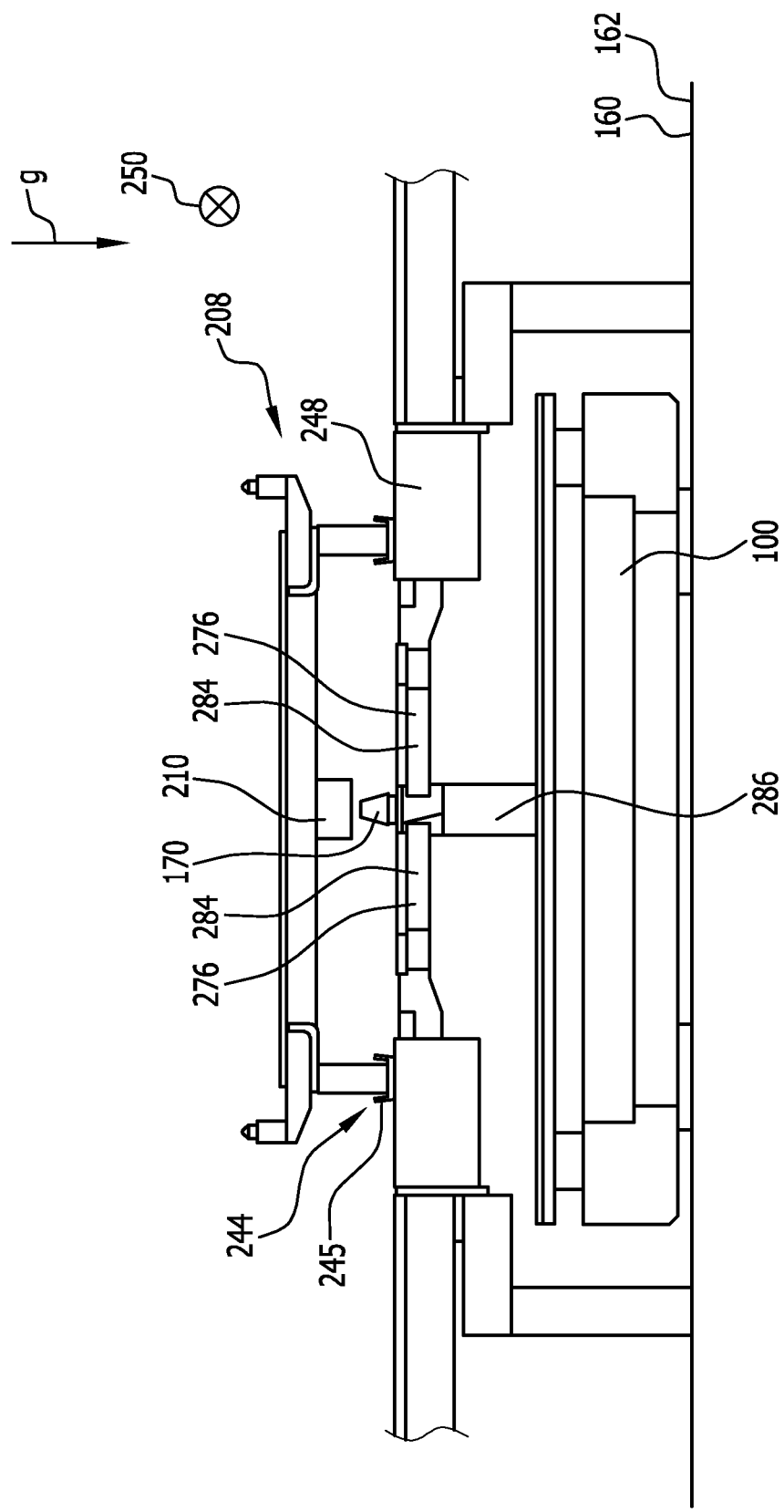
FIG. 22 shows a schematic illustration, corresponding to FIG. 19, of a further alternative embodiment of a partitioning floor, in which the penetration region is closable by means of closing elements taking the form of slats.

An alternative embodiment of a partitioning floor 248, illustrated in FIG. 22, differs from the embodiment illustrated in FIG. 21 substantially in that the closing elements 284 take the form for example of slats and are in particular deflectable in a horizontal direction in order to clear the penetration region 262 temporarily for the purpose of guiding through one or more receiving elements 170.

In this case, the closing elements 284—and in principle this is also true of the closing elements 284 according to FIG. 21—can form or comprise one or more contact elements 280, with the result that energy for charging the energy store 150 of the vehicle 100 is transferable by means of the closing elements 284.

Depending on the location of the receiving element 170 and/or depending on a form taken by the receiving element 170, different regions may be available for engagement with the closing elements 284 and/or the contact elements 280.

Figure 23:
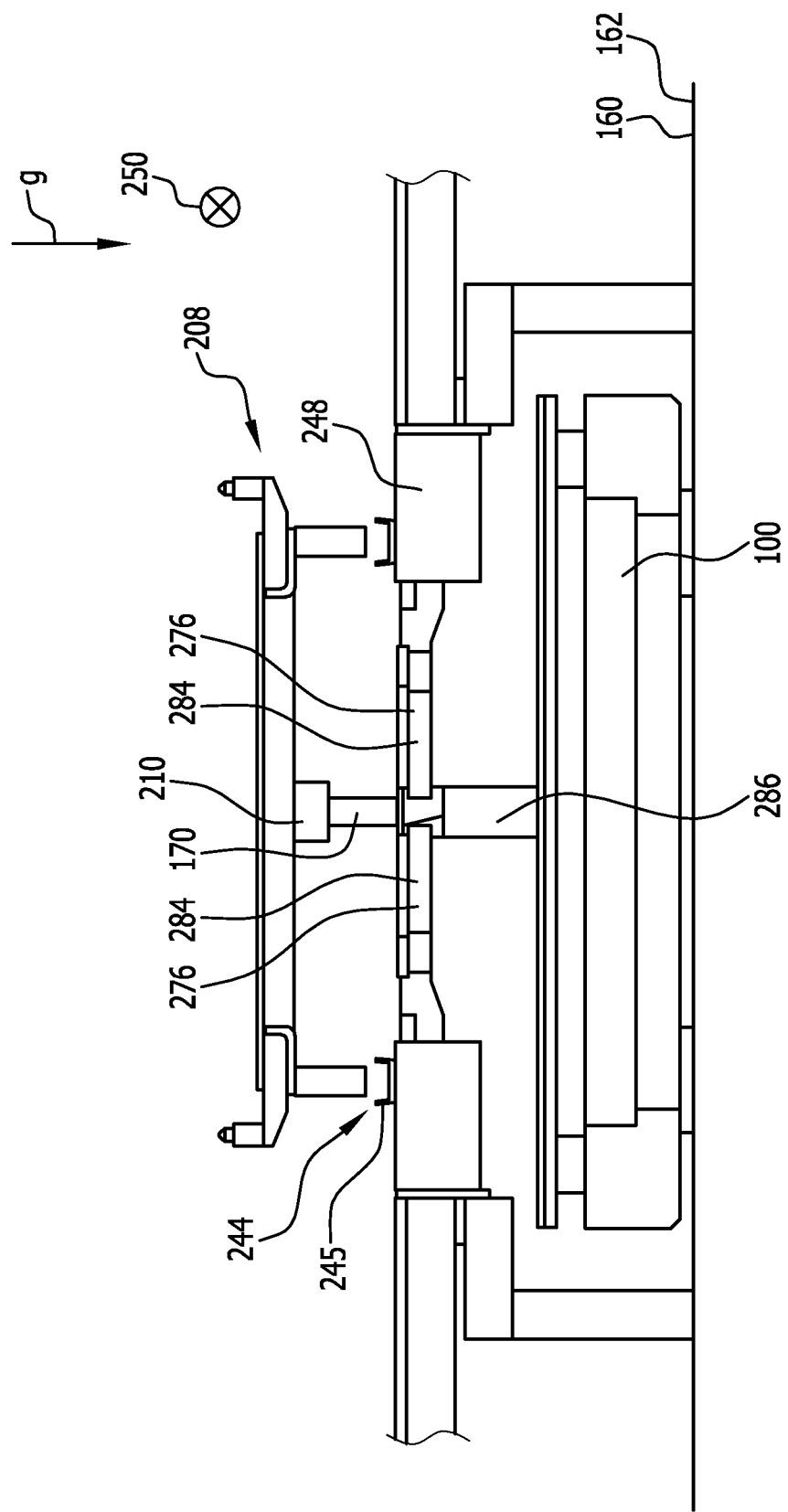
FIG. 23 shows a schematic illustration, corresponding to FIG. 22, of the partitioning floor, the vehicle and the adapter device from FIG. 22, wherein one or more receiving elements of the vehicle are arranged in a raised or extended position and thus the adapter device has been raised from a station conveying device.

As can be seen in particular from FIGS. 22 and 23, it may be provided for the receiving elements 170 each to comprise and/or to be arranged in a receiving cylinder 286 that already projects above the base body 104 of the vehicle 100.

Movable parts of the receiving elements 170, or the whole of the receiving elements 170, are movable in particular in relation to the base body 104 and/or the respective receiving cylinder 286, in particular being extendable therefrom and/or retractable therein.

The receiving cylinder 286 may for example take a form such that it always projects through the penetration region 262, in particular through the penetration slot 264. By putting the receiving elements 170 in different locations—in particular as a result of movable parts extending out of the receiving cylinder 286 by differing amounts—it is then possible for example for an adapter device 208, together with an object 102 that may be arranged thereon, to be lowered (see FIG. 22) or raised (see FIG. 23).

Otherwise, the embodiment of the partitioning floor 248 that is illustrated in FIGS. 22 and 23 corresponds, as regards its structure and functioning, to the embodiment illustrated in FIG. 21, so in this respect reference is made to the description thereof above.

Figure 24:
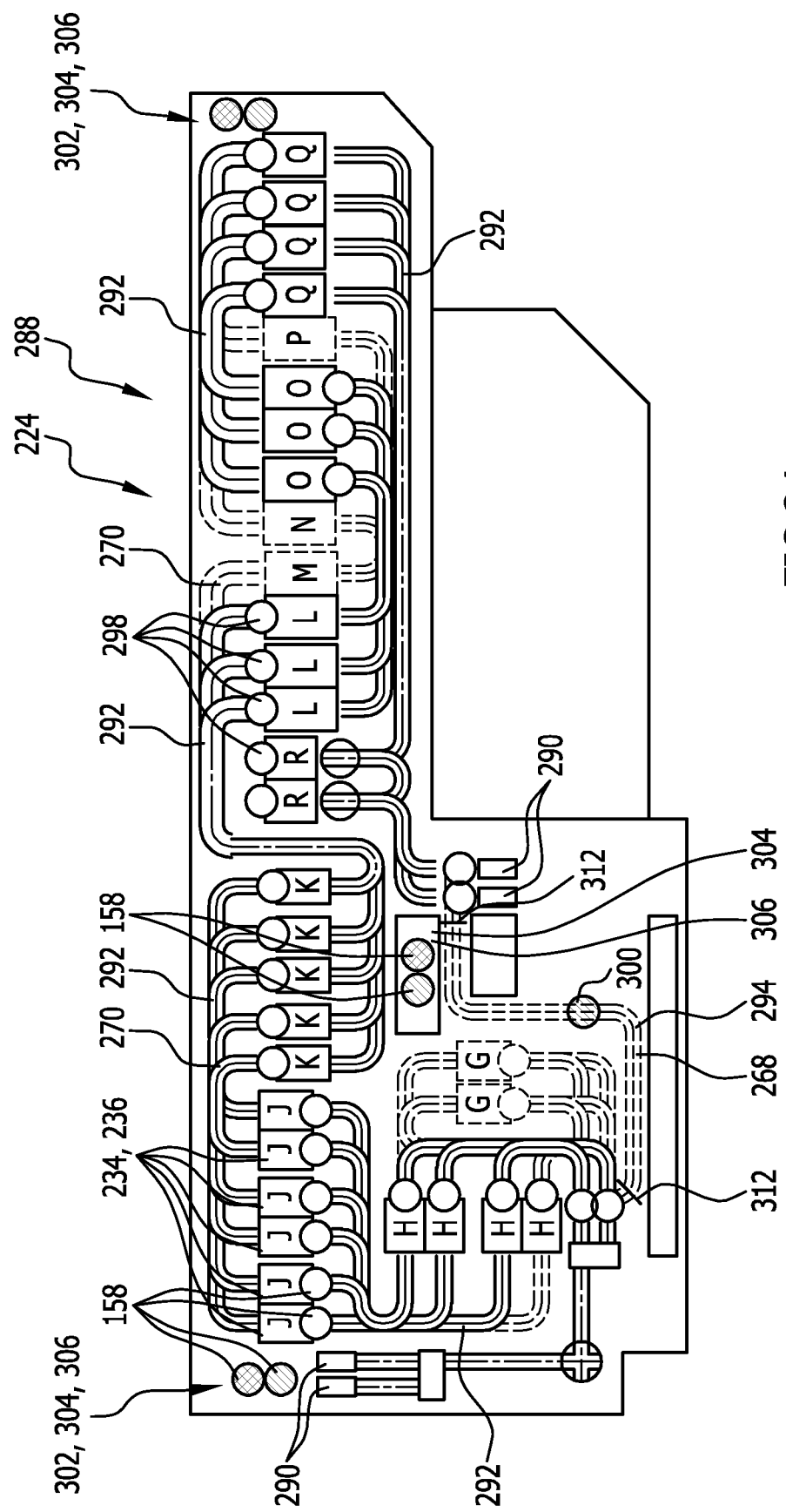
FIG. 24 shows a schematic illustration of the layout of a processing installation that has a plurality of processing stations and a plurality of charging regions for charging the vehicles.
Figure 25:
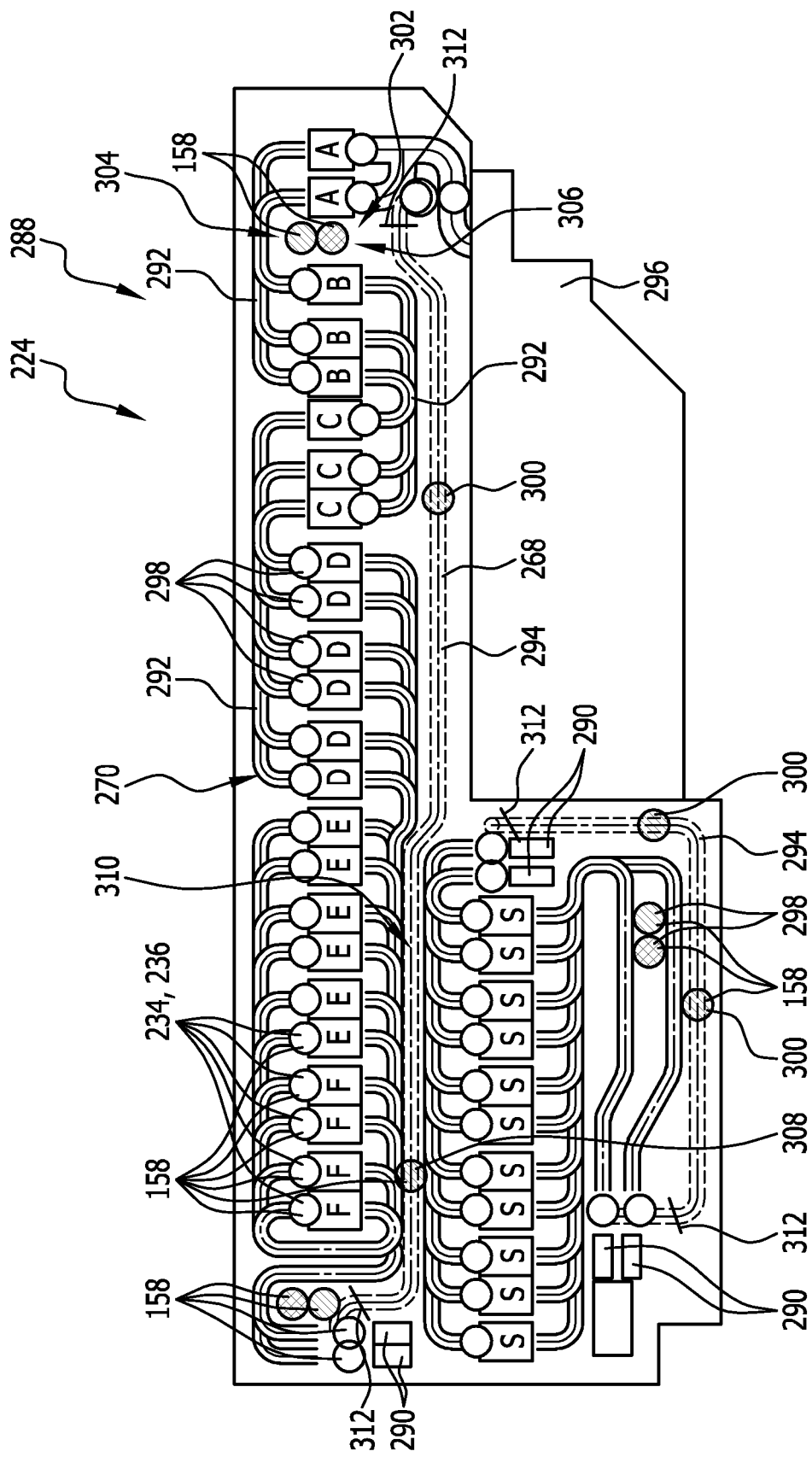
FIG. 25 shows a schematic illustration, corresponding to FIG. 24, of a further level of the processing installation from FIG. 24.

FIGS. 24 and 25 illustrate schematically an example of a layout of a processing installation 224.

Here, the processing installation 224 comprises numerous stations 234, which are in particular processing stations 236 for processing and/or inspection of objects 102, in particular vehicle bodies 206.

Here, FIGS. 24 and 25 show two different levels 288 of the same processing installation 224, so both FIGS. 24 and 25 are to be considered together with respect to the following description.

The processing installation 224 comprises in particular one or more handover devices 290 which are configured to bring objects 102 that are to be conveyed to the respective level 288.

The handover devices 290 are in particular elevators or other lifting devices.

The processing installation 224 comprises in particular a conveying device 222 according to one of the embodiments described above, and thus in particular a plurality of vehicles 100 for conveying objects 102.

For the sake of better clarity, the objects 102 and the vehicles 100 are not illustrated in FIGS. 24 and 25. Rather, in these Figures, conveying paths 292 and return conveying paths 294 along which the vehicles 100 are movable are illustrated.

Objects 102 are conveyable along the conveying paths 292.

Only the vehicles 100, with no objects 102 arranged thereon, are movable along the return conveying paths 294, in particular in order to move the vehicles 100 out of an end position of a processing section of the processing installation 224 and back into a starting location. The stations 234 are illustrated as rectangles, and are provided with letters indicating an exemplary conveying order. In particular, the objects are configured to be fed one after the other, by means of the vehicles 100, to the following stations 234:

For example, from a sorting store 296 the objects 102 are compulsorily fed one after the other, by means of one or more vehicles 100, to the stations A, B, C and D (see FIG. 25).

The stations E and F are optional, and may be selectively omitted or indeed passed through multiple times, in particular in different orders.

Thereafter, the objects 102 are conveyed to a handover device 290, which hands them over to the level 288 illustrated in FIG. 24.

The objects 102 are then compulsorily fed to the stations H, J, K, L, O, Q and R, before the objects 102 are handed back to the level 288 illustrated in FIG. 25 by means of a further handover device 290. There, they are then fed to the stations S and finally, by way of a further handover device 290, to a level 288 (not illustrated) for further processing.

Optionally, one or more stations G are configured to be passed through upstream of the stations H.

If the stations L are bypassed, it is possible in particular to provide a station M.

Further, stations N and/or P are provided for optionally bypassing the stations O.

In a first variant layout, the following may be provided:
In particular, most or all of the stations 234 on the level 288 illustrated in FIG. 24 are manual stations, or workstations, at which the objects 102 are processed by persons. Thus, persons must, preferably permanently, have access to the stations 234, for which reason the vehicles 100 on the level 288 illustrated in FIG. 24 are in the safety mode preferably for the majority, in particular for at least approximately 90%, for example for at least approximately 95%, of the time during which they are used and/or of their route.

In particular, the following stations 234 thus are or comprise manual stations or workstations:
G, H, J, K, L, M, N, O, P, Q, R.

However, it is also possible for individual or a plurality of these stations to take the form of automatic stations or workstations at which the objects 102 are processed by robots 238 or other machines.

In particular, most or all of the stations 234 on the level 288 illustrated in FIG. 25 are automatic stations or workstations at which the objects 102 are processed by robots 238 or other machines. Thus, preferably persons need only have access to the stations 234 temporarily, for maintenance or inspection purposes. The vehicles 100 on the level 288 illustrated in FIG. 25 may therefore be in the express mode preferably for the majority, in particular for at least approximately 90%, for example for at least approximately 95%, of the time during which they are used in the condition with no load and/or in the loaded condition.

Further, the vehicles 100 on the level 288 illustrated in FIG. 25 may be in the express mode preferably for the majority, in particular for at least approximately 90%, for example for at least approximately 95%, of their route in the condition with no load and/or in the loaded condition.

In particular, the following stations 234 thus are or comprise automatic stations or workstations:
A, B, C, D, E, F, S.

However, it is also possible for individual or a plurality of these stations to take the form of manual stations or workstations at which the objects 102 are processed by persons.

In a second variant layout, by contrast, the following may be provided:
In particular, most or all of the stations 234 on the level 288 illustrated in FIG. 25 are manual stations, or workstations, at which the objects 102 are processed by persons. Thus, persons must, preferably permanently, have access to the stations 234, for which reason the vehicles 100 on the level 288 illustrated in FIG. 25 are in the safety mode preferably for the majority, in particular for at least approximately 90%, for example for at least approximately 95%, of the time during which they are used and/or of their route.

In particular, the following stations 234 thus are or comprise automatic stations or workstations:
A, B, C, D, E, F, S.

However, it is also possible for individual or a plurality of these stations to take the form of automatic stations or workstations at which the objects 102 are processed by robots 238 or other machines.

In particular, most or all of the stations 234 on the level 288 illustrated in FIG. 24 are automatic stations or workstations at which the objects 102 are processed by robots 238 or other machines. Thus, preferably persons need only have access to the stations 234 temporarily, for maintenance or inspection purposes. The vehicles 100 on the level 288 illustrated in FIG. 24 may therefore be in the express mode preferably for the majority, in particular for at least approximately 90%, for example for at least approximately 95%, of the time during which they are used in the condition with no load and/or in the loaded condition.

Further, the vehicles 100 on the level 288 illustrated in FIG. 24 may be in the express mode preferably for the majority, in particular for at least approximately 90%, for example for at least approximately 95%, of their route in the condition with no load and/or in the loaded condition.

In particular, the following stations 234 thus are or comprise manual stations or workstations:
G, H, J, K, L, M, N, O, P, Q, R.

However, it is also possible for individual or a plurality of these stations to take the form of manual stations or workstations at which the objects 102 are processed by persons.

The objects 102 are configured to be handed to and fro between the levels 288, wherein the vehicles 100 preferably remain on the same level 288 in each case.

However, it is also possible to provide for conveying the objects 102 such that the vehicles 100 are handed to and fro between the levels 288 together with the vehicles 102.

For optimum operation of the conveying device 222 for the purpose of conveying objects 102, numerous charging regions 158 are required.

All of the charging regions 158 are illustrated by circles in FIGS. 24 and 25. In particular, preferably all of the blank or hatched circles in FIGS. 24 and 25 are charging regions 158.

In particular if the energy storage units 150 of the vehicles 100 comprise supercapacitors 154 rather than lithium-ion accumulators 155, it must be possible to recharge the energy store 150 of a respective vehicle 100 at relatively short intervals in time and/or space. Charging regions 158 are thus in particular arranged in each case at a station 234, preferably a discharge location 242 of a respective station 234. These charging regions 158 are preferably stationary charging regions 298.

In this case, the vehicles 100 are stationary in particular during transfer of the objects 102 to the respective station 234, with the result that it is possible to utilise the fact that the vehicle 100 is halted, which is in any case necessary for transfer, for a charging procedure.

As an alternative or in addition, it is also possible to provide a charging region 158 at the point of transfer to a receiving location 256 of a respective station 234.

Depending on a total length of the conveying path 292 and/or the return conveying path 294, it is also possible, instead of and/or in addition to charging regions 158 that are associated with the stations 234, to provide charging regions 158 that are arranged on the conveying paths 292 and/or the return conveying paths 294.

In this case, the charging regions 158 may in particular be arranged on the optimum and/or shortest path that, in FIGS.

24 and 25, is illustrated as the conveying path 292 and the return conveying path 294. The vehicles 100 then halt in order to be charged, without any deviation.

As an alternative, it may be provided for the vehicles 100 to be charged during travel. In that case, the charging regions 158 are in particular mobile charging regions 300.

Further, it may be provided, for the purpose of charging the respective energy store 150, for the vehicles 100 to deviate temporarily from an optimum and/or shortest conveying path 292 and/or return conveying path 294 and for example to be moved into a charging bay 302. After charging, the vehicles 100 then return, preferably on the optimum and/or shortest conveying path 292 and/or the optimum and/or shortest return conveying path 294.

A charging bay 302 may in particular be a holding region 304 in which vehicles 100 can halt not only for the purpose of charging the energy store 150 but also in cases when the vehicles 100 are not used at 100% capacity and it is thus necessary to wait for the span of an idle time until the next conveying job.

Further, the charging bay 302 and/or the holding region 304 may be a maintenance region 306 in which one or more vehicles 100 are maintained or serviced manually and/or automatically. For example, repairs or other work may be performed on the vehicle 100 in a maintenance region 306.

Preferably, the charging regions 158 are arranged such that as many conveying paths 292 and/or return conveying paths 294 as possible are covered using line lengths that are as short as possible and as few charging regions 158 as possible.

For this purpose, one or more charging regions 158 are arranged for example at a charging node 308 and/or a multidirectional conveying region 310.

A charging node 308 is in particular a region in which a plurality of charging regions 158 are provided for charging a plurality of vehicles 100 at the same time. As a result of this, in particular the line lengths for supplying electrical energy to the charging regions 158 can be shortened.

The fact that one or more charging regions 158 are arranged in a multidirectional conveying region 310 makes it possible in particular to make optimum use of the one or more charging regions 158, since in multidirectional conveying regions 310 one or more vehicles 100 can pass through and/or travel over the one or more charging regions 158, one after the other or at the same time, in different directions of travel. This allows time-consuming orientation of the vehicles 100 to be dispensed with.

The one or more charging regions 158 that are arranged in the multidirectional conveying region 310 are thus configured to be visited more frequently and can be utilised for charging more vehicles 100 in a shorter period.

As multidirectional conveying regions 310 there may be provided in particular mutually overlapping and/or crossing conveying paths 292 and/or return conveying paths 294.

With a view to optimised conveying speed, the conveying device 222 may preferably be divided up into different regions.

In this case, a safety region 270 is in particular the region in which the vehicles 100, together with objects 102 arranged thereon if applicable, are accessible to persons, so the persons have to be particularly protected.

For this purpose, the vehicles 100 have a predetermined maximum speed and additional safety measures to ensure protection of persons and at the same time to protect the objects 102 that are to be conveyed from damage.

In addition to the safety region 270, an express region 268 may be provided.

In particular, the express region 268 is a region that is spatially separated from the safety region 270 and is at least temporarily not accessible to persons.

In particular, one or more return conveying paths 294 preferably take the form of express regions 268, so that the vehicles 100 are movable at a higher speed than the maximum speed in the safety region 270, for example from an end position of a processing section back to a starting location.

As a result, the vehicles 100 are available for a new conveying procedure more quickly, so the efficiency of the conveying device 222 can be increased.

The vehicles 100 are in particular configured to pass through one or more passageways 312 in one or more partitioning devices, in particular partitioning walls, for the purpose of partitioning the express region 268 from the safety region 270.

Here, the shape of the passageways 312 is in particular adapted to an external contour of the vehicle 100, as a result of which it is preferably possible, without a closing mechanism for closing the passageway 312, to ensure that persons do not gain access to the express region 268 without authorisation and so put themselves in danger.

If, despite these precautionary measures, a person still gains access to the express region 268, it is preferably possible to detect such penetration into the express region 268 by means of sensor devices (not illustrated). In that case, the vehicles 100 that are in the express region 268 or are entering it are preferably not put in an express mode but remain in the safety mode that they are in when they are in the safety region 270.

The variants of the layout of the stations 234, and of the arrangement and/or form of the charging regions 158, that are illustrated in FIGS. 24 and 25 are merely exemplary and may be used in any desired combinations with the other embodiments that are described and/or illustrated of other stations 234 and/or other charging regions 158.

Figure 26:
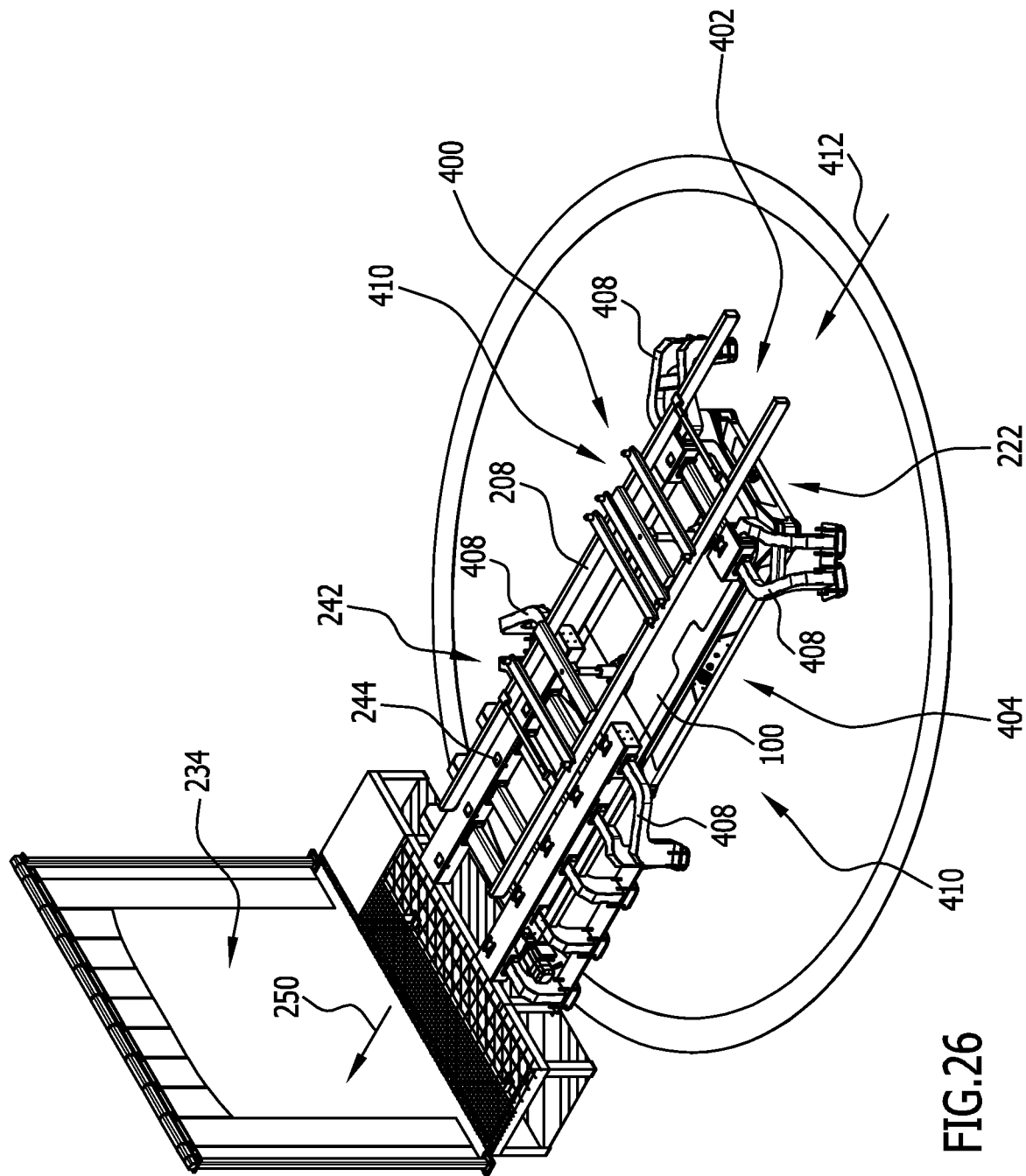
FIG. 26 shows a schematic perspective illustration of an in particular alternative embodiment of a transfer region, wherein a vehicle transfers an adapter device and optionally an object (not illustrated) that is arranged on the adapter device to a station conveying device.
Figure 27:
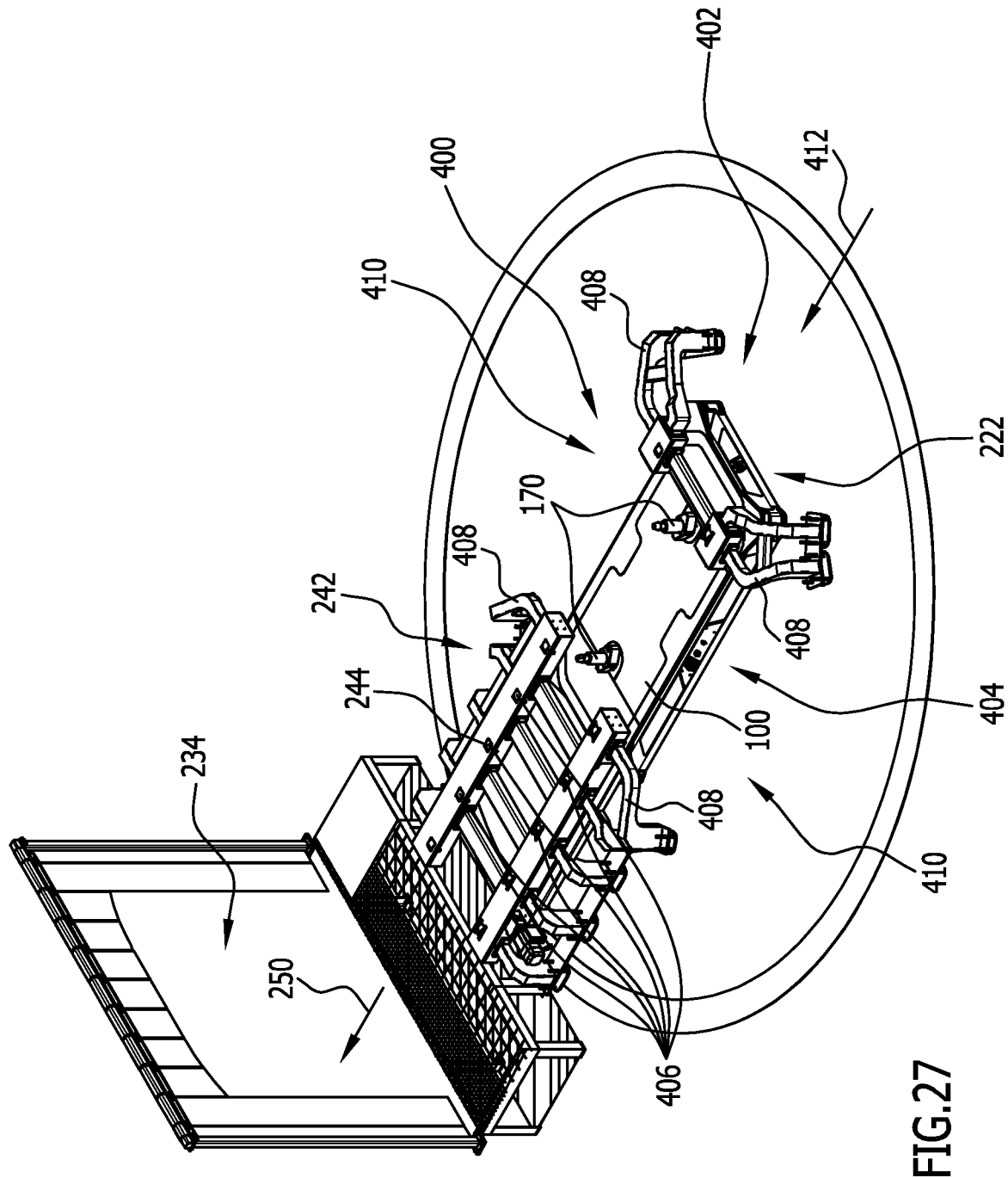
FIG. 27 shows an illustration, corresponding to FIG. 26, of the transfer region from FIG. 26, wherein the adapter device has been guided away by means of the station conveying device.
Figure 28:
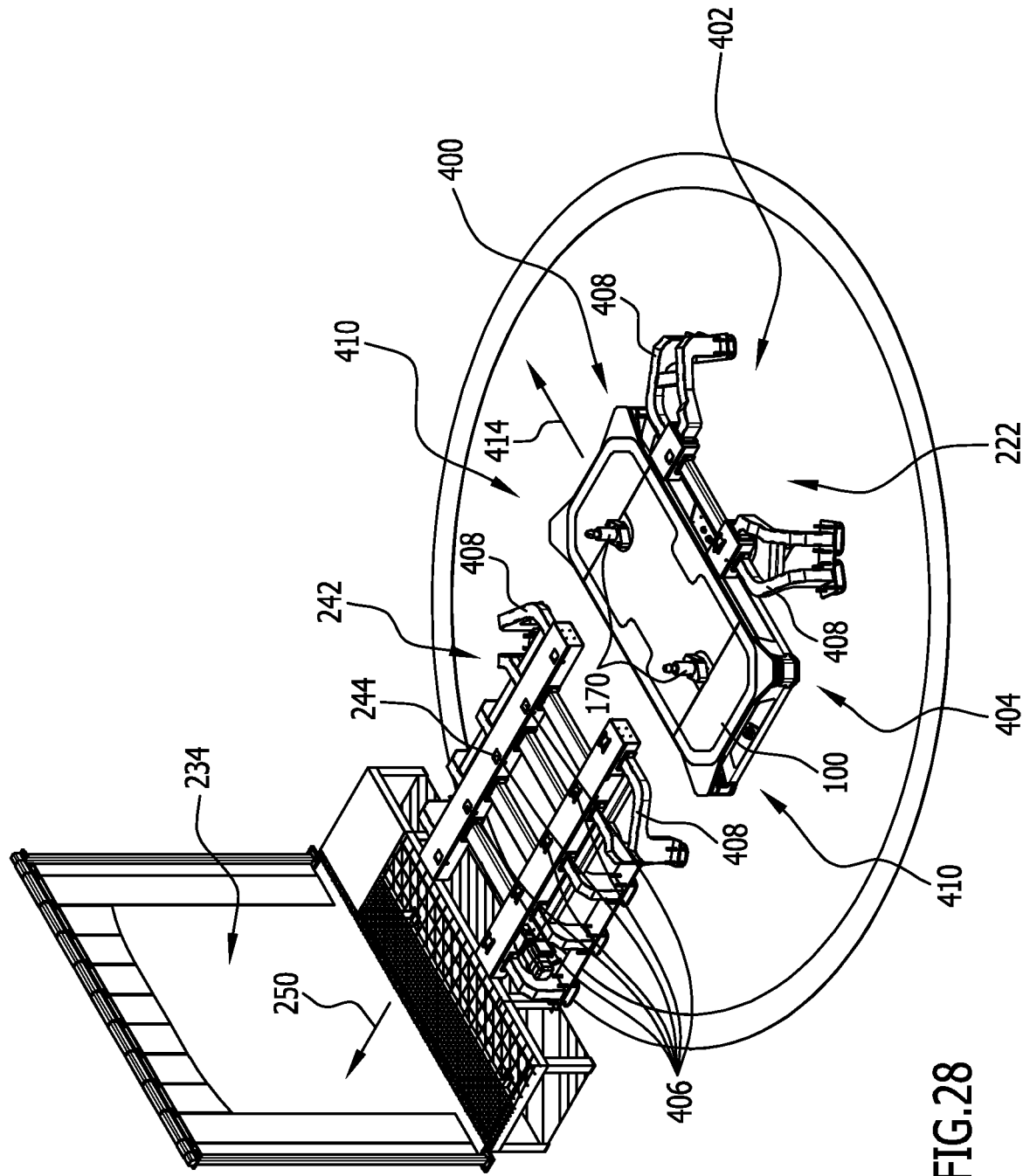

FIGS. 26 to 28 illustrate an embodiment of a transfer region 400 that serves for example to transfer objects 102 (not illustrated in these Figures but arrangeable on the adapter device 208) from a vehicle 100 to a station conveying device 244. Further, a transfer region 400 of this kind can serve to transfer objects 102 from a station conveying device 244 to a vehicle 100. In that case, the directions of movement and/or method sequences that are described below are adapted appropriately and/or reversed.

The transfer region 400 may in particular form a receiving location 256 and/or a discharge location 242, or be a constituent part thereof. For this reason, as regards basic functioning and possible uses, reference is made to the statements thereon above, in particular in relation to the description of FIGS. 14 and 15.

As can be seen from FIG. 26, an adapter device 208 on which an object 102 is optionally arranged is transported to the transfer region 400 by means of a vehicle 100. The vehicle 100 travels in particular through an entry region 402 and into a transfer location 404.

In the transfer location 404, the vehicle 100 is brought to a standstill and is then positioned such that the adapter device 208 and/or the object 102 are lowerable, for example by retracting the receiving elements 170, and depositable on a station conveying device 244.

In this way, the adapter device 208 and/or the object 102 are separated from the vehicle 100.

By means of the station conveying device 244, the adapter device 208 and/or the object 102 can be moved out of the transfer region 400 and in particular fed to the station 234.

For this purpose, the station conveying device 244 takes the form for example of a roller track so that in particular an adapter device 208 taking the form of a skid or comprising a skid can be fed to the station 234 in a simple manner.

One or more conveying elements 406, in particular a plurality of rollers, are preferably arranged on load-bearing elements 408 of the station conveying device 244. The load-bearing elements 408 are arranged—for example being screwed in place—in particular on a floor on which the vehicles 100 are preferably moved.

The load-bearing elements 408 are in particular supports or pillars that project upwards from the floor, such that the adapter device 208, together with an object 102 arranged thereon, are for example receivable and conveyable on a level above a movement path of the vehicles 100.

Preferably, a plurality of load-bearing elements 408 are arranged at a plurality of sides of the transfer location 404.

It may be favourable if a plurality of load-bearing elements 408 are arranged spaced from one another so that in particular the entry region 402 is formed between two load-bearing elements 408.

Further, preferably at least one exit region 410 is formed between two, in particular two further, mutually spaced load-bearing elements 408.

It may be favourable if two exit regions 410 are arranged and/or formed on mutually opposite sides of the transfer location 404.

Arranged on a side of the transfer location 404 opposite the entry region 402, there is preferably a station 234 or at least a section of the station conveying device 244 that leads to the station 234.

As can be seen from FIGS. 26 to 28, the vehicle 100 is preferably configured to move through the entry region 402 and into the transfer location 404 along an entry direction 412.

Preferably, the entry direction 412 is oriented at least approximately parallel to a conveying direction 250 of the station conveying device 244.

If a plurality of vehicles 100 are to feed a plurality of objects 102 to the station 234 at rapid intervals in time, it may be advantageous if the vehicles 100 are not moved away from the transfer location 404 in opposition to the direction 412 in which they came in through the entry region 402, since in that case the further vehicles 100 would have to be halted at a relatively great spacing from the transfer region 400.

Rather, the vehicle 100 is rotated for example in the transfer location 400, in particular about its own vertical centre axis, for example by turning the drive wheels 120 in opposite directions (see FIG. 4).

The rotation is for example about approximately 90°, so that the vehicle 100 can then leave the transfer location 404 in an exit direction 414 that is oriented at least approximately perpendicularly to the direction 412 in which it came in.

It is then possible for a further vehicle 100 to be moved through the entry region 402 and into the transfer location 404 directly afterwards, with only negligible idle time, in particular in order ultimately to be able to feed a further object 102 to the station 234.

Depending on the configuration of the vehicles 100, in particular depending on the maximum lifting height of the receiving elements 170, and/or depending on the type and configuration of the station conveying device 244, it may be provided for a plurality of load-bearing elements 408 to be connected to one another. However, it may also be provided for at least two load-bearing elements 408, in particular the load-bearing elements 408 that delimit the entry region 402, to be at a spacing from the rest of the load-bearing elements 408 and/or to be separated from the rest of the load-bearing elements 408 in particular by one or more exit regions 410.

A spacing between the load-bearing elements 408 is preferably selected such that an object 102 and/or an adapter device 208 that are mounted on the load-bearing elements 408 on conveying elements 406 are downwardly supported in every conceivable location along the movement path on the station conveying device 234 and are thus reliably prevented from undesired tilting or falling.

Because the transfer region 400 preferably has an exit region 410 that is spatially separated from an entry region 402, transfer of a relatively large number of objects 102 can preferably be performed more efficiently and in a shorter time.

Otherwise, the embodiment of the transfer region 400 that is illustrated in FIGS. 26 to 28 corresponds, as regards its structure and functioning, to the receiving location 256 and/or the discharge location 242 according to FIGS. 14 and 15, so in this respect reference is made to the description thereof above.

In all of the embodiments of vehicles 100, preferably in each case one or more sensor devices 190 of the vehicle 100 are provided by means of which a respective area 192 surrounding the vehicle 100 is detectable.

By means of the one or more sensor devices 190, in particular a three-dimensional surrounding area, that is to say a three-dimensional surrounding region 192, is detectable, wherein the detection itself preferably takes place in two dimensions or similarly three dimensions—that is to say that, of items that are detected within the detected surrounding region 192, preferably their dimensions and location in relation to the vehicle 100 are detected. In particular, the dimensions and location of the detected items is calculated by means of the control device of the vehicle 100 from sensor data of the one or more sensor devices 190.

The surrounding region 192 is preferably composed of a plurality of zones, or comprises a plurality of zones. The zones may either be overlapping in form, or cover spatial regions that are entirely different from one another.

Preferably, zones of the surrounding region 192 that are different from one another are detectable by means of the one or more sensor devices 190.

Zones are divided up for example by the selection of boundary lines at different spacings from the vehicle. As can be seen in particular from FIG. 29, the surrounding region 192 may be divided up for example into three zones in the horizontal direction, in particular depending on their distance from the vehicle 100.

An innermost zone, at the smallest spacing from the vehicle 100, in particular a zone directly adjoining the vehicle 100, is for example the protection zone SZ.

This protection zone SZ is preferably a region in which in particular for undisrupted operation no item other than the vehicle 100 itself (and where appropriate the object 102) is permitted to be arranged. Preferably, in the event of detecting an item in this protection zone SZ, the vehicle 100 is put in a halt mode immediately and/or automatically.

The protection zone SZ in particular takes a ring-shaped form, as seen in horizontal section.

A further zone, adjoining the protection zone SZ, is for example a warning zone WZ. The warning zone WZ surrounds the protection zone SZ, preferably in a ring shape, in particular in relation to a horizontal section through the vehicle 100, the protection zone SZ and the warning zone WZ.

The warning zone WZ is in particular a region in which no item other than the vehicle 100 itself should be arranged, wherein detection of an item does not yet necessarily result in triggering the halt mode. Rather, in the event of detecting an item in this warning zone WZ, the vehicle 100 is preferably put in the warning mode immediately and/or automatically.

Outside the warning zone WZ there is in particular a free zone, which where required is detectable by the one or more sensor devices but which is not monitored for the presence of items, etc.

The items that are designated as items detected by the at least one sensor device 190 are in particular items that, in an expected normal mode of the vehicle 100 and/or a treatment installation, should not be at the detected location. However, the one or more sensor devices 190 also detect items that are constituent parts of the conveying device and/or the treatment installation and of which the presence is necessary.

The control device 204 of the vehicle 100 and/or a higher-level control installation preferably carry out a check, in particular a calculation, of whether a detected item is an unexpected and/or unknown and/or disruptive item or an item of which the presence is acceptable.

Preferably, this check is performed before the vehicle 100 is put in the warning mode or halt mode.

Depending on a current condition of the vehicle 100, in particular depending on whether the vehicle 100 is loaded with an object 102 or has no load, and/or depending on the current speed and the direction in which the vehicle 100 is moving, preferably the boundary lines between the zones are varied. For example, at a relatively high speed of the vehicle 100, preferably the boundary lines in the region in front of the vehicle 100 (with respect to the direction of travel) are shifted away from the vehicle 100, such that the zones—in particular the warning zone and/or the protection zone—are made larger in front of the vehicle 100.

In the event of travelling around a bend, for example curving and/or at least partial lateral shifting of the zones may be provided such that they cover as large a spatial region along the actual travel section (movement path) as possible, in particular in the region in front of the vehicle 100.

The region behind the vehicle 100 (with respect to the direction of travel) usually need not to be monitored as carefully, with the result that the parts of the zones—in particular the warning zone and/or the protection zone—that are behind the vehicle 100 can be made smaller.

The control device 204 of the vehicle 100 and/or a higher-level control installation adjust the courses of the boundary lines and/or the dimensions and/or the shape of the zones—in particular the warning zone and/or the protection zone—in relation to the respectively current condition, preferably periodically, for example a plurality of times a minute or second.

As an alternative or in addition, it is in particular always possible to make an adjustment if the vehicle 100 undergoes a change in condition, for example a change in direction, loading, unloading, acceleration, etc.

As a condition feature that in particular affects the courses of the boundary lines of the zones, there may further preferably be used the current location of the vehicle 100 within the conveying device and/or treatment installation.

In particular, in respect of their dimensions and/or shapes the zones may be varied depending on the current location of the vehicle 100 within the conveying device and/or treatment installation.

For example, when the vehicle 100 is approaching a station 234 and there is an expectation that parts of the station 234 will come within the warning zone WZ and/or the protection zone SZ (or that the warning zone WZ and/or the protection zone SZ will extend into the parts of the station 234), it may be provided for the zones—in particular the warning zone WZ and/or the protection zone SZ—to be made smaller such that the parts of the station 234 lie outside the warning zone WZ and/or the protection zone SZ.

In particular, if straight-ahead travel is expected in the station 234, a lateral detection of the surrounding area can be reduced or completely deactivated.

As an alternative or in addition, it may be provided as a vehicle 100 approaches a station 234 for a station mode to be activated, in which a maximum speed of the vehicle 100 is reduced in order to compensate the increased risk potential that is the result of reducing monitoring of the surrounding area. Approach to a station 234 may be determined for example by scanning a locating aid and/or by location sensors and/or proximity sensors.

Figure 29:
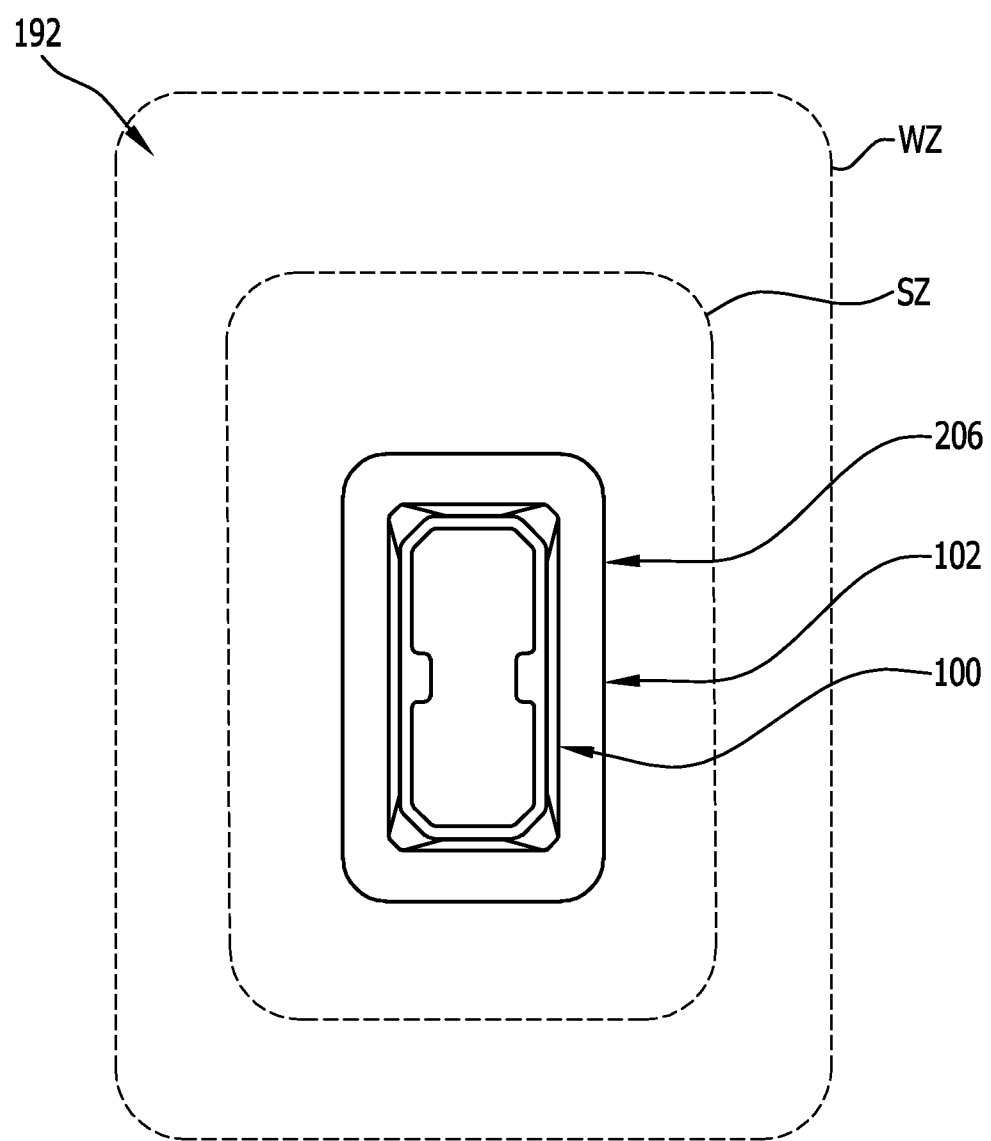
FIG. 29 shows a schematic plan view from above of a combination comprising a vehicle and an object arranged thereon, for the purpose of illustrating functioning of the sensor devices, wherein for the sake of simplifying the explanation the vehicle, which is actually arranged below the object, is also visible.

In relation to FIG. 29, in particular dividing up into zones in the horizontal direction was explained. It may further be advantageous if, as an alternative or in addition to dividing up into zones in the horizontal direction, division into zones in the vertical direction is provided.

Figure 30:
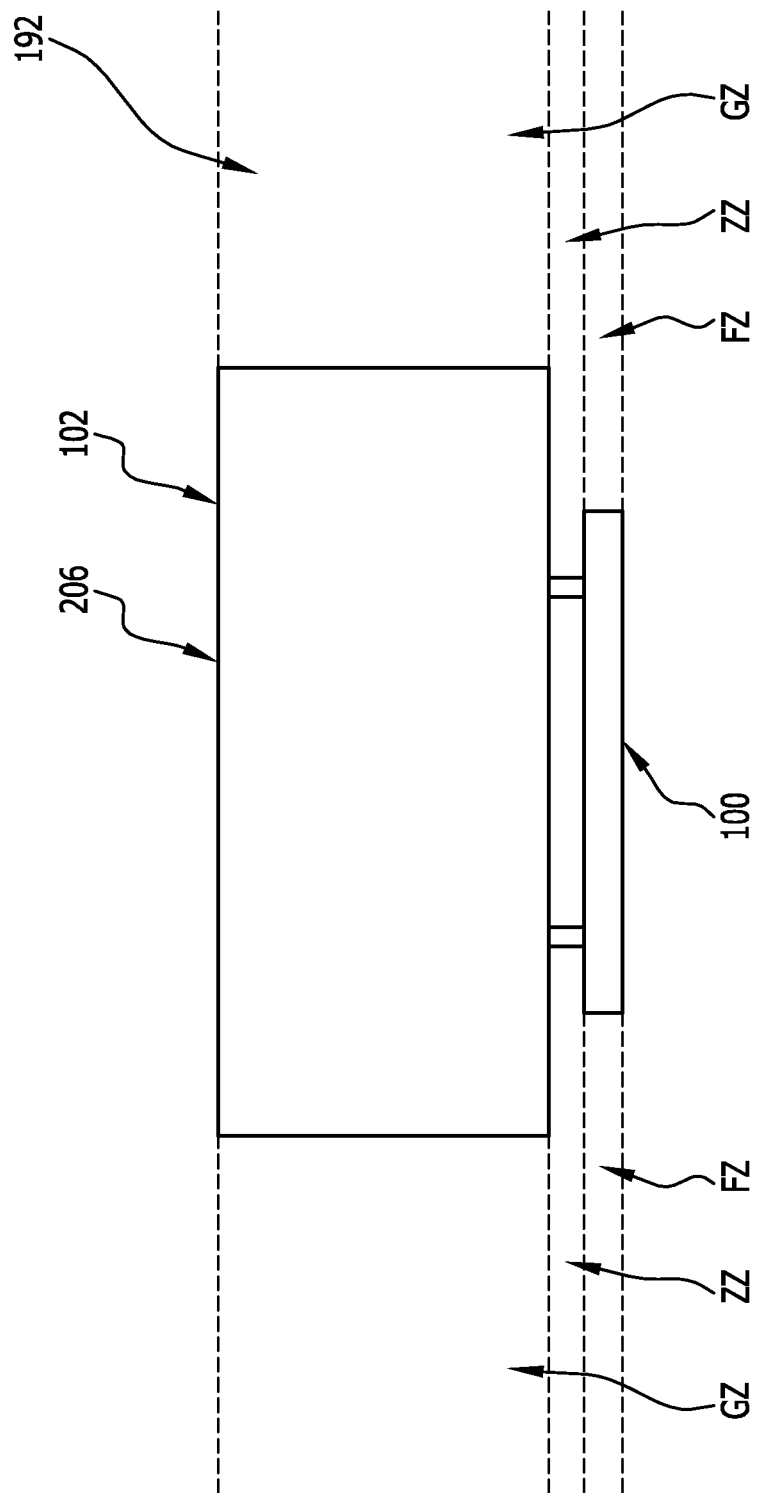
FIG. 30 shows a schematic side view of the combination comprising a vehicle and an object arranged thereon, according to FIG. 29.

As can be seen from FIG. 30, in particular it may be provided for a zone within which the vehicle 100 is arranged to be defined in the vertical direction. This zone is in particular a vehicle zone FZ.

The vehicle zone FZ extends in the vertical direction, in particular from the floor on which the vehicle 100 is configured to travel as far as an upper side 172 of the base body 104 of the vehicle 100 or an upper end of one or more receiving elements 170.

It is thus in particular possible, by detecting the spatial region of the surrounding region 192 that forms or comprises the vehicle zone FZ, to determine whether the vehicle 100 is approaching further vehicles 100.

A further zone in the vertical direction results from the dimensions of the object 102 arranged on the vehicle 100. This zone, which covers the object 102, extends in the vertical direction in particular from an underside of the object 102 (where appropriate including an adapter or skid or similar) and/or as far as an upper side of the object 102, preferably from a lowest point on the object 102 (where appropriate including an adapter or skid or similar) and/or as far as a highest point on the object 102. In the present document, this zone is designated the object zone GZ.

It may be provided for the object zone GZ to directly adjoin the vehicle zone FZ.

As an alternative, it may be provided for there to be arranged between the object zone GZ and the vehicle zone FZ an intermediate zone ZZ, which in particular extends from the upper side 192 of the base body 104 of the vehicle 100 and/or as far as an underside of the object 102 (where appropriate including an adapter or skid or similar), preferably as far as a lowest point on the object 102 (where appropriate including an adapter or skid or similar).

Further, it may be provided for the intermediate zone ZZ to extend in the vertical direction at least approximately for the distance by which the one or more receiving elements 170 project out of the base body 104 of the vehicle 100.

It may be favourable if the zones that are divided up in the vertical direction are overlaid by the zones that are divided up in the horizontal direction, in particular in order, for the combination comprising the vehicle 100 and the object 102, to enable optimum detection of the surrounding area and to avoid risk.

Preferably, there is associated with the vehicle zone FZ a warning zone WZ and/or a protection zone SZ, such that in particular the question of whether the vehicle 100 comes too close to further vehicles 100 or other items is monitorable.

The concept of associating a zone that results from dividing up in the horizontal direction (warning zone WZ, protection zone SZ) with a zone that results from dividing up in the vertical direction (vehicle zone FZ, intermediate zone ZZ, object zone GZ) should in particular be understood to mean that a spatial region that forms a zone that is only defined in the vertical direction and is thus unlimited in the horizontal direction (FZ, ZZ, GZ) is divided up into a plurality of zones (WZ, SZ) in the horizontal direction.

Further, it may be provided for there to be associated with the object zone GZ a warning zone WZ and/or a protection zone SZ, such that in particular the question of whether the vehicle 100 comes too close to further vehicles 100 or other items is monitorable.

Moreover, it may be provided for there to be associated with the intermediate zone ZZ a warning zone WZ and/or a protection zone SZ, such that in particular the question of whether the vehicle 100 comes too close to an item in the region of the one or more receiving elements 170 is monitorable.

The spatial extent, in particular in the horizontal direction, and/or the shape of the warning zone WZ associated with the vehicle zone FZ and/or the protection zone SZ associated with the vehicle zone FZ depend in particular on whether the vehicle 100 is loaded and/or where in the conveying device and/or treatment installation the vehicle 100 is located.

The spatial extent, in particular in the horizontal direction, and/or the shape of the warning zone WZ associated with the object zone GZ and/or the protection zone SZ associated with the object zone GZ depend in particular on whether an object 102 is arranged on the vehicle 100, the dimensions that this object 102 itself has, and/or where in the conveying device and/or treatment installation the vehicle 100, together with the object 102 arranged thereon, is located. In particular, if the vehicle 100 has no load—that is to say if there is no object 102 present—it may be provided for monitoring of the surrounding area in the region of the object zone GZ to be completely deactivated.

The spatial extent, in particular in the horizontal direction, and/or the shape of the warning zone WZ associated with the intermediate zone ZZ and/or the protection zone SZ associated with the intermediate zone ZZ depend in particular on whether there is an object 102 arranged on the vehicle 100, how far the one or more receiving elements 170 project from the base body 104, and/or where in the conveying device and/or treatment installation the vehicle 100, together with the object 102 arranged thereon if applicable, is located. In particular, it may be provided for monitoring of the surrounding area to be deactivated in the region of the intermediate zone ZZ when the vehicle 100 enters a station 234 and/or passes through a station 234 and at the same time the one or more receiving elements 170 project into a partitioning floor 248 or through a partitioning floor 248.

In one embodiment, it may be provided for each vehicle 100, autonomously and independently of the other vehicles 100, for example on the basis of monitoring of the surrounding area, to check and/or monitor the route or movement path that it has as a result of a job, in particular in order to avoid collisions.

In addition, it may further be provided for the vehicles 100 to provide information to one another (directly or indirectly by way of the higher-level control installation) on the respective vehicle condition and/or the respective extents and/or shapes of the zones, in particular the warning zones WZ, protection zones SZ, vehicle zones FZ, object zones GZ and/or intermediate zones ZZ. As a result, it is possible for in particular planned overlaps in the zones, which can result for example if two vehicles 100 pass one another closely in opposite directions, to be deliberately tolerated without triggering an unnecessary warning mode.

It may be favourable if an object zone GZ and/or a warning zone WZ and/or a protection zone SZ is associated with one or more or all of the objects 102, in particular vehicle bodies 206, even if the respective object 102 is not arranged on the vehicle 100. In particular, it is also possible to provide such division into zones in storage locations and/or parking locations.

Such an association between zones in particular enables a higher-level coordination of all of the objects 102, independently of the respective arrangement on a vehicle 100, as a result of which potential risks of collision between travelling objects 102 (objects 102 arranged on a vehicle 100) and parked objects 102 (objects 102 not arranged on a vehicle 100) can preferably also be minimised.

Figure 31:
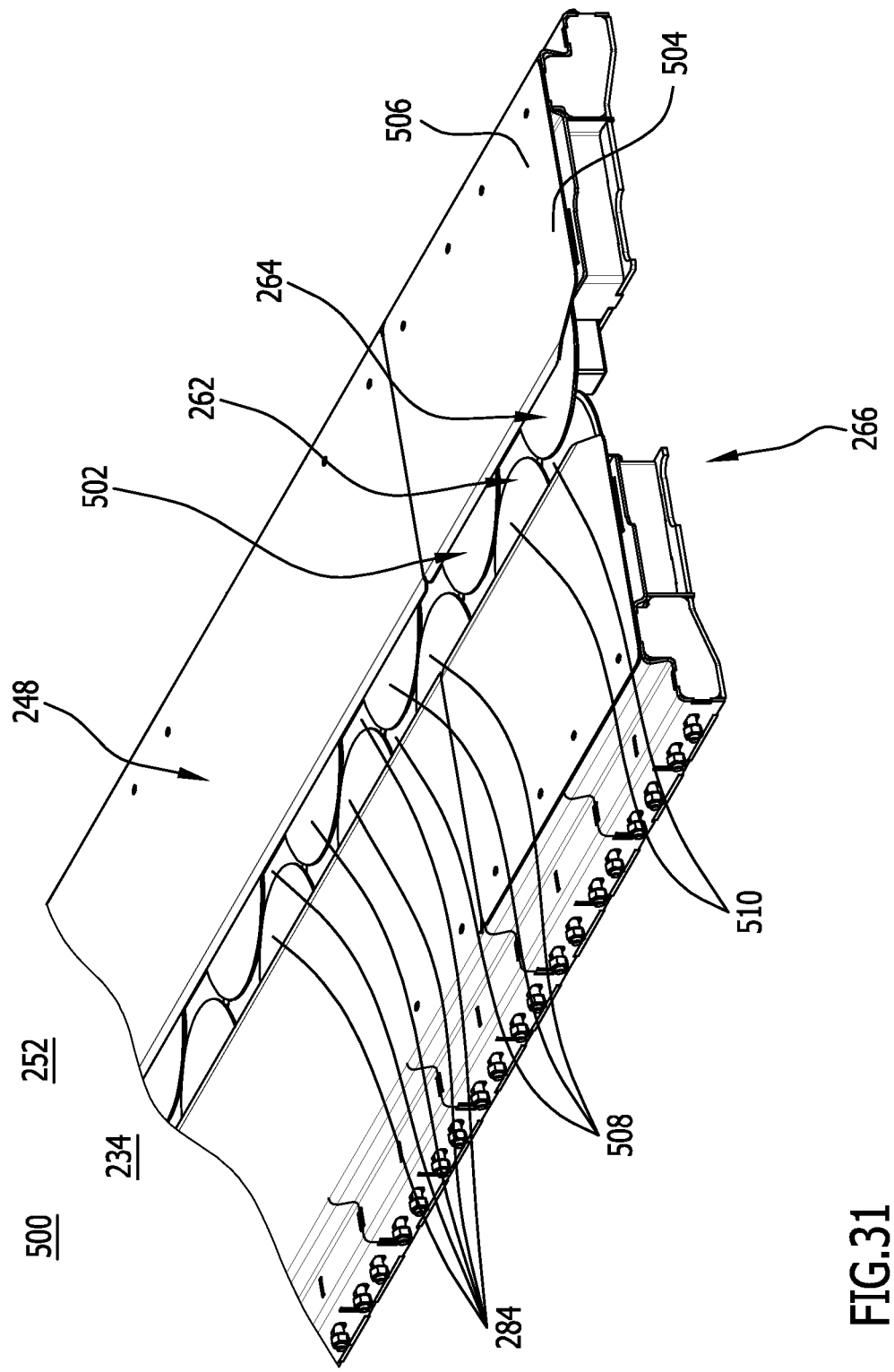
FIG. 31 shows a schematic perspective illustration of a partitioning floor of a conveying device, wherein the partitioning floor has a penetration region that is closable by means of closing elements.
Figure 32:
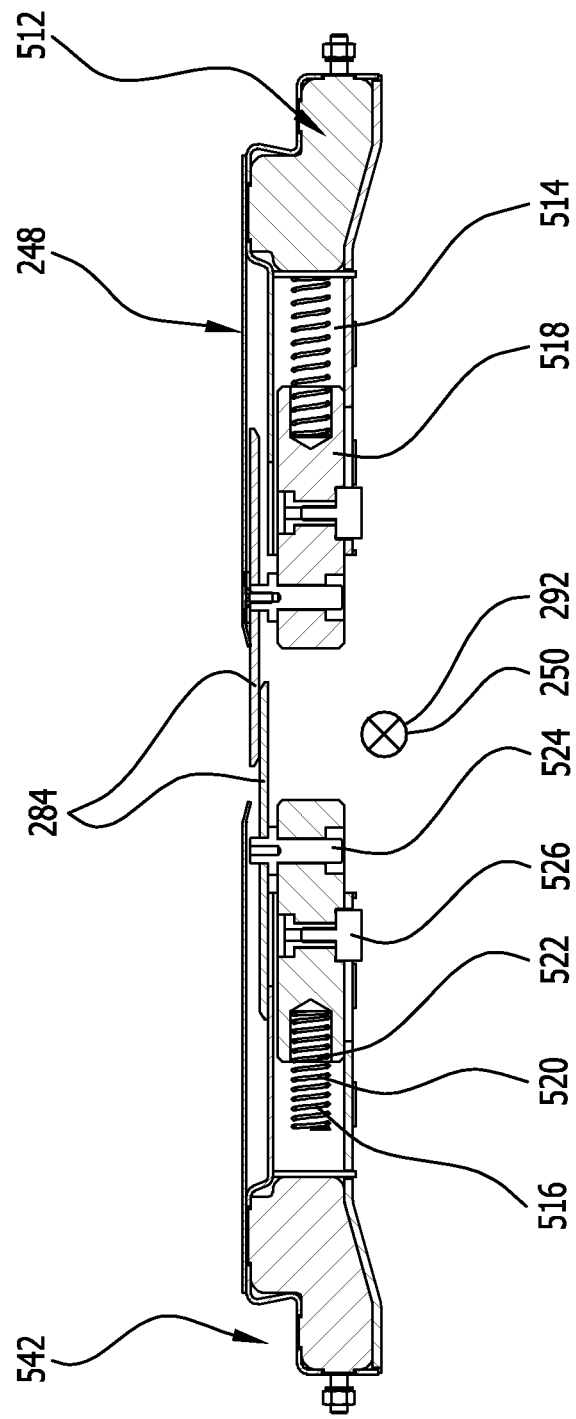
FIG. 32 shows a schematic vertical cross section through the partitioning floor from FIG. 31.
Figure 33:
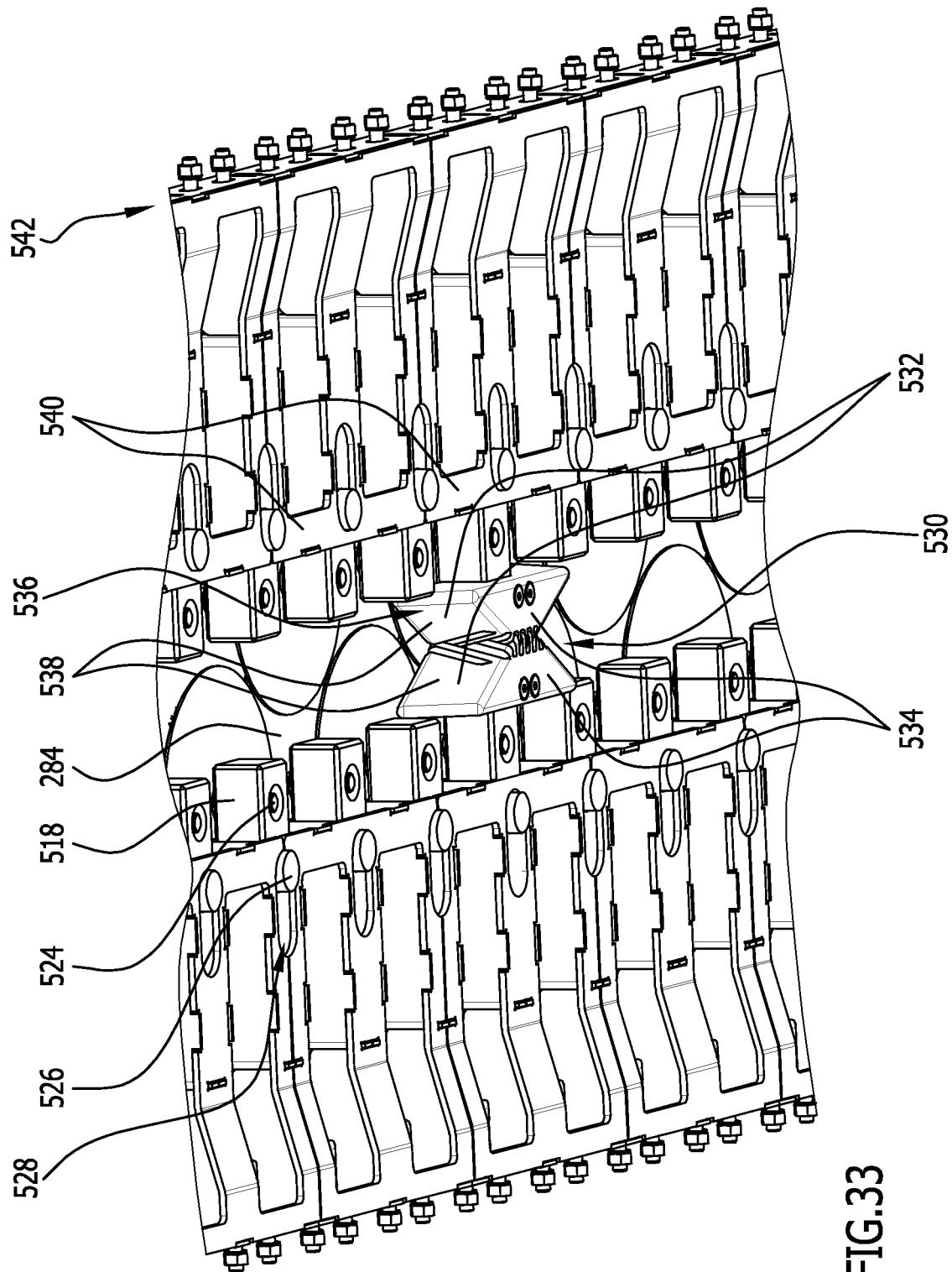
FIG. 33 shows a schematic perspective illustration of the partitioning floor from FIG. 31, with a view of an underside of the partitioning floor.

An embodiment that is illustrated in FIGS. 31 to 33 of a partitioning floor that is designated 248 as a whole may in principle be used in all the variants of a conveying device.

In particular, the partitioning floor 248 serves to partition off a processing region 252 of a station 234, in particular a treatment space 500, from a travel space 266.

The travel space 266 is in particular arranged below the partitioning floor 248, whereas the processing region 252, in particular the treatment space 500, is arranged above the partitioning floor 248.

As already described in relation to other embodiments, the partitioning floor 248 preferably comprises a penetration region 262, in particular a penetration slot 264.

Preferably, a plurality of closing elements 284 are further provided by means of which the penetration region 262 is closable.

The closing elements 284 in particular form a closure region 502 of the partitioning floor 248.

Together with a plurality of load-bearing panels 504 of the partitioning floor 248, the closure region 502 preferably forms a surface 506 of the partitioning floor 248 that is at least approximately entirely person-accessible.

The closing elements 284 for example take the form of slats 508 and/or closure panels 210.

Preferably, the partitioning floor 248 comprises a load-bearing structure 512 (see in particular FIG. 32) that serves on the one hand to receive the load-bearing panels 504 and on the other to position the closing elements 284.

Arranged on the load-bearing structure 512 are in particular a plurality of restoring element receptacles 514 of one or more restoring devices 516.

A plurality of restoring elements 518 of the restoring device 516 are preferably arranged to be movable on the restoring element receptacles 514, in relation thereto.

For example, a mechanical and/or electrical relative movement of the restoring elements 518 in relation to the restoring element receptacles 514 may be provided.

For example, for this purpose the restoring device 516 comprises one or more spring devices 520, in particular one or more pressure springs 522, which thus in particular enable the restoring elements 518 to be resiliently positioned on the restoring element receptacles 514.

The restoring elements 518 are mounted to be displaceable on the restoring element receptacles 514 in particular in a direction running perpendicularly to the conveying direction 250 and/or perpendicularly to a conveying path 292.

The restoring elements 518 are preferably provided with a respective one or more closing element receiving means 524.

One or more closing element receiving means 524 in particular take the form of bolts and serve to receive a respective closing element 284.

In particular, the closing elements 284 are arranged to be freely rotatable on the closing element receiving means 524.

As can be seen in particular from FIG. 33, each restoring device 516 preferably comprises an abutment element 526 and a guide opening 528.

The abutment element 526 is in particular displaceable in the guide opening 528, wherein a maximum extent of the guide opening 528 along a direction of movement of the restoring element 518 predetermines a maximum path of movement of the restoring element 518 as a result of the abutment element 526 abutting against the ends of the guide opening 528.

As can be seen in particular from FIGS. 31 and 32, the closing elements 284 of the partitioning floor 248 are arranged in particular to overlap one another, such that there is creatable a closure region 502 that is closed in the direction of closing the closing elements 284 and is in particular at least approximately completely closed.

The closing elements 284 are in particular round, for example circular, in form.

Moving a receiving element 170 into the penetration region 262 along the conveying direction 250 and/or the conveying path 292 has the effect that the closing elements 284 are movable away to the side, preferably successively and/or in each case in pairs, perpendicularly to the conveying direction 250 and/or perpendicularly to the conveying path 262, with the result that the respective receiving element 170 is movable along the conveying direction 250 and/or along the conveying path 292 such that it projects through the penetration region 262.

By means of a centring device 530 that comprises in particular a plurality of centring elements 534, for example two, that are provided with a lead-in chamfer 532, centring of the receiving element 170 within the penetration region 262 can preferably be enabled.

Further, for example by means of an opening device 536 that comprises in particular one or more, for example two, opening elements 538, it is possible to enable opening of the closure region 502, in particular actuation of one or more closing elements 284, in that a receiving element 170 is introduced vertically upwards into the penetration region 262 and/or moves below the closing elements 284 and is brought into engagement with the opening elements 538.

The centring device 530 and the opening device 536 may for example take the form of one and the same device, wherein the respective function can result in particular in dependence on a movement of the receiving elements 170 in relation to the device.

As can further be seen from FIG. 33, the partitioning floor 248 may in particular comprises a plurality of floor modules 540, wherein each floor module 540 comprises and/or bears and/or receives respectively one or more restoring devices 516 and/or restoring element receptacles 514 and/or closing element receiving means 524 and/or closing elements 284.

The operating modules 540 are in particular each connected to a mounting region 542 having further constituent parts of the load-bearing structure 512, wherein the mounting regions 542 are arranged and/or formed at the ends of the floor modules 540 that are remote from the penetration region 262.

The floor modules 540 in particular project away from the mounting regions 542 in a cantilever arrangement.

Preferably, the floor modules 540 further serve to receive one or more load-bearing panels 504, or form these.

Otherwise, the partitioning floor 248 according to the embodiment illustrated in FIGS. 31 to 33 corresponds, as regards its structure and functioning, as desired to individual or a plurality of the embodiments described above, so in this respect reference is made to the description thereof above, and the reader is also hereby referred explicitly to conceivable possible combinations for the provision of further embodiments that are not illustrated.

Figure 34:
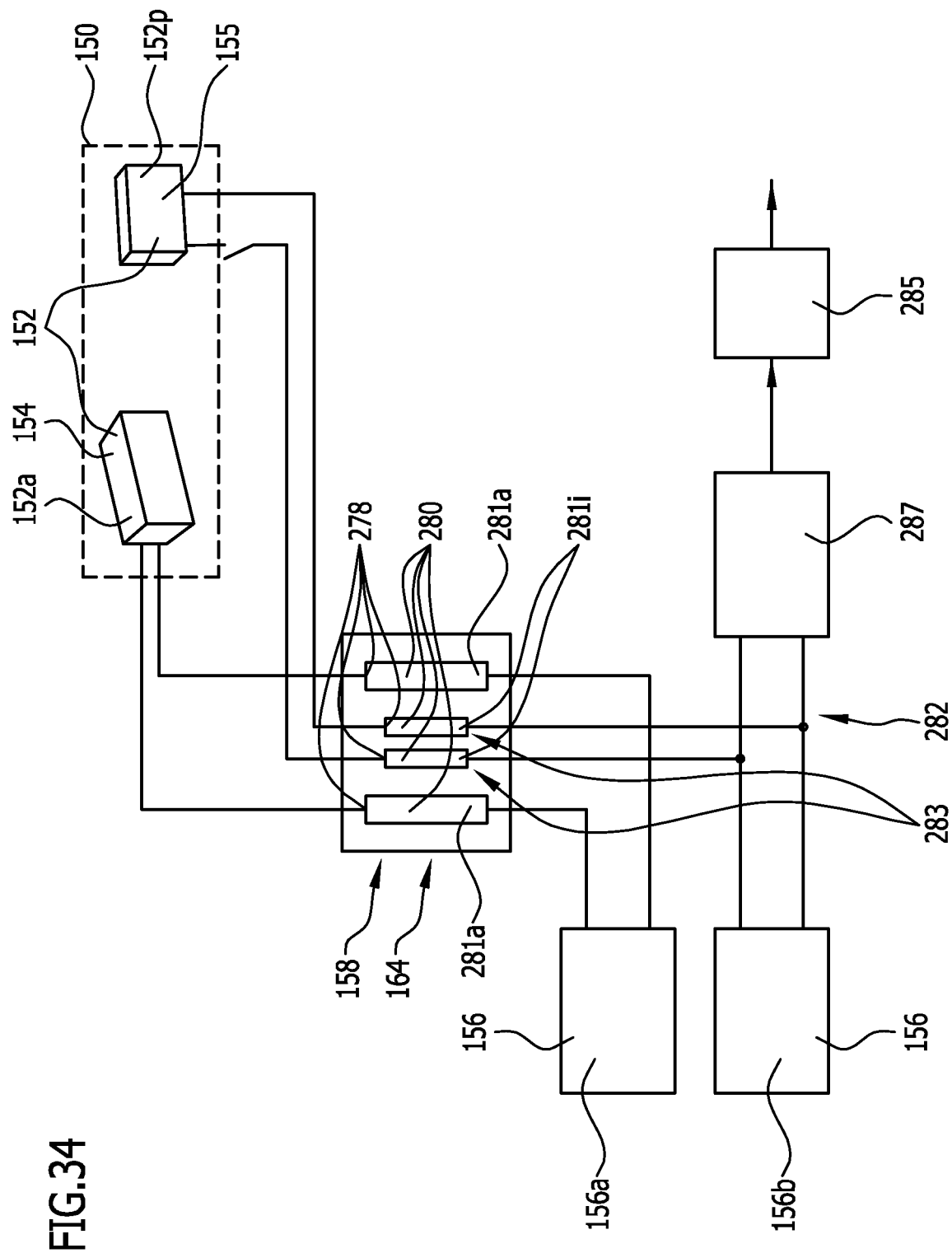
FIG. 34 shows a simplified circuit diagram for the purpose of illustrating a charging procedure.

FIG. 34 illustrates an example of a circuit diagram according to which the energy store 150 of the vehicle 100 is chargeable. Individual or a plurality of charging regions 158 and/or charge connection points 164 may for example be arranged and/or formed in accordance with this circuit diagram. Further, according to alternative embodiments, with one or more charging regions 158 it is possible to provide individual or a plurality of the features described below in isolation, in particular only a single charging device 156 for only one type of energy storage unit.

The energy store 150 serves in particular to store and provide electrical energy for driving the vehicle 100 and preferably comprises one or more energy storage units 152.

It may be favourable if the energy store 150 comprises one or more drive energy storage units 152a for storing energy for driving the vehicle 100 as a whole and/or for driving a lifting drive device 178.

One or more or all of the drive energy storage units 152a may take the form for example of supercapacitors 154.

As an alternative or in addition, it may be provided for the energy store 150 to comprise one or more buffer energy storage units 152p by means of which energy is providable for example for operating the control device 204 and/or one or more sensor devices 190 and/or one or more communication devices.

One or more or all of the buffer energy storage units 152p may take the form for example of lithium-ion accumulators 155.

Optionally, it may be provided for one or more or all of the buffer energy storage units 152p to be coupled or couplable to a drive device 110 and/or a lifting drive device 178 of the vehicle 100, in particular for providing energy for operating the drive device 110 and/or the lifting drive device 178 if the drive energy storage units 152a can no longer provide sufficient energy for this.

It may be provided for the one or more drive energy storage units 152a on the one hand and the one or more buffer energy storage units 152p on the other to have mutually different standard operating voltages and/or charge voltages.

For example, it may be provided for the one or more drive energy storage units 152a to be operable at a voltage, in particular a DC voltage, of at least approximately 48 V.

Further, it may be provided for the one or more buffer energy storage units 152p to be operable at a voltage, in particular a DC voltage, of at least approximately 24 V.

For the purpose of charging the energy store 150 at a charging region 158, the charging region 158 preferably comprises one or more charge connection points 164, which each have a plurality of contact regions 278 and/or contact elements 280 for providing electrical energy. In particular, there are provided a plurality of contact regions 278 and/or contact elements 280 for providing voltages of different voltage values, in order to enable the different energy storage units 152 to be charged at the respectively required voltage at the same time.

For example, there are provided at one or more charge connection points 164 in each case two or more than two pairs of contact regions 278 and/or contact elements 280 that serve to provide different charge voltages.

Contact regions 278 and/or contact elements 280 on the vehicle side of one or more charge connection points 164 of the vehicle 100 are preferably formed and/or arranged, at least in respect of their spatial form and/or arrangement, at least in certain regions such that they are complementary with the contact regions 278 and/or contact elements 280 of the one or more charge connection points 164 on the energy source side.

The contact regions 278 and/or contact elements 280 are in particular formed and/or arranged such that the possibility of cross-contact being made between contact regions 278 and/or contact elements 280 of pairs of contact regions 278 or contact elements 280 that do not belong together is ruled out.

It may be favourable if one or more or all of the charge connection points 164 have in each case at least one pair 281*a* of contact regions 278 and/or contact elements 280 on the outside, which serves in particular to charge the at least one drive energy storage unit 152*a*.

Further, it may be provided for one or more or all of the charge connection points 164 to have in each case at least one pair 281*i* of contact regions 278 and/or contact elements 280 on the inside, which serves in particular to charge the at least one buffer energy storage unit 152*p*.

The at least one inside pair 281*i* of contact regions 278 and/or contact elements 280 is in particular arranged between the two contact regions 278 and/or contact elements 280 of the at least one outside pair 281*a* of contact regions 278 and/or contact elements 280.

As an alternative, it is also possible for reversed utilisation of the contact regions 278 and/or contact elements 280 to be provided, with the result that the at least one inside pair 281*i* of contact regions 278 and/or contact elements 280 serves for example to charge the at least one drive energy storage unit 152*a*, while the at least one outside pair 281*a* of contact regions 278 and/or contact elements 280 serves for example to charge the at least one buffer energy storage unit 152*p*.

Further, it may be provided for one or more or all of the charge connection points 164 to have in each case one or more location contacts 283 which are configured to allow location identification and/or location monitoring of the vehicles 100 to be performed.

For example, one or more pairs of location contacts 283 may be provided that are arranged in particular on the inside, between contact regions 278 and/or contact elements 280 of the respective charge connection point 164, and/or on the outside, such that the contact regions 278 and/or contact elements 280 of the respective charge connection point 164 are arranged between the location contacts 283.

It may be advantageous if one or more sensor devices 190, for example location sensors, and/or one or more location contacts 283 are used to determine whether a vehicle 100 has come to a location that is required for charging the energy store 150, in relation to a charge connection point 164, and if so that one or more charge voltages are activated at the charge connection point 164, for the purpose of charging the energy store 150.

It may be favourable if one or more contact regions 278 and/or contact elements 280 for charging the energy store 150, in particular one or more drive energy storage units 152*a* and/or one or more buffer energy storage units 152*p*, at the same time serve as one or more location contacts 283.

It may be provided for one or more contact regions 278 and/or contact elements 280 and/or one or more location contacts 283 of the vehicle 100 each to have a safety device 285, for example a relay and/or a contactor, which is configured to temporarily switch off the voltage, for example to avoid short circuits at the energy store 150 when the contact regions 278 and/or contact elements 280 and/or location contacts 283 are being used for location identification and/or location monitoring.

As an alternative or in addition, it may be provided for one or more contact regions 278 and/or contact elements 280 and/or one or more location contacts 283 of one or more or all of the charge connection points 164 on the energy source side each to have a safety device 285, for example a relay and/or a contactor, which is configured to temporarily switch off the voltage, for example to avoid short circuits at the energy source when the contact regions 278 and/or contact elements 280 and/or location contacts 283 are being used for location identification and/or location monitoring.

For the purpose of switching between a location identification mode and a charge mode, in particular for the purpose of correspondingly controlling the safety device 285, preferably a handshake is provided between the vehicle 100 and the charge connection point 164 and/or the higher-level control installation.

In particular, it is possible to determine on the energy source side, as a result of a measurement device 287 measuring the voltage at the contact regions 278 and/or contact elements 280, whether a vehicle 100 is correctly positioned at the respective charge connection point 164. For example, it is possible to infer that a vehicle 100 is correctly positioned if the measured voltage is greater than 0.2 V, in particular greater than 0.5 V. If positioning is correct, in particular a charge mode is then activated.

After the end of the charging procedure, the charge connection point 164 is preferably put back into a location identification mode, in particular by activating the safety device 285.

Particular embodiments are as follows.

1. A vehicle (100), in particular for conveying objects (102), for example vehicle bodies (206), wherein the vehicle (100) comprises the following:
    a base body (104);
    a chassis (106), by means of which the base body (104) lies and/or is movable on a vehicle-accessible subsurface (160);
    a drive device (110) for driving the vehicle (100);
    a receiving device (168), which comprises one receiving element (170), two receiving elements (170) or more than two receiving elements (170), for receiving at least one object (102).
2. A vehicle (100) according to embodiment 1, characterised in that the receiving device (168) comprises exactly two receiving elements (170).
3. A vehicle (100) according to one of embodiments 1 or 2, characterised in that a plurality of receiving elements (170), in particular all of the receiving elements (170), extend in a plane that runs vertically and parallel to a longitudinal centre axis (140) of the vehicle (100).
4. A vehicle (100) according to one of embodiments 1 to 3, characterised in that the one receiving element (170), the two receiving elements (170) or the more than two receiving elements (170) are arranged movably on the base body (104).

5. A vehicle (100) according to embodiment 4, characterised in that the vehicle (100) comprises a lifting drive device (178) by means of which the one receiving element (170), the two receiving elements (170) or the more than two receiving elements (170) are raisable and/or lowerable in relation to the base body (104).

6. A vehicle (100) according to one of embodiments 1 to 5, characterised in that a plurality of receiving elements (170), in particular all of the receiving elements (170), are coupled to one another and are only jointly movable in relation to the base body (104).

7. A vehicle (100) according to embodiment 6, characterised in that a lifting drive device (178) of the vehicle (100) comprises a lifting drive element (182), in particular a lifting drive belt (184) or a lifting drive chain, wherein the lifting drive element (182) connects a lifting drive motor (180) and two or more than two receiving elements (170) to one another such that the two or more than two receiving elements (170) are jointly movable by means of the lifting drive motor (180), in particular being raisable and/or lowerable in relation to the base body (104).

8. A vehicle (100) according to embodiment 7, characterised in that
a) the lifting drive element (182) extends through a drive axis (148) of the drive device (110) for driving the vehicle (100), and/or
b) the lifting drive element (182) extends below a drive axis (148) of the drive device (110) for driving the vehicle (100).

9. A vehicle (100) according to one of embodiments 1 to 8, characterised in that the drive device (110) has a drive axis (148) that connects two drive elements (118), in particular drive wheels (120), of the drive device (110) to one another, wherein the drive axis (148) is oriented substantially transversely, in particular at least approximately perpendicularly, to a longitudinal centre axis (140) and/or main direction of travel (138) of the vehicle (100).

10. A vehicle (100) according to one of embodiments 1 to 9, characterised in that the drive device (110) has a drive axis (148) that connects two drive elements (118), in particular drive wheels (120), of the drive device (110) to one another, wherein the drive axis (148) is arranged, with respect to a longitudinal centre axis (140) and/or main direction of travel (138) of the vehicle (100), at least approximately centrally on the base body (104) of the vehicle (100).

11. A vehicle (100) according to one of embodiments 1 to 10, characterised in that the drive device (110) has a drive axis (148) that connects two drive elements (118), in particular drive wheels (120), of the drive device (110) to one another, wherein the drive elements (118) are jointly mounted on the base body (104) by means of the drive axis (148).

12. A vehicle (100) according to one of embodiments 1 to 11, characterised in that a plurality of drive elements (118), in particular drive wheels (120), of the drive device (110) are drivable independently of one another.

13. A vehicle (100) according to one of embodiments 1 to 12, characterised in that the drive device (110) comprises a drive axis (148) and/or one or more drive elements (118) that are lowerable and/or pressable onto a floor and/or are raisable away from the floor by means of an actuation device (146),
wherein the drive axis (148) and/or one or more drive elements (118) are preferably integrated into the base body (104) of the vehicle (100) and/or surrounded on five sides by the base body (104), and/or wherein the actuation device (146) is preferably accessible at an outer side of the vehicle (100), for the purpose of actuating it.

14. A vehicle (100) according to one of embodiments 1 to 13, characterised in that the one receiving element (170), the two receiving elements (170) or the more than two receiving elements (170) each have a receiving portion (174) that tapers towards an upper end, as seen in relation to the direction of gravity (g).

15. A vehicle (100) according to embodiment 14, characterised in that one or more receiving portions (174), in particular all of the receiving portions (174), take a form that is substantially conical, partially conical, frustoconical or partially frustoconical.

16. A vehicle (100) according to one of embodiments 1 to 15, characterised in that the one receiving element (170), the two receiving elements (170) or the more than two receiving elements (170) are configured to be arranged in different locations in relation to the base body (104), wherein the one receiving element (170), the two receiving elements (170) or the more than two receiving elements (170) project, preferably in a position that is lowest with respect to the direction of gravity (g), beyond an upper side (172) of the base body (104).

17. A vehicle (100) according to one of embodiments 1 to 16, characterised in that the one receiving element (170), the two receiving elements (170) or the more than two receiving elements (170) have a height that, as seen parallel to the direction of gravity (g), is greater than a height of the base body (104) of the vehicle (100) as seen parallel to the direction of gravity (g).

18. A vehicle (100) according to one of embodiments 1 to 17, characterised in that the vehicle (100) comprises one or more receiving sensors (188) by means of which
a) an object (102) arranged on at least one receiving element (170) is detectable and/or its correct positioning is monitorable; and/or
b) an orientation and/or a location of an object (102) that is arranged at a spacing from the at least one receiving element (170) are detectable.

19. A vehicle (100) according to embodiment 18, characterised in that at least one receiving sensor (188) is arranged on the base body (104) and/or on the receiving element (170).

20. A vehicle (100) according to one of embodiments 18 or 19, characterised in that at least one receiving sensor (188) interacts with a detection aid (220) on an object (102) that is received or is to be received.

21. A vehicle (100) according to one of embodiments 1 to 20, characterised in that the receiving element (170) comprises a lubricating device (175) which is in particular integrated into the receiving element (170).

22. A vehicle (100) according to embodiment 21, characterised in that the lubricating device (175) is integrated into a shaft portion (173) and/or a receiving portion (174) of the receiving element (170), for example being arranged completely within the shaft portion (173) and/or the receiving portion (174).

23. A vehicle (100) according to one of embodiments 21 or 22, characterised in that the lubricating device (175) comprises a reservoir (177) for receiving lubricant, and a dispensing element (179) for the controllable supply of lubricant from the reservoir (177) to an object that is to be lubricated, in particular a part of a lifting drive device (178).
24. A vehicle (100) according to one of embodiments 1 to 23, characterised in that a cover (196) for covering an interior of the base body (104) is arranged on an upper side (172) of the base body (104), wherein the cover (196) is placed on the base body (104) and/or closes at least approximately completely peripherally flush with a placement region (198) of the base body (104).
25. A vehicle (100) according to one of embodiments 1 to 24, characterised in that a cover (196) for covering an interior of the base body (104) is arranged on an upper side (172) of the base body (104), wherein the cover (196) takes an at least partly transparent form.
26. A vehicle (100) according to one of embodiments 1 to 25, characterised in that the base body (104) takes a substantially cuboid form, wherein four corner regions (112) of the base body (104) are preferably each provided with a support roller (108) that is rotatable about 360° and/or not driven.
27. A vehicle (100) according to one of embodiments 1 to 26, characterised in that the base body (104) takes a substantially cuboid form, wherein two or four corner regions (112) of the base body (104) are each provided with an outwardly projecting sensor device (190) of the vehicle (100).
28. A vehicle (100) according to one of embodiments 1 to 27, characterised in that the vehicle (100) comprises one or more sensor devices (190), which each have one or more sensor elements for detecting an area surrounding the vehicle (100), wherein in a substantially horizontal plane the one or more sensor elements each have, individually or jointly, a detection range of at least approximately 250°, in particular approximately 270°.
29. A vehicle (100) according to one of embodiments 1 to 28, characterised in that the vehicle (100) comprises one or more sensor devices (190) that are coupled to a control device (204) of the vehicle (100), wherein the control device (204) takes a form and is arranged such that, depending on sensor values that are detected and/or identified by means of the one or more sensor devices (190), the vehicle (100) is operable in different operating modes, in particular in at least three different operating modes.
30. A vehicle (100) according to embodiment 29, characterised
a) in that one of the operating modes is a normal mode, in which there are no unexpected and/or unknown and/or disruptive items arranged on a drive path or in another predetermined region (192) surrounding the vehicle (100);
and/or
b) in that one of the operating modes is a warning mode, in which one or more unexpected and/or unknown and/or disruptive items are arranged in a predefined warning section of a drive path or another predetermined region (192) surrounding the vehicle (100);
and/or
c) in that one of the operating modes is a halt mode, in which one or more unexpected and/or unknown and/or disruptive items are arranged in a predefined halt section of a drive path or another predetermined region (192) surrounding the vehicle (100).
31. A vehicle (100) according to embodiment 30, characterised
i) in that in the warning mode a speed of travel of the vehicle (100) is reduced, and/or in that in the warning mode a warning device (200) of the vehicle (100) is configured to emit an acoustic warning signal and/or a visual warning signal;
and/or
ii) in that in the halt mode the vehicle (100) is braked to a standstill, and/or in that in the halt mode a warning device (200) of the vehicle (100) is configured to emit an acoustic emergency signal and/or a visual emergency signal, and/or in that in the halt mode the control device (204) is configured to transmit an emergency signal to a higher-level control installation, for controlling and/or monitoring a plurality of vehicles (100).
32. A vehicle (100) according to embodiment 31, characterised in that a warning signal and/or an emergency signal comprises an instruction to clear the route and/or the area surrounding the vehicle (100).
33. A vehicle (100) according to one of embodiments 1 to 32, characterised in that one or more emergency off switches are arranged on a vehicle (100) or on one or more other components of a conveying device and/or treatment installation and/or logistics installation, wherein, preferably, there is associated with each emergency off switch a communication device that is configured to transmit an emergency stop signal to one or more or all of the vehicles (100) in order to put the one or more or all of the vehicles (100) in an emergency stop mode.
34. A vehicle (100) according to embodiment 33, characterised in that one or more, in particular all, of the vehicles (100) each comprise a control device (204) which is configured to process an emergency stop signal, in particular before the vehicle (100) is put in an emergency stop mode.
35. A vehicle (100) according to embodiment 34, characterised in that a control device (204) is configured to check whether the respective vehicle (100) absolutely must be put in the emergency stop mode or not, wherein this check takes account of the following:
the location of the vehicle (100) in relation to one or more other vehicles (100); and/or
a spacing between the vehicle (100) and one or more other vehicles (100); and/or
the location of the vehicle (100) in relation to the emergency off switch at which the emergency stop signal was triggered; and/or
a spacing between the vehicle (100) and the emergency off switch at which the emergency stop signal was triggered; and/or
the speed of the vehicle (100) at the moment of transmission and/or triggering of the emergency stop signal; and/or
a predetermined and/or calculated movement path of the vehicle (100), in particular in relation to one or more other vehicles (100) and/or in relation to the emergency off switch at which the emergency stop signal was triggered.
36. A vehicle (100) according to one of embodiments 1 to 35, characterised in that one or more emergency off switches are configured to trigger different types of emergency stop mode scenario, wherein these different types of emergency stop mode scenario differ from one another for example
a) in respect of an extent or size or dimension of the surrounding area in which the vehicles (100) are put in the emergency stop mode, and/or b) in respect of the criteria for checking the respective vehicle (100) by the control device (204), and/or c) in respect of the targeted control of different groups of vehicles (100).

37. A vehicle (100) according to one of embodiments 1 to 36, characterised in that the vehicle (100) is configured to be put in an emergency stop mode by means of an emergency stop signal, and in that in this emergency stop mode the vehicle (100) is configured to emit a signal to one or more further vehicles (100) that are in an area surrounding the vehicle (100), wherein by means of the signal the one or more vehicles (100) are put in particular in an alert condition in order for example to avoid colliding with the vehicle (100) that has been put in the emergency stop mode.

38. A vehicle (100) according to one of embodiments 1 to 37, characterised in that the vehicle (100) is configured to travel in multiple directions, in particular in two directions, and in that one or more display elements (202) at each end region of the vehicle (100) are configured to display, depending on a current direction of travel, whether the respective end region is currently a front region or a rear region of the vehicle (100).

39. A vehicle (100) according to one of embodiments 1 to 38, characterised in that the vehicle (100) comprises one or more charge connection points (164) for charging up an energy store (150) of the vehicle (100).

40. A vehicle (100) according to embodiment 39, characterised in that a charge connection point (164) is arranged on an underside (114) of the base body (104), and in that, for the purpose of charging up the energy store (150), the vehicle (100) is positionable above a corresponding charge connection point (164) of a charging region (158).

41. A vehicle (100) according to embodiment 40, characterised in that this charge connection point (164) is configured to be coupled to a corresponding charge connection point (164) of a charging region (158) with contact, for example by means of a sliding contact, and/or without contact, for example inductively.

42. A vehicle (100) according to one of embodiments 39 to 41, characterised in that a further charge connection point (164) is arranged on a side wall (166) of the base body (104), wherein this further charge connection point (164) is configured to be coupled to a corresponding charge connection point (164) of a charging region (158) in particular by means of a plug connection.

43. A vehicle (100) according to one of embodiments 39 to 42, characterised in that at least one charge connection point (164) is arranged and/or formed on at least one receiving element (170).

44. A vehicle (100) according to one of embodiments 1 to 43, characterised in that the vehicle (100) comprises an energy store (150) for storing and providing electrical energy for driving the vehicle (100), wherein the energy store (150) comprises one or more energy storage units (152) that take the form of a capacitor, in particular a supercapacitor (154) or ultracapacitor.

45. A vehicle (100) according to one of embodiments 1 to 44, characterised in that the vehicle (100) comprises an energy store (150) by means of which electrical energy is storable and providable for driving a lifting drive device (178) of the vehicle (100).

46. A vehicle (100) according to embodiment 45, characterised in that by means of this same energy store (150), in particular this same energy storage unit (152) or these same energy storage units (152) of the energy store (150), energy is storable and providable both for driving the lifting drive device (178) and also for driving the vehicle (100).

47. A vehicle (100) according to one of embodiments 1 to 46, characterised in that the vehicle (100) comprises an energy store (150) that comprises:

a) one or more drive energy storage units (152*a*) for storing energy for driving the vehicle as a whole and/or for driving a lifting drive device; and b) one or more buffer energy storage units (152*p*) by means of which energy is providable for example for operating a control device (204) and/or one or more sensor devices (190) and/or one or more communication devices.

48. A vehicle (100) according to embodiment 47, characterised in that the one or more drive energy storage units (152*a*) on the one hand and the one or more buffer energy storage units (152*p*) on the other have mutually different standard operating voltages and/or charge voltages.

49. A vehicle (100) according to one of embodiments 1 to 48, characterised in that the vehicle (100) comprises a control device (204) that takes a form and is arranged such that the vehicle (100) is optionally operable in a safety mode or an express mode, wherein the vehicle (100) is put in the safety mode if persons are detected in the area surrounding the vehicle (100) and/or if a vehicle is travelling in a region that is accessible to persons, and wherein the vehicle (100) is put in the express mode if no persons are detected in the area surrounding the vehicle (100) and/or if a vehicle is travelling in a region that is inaccessible to persons.

50. A vehicle (100) according to embodiment 49, characterised in that the vehicle (100) is configured to be put in the safety mode or the express mode by means of a device, in particular a sensor device (190), that is not located on the vehicle (100), for example by using external safety contacts, etc.

51. A vehicle (100) according to one of embodiments 1 to 50, characterised in that the vehicle (100) comprises one or more sensor devices (190) by means of which a region (192) surrounding the vehicle (100) is detectable.

52. A vehicle (100) according to embodiment 51, characterised in that by means of the one or more sensor devices (190), a three-dimensional surrounding region (192) is detectable in three dimensions, wherein items that are detected within the detected surrounding region (192) are preferably detectable with respect to their dimensions and location relative to the vehicle (100).

53. A vehicle (100) according to embodiment 52, characterised in that the dimensions and location of the detected items are calculated by means of a control device (204) of the vehicle (100) from sensor data of the one or more sensor devices (190).

54. A vehicle (100) according to one of embodiments 51 to 53, characterised in that the surrounding region (192) is composed of a plurality of zones, or comprises a plurality of zones, wherein the zones are overlapping in form, or cover spatial regions that are entirely different from one another.

55. A vehicle (100) according to one of embodiments 51 to 54, characterised in that zones of the surrounding region (192) that are different from one another are detectable by means of the one or more sensor devices (190).

56. A vehicle (100) according to one of embodiments 51 to 55, characterised in that the surrounding region (192) is divided up into a plurality of zones, in particular into three zones, in the horizontal direction.

57. A vehicle (100) according to embodiment 56, characterised in that one of the zones is a protection zone (SZ) in which in particular for undisrupted operation no item other than the vehicle (100) itself, and where appropriate an object (102) arranged on the vehicle (100), is permitted to be arranged.

58. A vehicle (100) according to one of embodiments 56 or 57, characterised in that one of the zones is a warning zone (WZ) that in particular surrounds the protection zone (SZ) and/or in which no item other than the vehicle (100) itself and where appropriate an object (102) arranged on the vehicle (100) should be arranged, wherein detection of an item does not yet necessarily result in triggering the halt mode of the vehicle (100).

59. A vehicle (100) according to one of embodiments 51 to 58, characterised in that the surrounding region (192) is divided up into a plurality of zones, in particular into three zones, in the vertical direction.

60. A vehicle (100) according to embodiment 59, characterised in that one of the zones is a vehicle zone (FZ) within which the vehicle (100) is arranged.

61. A vehicle (100) according to one of embodiments 59 or 60, characterised in that one of the zones is an object zone (GZ) within which an object (102) is arranged when it is received by means of the vehicle (100).

62. A vehicle (100) according to one of embodiments 59 to 61, characterised in that there is arranged between a zone that takes the form of a vehicle zone (FZ) and a zone that takes the form of an object zone (GZ) an intermediate zone (ZZ), which extends in the vertical direction at least approximately for the distance by which the one or more receiving elements (170) project out of the base body (104) of the vehicle (100).

63. A vehicle (100) according to one of embodiments 51 to 62, characterised in that a control device (204) of the vehicle (100) and/or a higher-level control installation are configured to check, in particular to calculate, whether an item detected by the one or more sensor devices (190) is an unexpected and/or unknown and/or disruptive item or an item of which the presence is acceptable.

64. A vehicle (100) according to one of embodiments 51 to 63, characterised in that, depending on a current condition of the vehicle (100), a control device (204) of the vehicle (100) varies boundary lines between different zones of the surrounding region (192).

65. A vehicle (100) according to embodiment 64, characterised in that, for the current condition of the vehicle (100), individual or a plurality of the following condition features are taken into account:
a) whether the vehicle (100) is loaded with an object (102) or has no load; and/or
b) the speed and direction in which the vehicle (100) is moving; and/or
c) the location at which the vehicle (100) is arranged in a conveying device (222) and/or treatment installation (224).

66. A vehicle (100) according to one of embodiments 64 or 65, characterised in that the control device (204) and/or a higher-level control installation are configured to adjust courses of the boundary lines and/or a dimension and/or a shape of the zones—in particular the warning zone (WZ) and/or the protection zone (SZ)—in relation to the respectively current condition of the vehicle (100) periodically, for example a plurality of times a minute or second.

67. A vehicle (100) according to one of embodiments 51 to 66, characterised in that the surrounding region (192) is divided up into a plurality of zones in the vertical direction and into a plurality of zones in the horizontal direction, wherein
a) there is associated with a vehicle zone (FZ) a warning zone (WZ) and/or a protection zone (SZ); and/or
b) there is associated with one of the object zones (GZ) a warning zone (WZ) and/or a protection zone (SZ); and/or
c) there is associated with an intermediate zone (ZZ) a warning zone (WZ) and/or a protection zone (SZ).

68. An adapter device (208) for receiving an object (102), in particular a vehicle body (206), wherein the adapter device (208) comprises the following:
a central element (210);
one or more adapter elements (212) that are positioned on the central element (210) and, for the purpose of receiving the object (102), are geometrically adapted to the object (102),
wherein one or more engagement regions (216), in particular introduction openings (218), in which one or more receiving elements (170) engage for the purpose of receiving the adapter device (208), are arranged and/or formed in the central element (210) and/or the one or more adapter elements (212).

69. A combination comprising at least one vehicle (100) according to one of embodiments 1 to 67 and at least one adapter device (208) according to embodiment 68.

70. A combination according to embodiment 69, characterised in that a plurality of adapter elements (212) of different geometry and/or size are provided for receiving objects (102) of different geometry and/or size.

71. A conveying device (222) for conveying objects (102), in particular workpieces, for example vehicle bodies (206), wherein the conveying device (222) comprises one or more vehicles (100) according to one of embodiments 1 to 67.

72. A conveying device (222) according to embodiment 71, characterised in that the conveying device (222) comprises one or more stations (234) to which the objects (102) are transportable by means of the vehicles (100), and/or at which the objects (102) are dischargeable and/or receivable.

73. A conveying device (222) according to embodiment 72, characterised in that, in at least one of the stations (234), two or more than two locations (240, 254) are provided for two or more than two objects (102), wherein an object (102) is dischargeable by a vehicle (100) to the station (234) in a first location (240), and wherein an object (102) is receivable by a vehicle (100) in a second location (254) and then transportable away out of the station (234).

74. A conveying device (222) according to embodiment 73, characterised in that the objects (102) are conveyable by a station conveying device (244) of the conveying device (222) that is different from the vehicles (100), in particular from the first location (240) to the second location (254).

75. A conveying device (222) according to embodiment 74, characterised in that the objects (102) are processable during conveying from the first location (240) to the second location (254), or in an intermediate location (258) arranged between these.

76. A conveying device (222) according to one of embodiments 73 to 75, characterised in that at least one vehicle (100) takes a form and is arranged such that an object (102) is dischargeable at a station (234) in a first location (240), and in that then an object (102) that was previously discharged at this first location (240) and has in the meantime been conveyed to a second location (254) of this station (234) is receivable at the second location (254).

77. A conveying device (222) according to one of embodiments 72 to 76, characterised in that one or more stations (234) comprise a partitioning floor (248) below which the at least one vehicle (100) is movable, in particular while one or more objects (102) are movable above the partitioning floor (248) and/or in order to move one or more objects (102) above the partitioning floor (248).

78. A conveying device (222) according to embodiment 77, characterised in that the partitioning floor (248) is person-accessible.

79. A conveying device (222) according to one of embodiments 77 or 78, characterised in that the partitioning floor (248) is oriented substantially parallel to a vehicle-accessible subsurface (160) on which the conveying device (222) is mounted, wherein a spacing between a preferably person-accessible surface of the partitioning floor (248) and a surface of the vehicle-accessible subsurface (160) is preferably at most approximately five times, in particular at most approximately four times, preferably at most approximately twice, the height of a vehicle (100) and/or the height of a base body (104) of the vehicle (100).

80. A conveying device (222) according to one of embodiments 77 to 79, characterised in that at least one section (260) of the partitioning floor (248) takes a completely enclosed form above a conveying path (292) of a vehicle (100), and as a result objects (102) that are to be conveyed are completely spatially separated from the vehicle (100).

81. A conveying device (222) according to embodiment 80, characterised in that the completely enclosed section (260) of the partitioning floor (248) extends at least approximately over an entire longitudinal extent of a processing region (252) for processing the objects (102).

82. A conveying device (222) according to one of embodiments 77 to 81, characterised in that the partitioning floor (248) has a penetration region (262), in particular a penetration slot (264), through which one or more receiving elements (170) of the at least one vehicle (100) extend and/or are guidable.

83. A conveying device (222) according to embodiment 82, characterised in that the penetration region (262), in particular the penetration slot (264), extends along a conveying path (292) of the conveying device (222) or predetermines a conveying path (292) of the conveying device (222).

84. A conveying device (222) according to embodiment 83, characterised in that there is formed on one or both sides of the penetration region (262), in particular the penetration slot (264), a penetration edge region (276) that takes an elevated form, in particular by comparison with the rest of the partitioning floor (248).

85. A conveying device (222) according to embodiment 84, characterised in that an average free or clearable spacing between two penetration edge regions (276) that are opposite one another in relation to the penetration region (262) is at most approximately four times, preferably at most approximately three times, in particular at most approximately twice, an average thickness, horizontally and perpendicularly to the conveying path (292), of at least one receiving element (170) of the at least one vehicle (100).

86. A conveying device (222) according to one of embodiments 84 or 85, characterised in that an average free or clearable spacing between two penetration edge regions (276) that are opposite one another in relation to the penetration region (262) is at most approximately 150%, preferably at most approximately 100%, in particular at most approximately 80%, of an average extent, horizontally and perpendicularly to the conveying path (292), of a central element (210) of an adapter device (208) for receiving at least one object (102).

87. A conveying device (222) according to one of embodiments 84 to 86, characterised in that the penetration edge region (276) is substantially L-shaped in a cross section taken perpendicularly to the conveying path (292).

88. A conveying device (222) according to one of embodiments 84 to 87, characterised in that the penetration edge region (276) extends obliquely in relation to the direction of gravity (g) and/or obliquely in relation to a horizontal direction.

89. A conveying device (222) according to one of embodiments 82 to 88, characterised in that the conveying device (222), in particular the partitioning floor (248), for example the penetration edge region (276), comprises one or more closing elements (284) by means of which the penetration region (262), in particular the penetration slot (264), is closable, in particular automatically and/or in particular if no receiving element (170) projects through the penetration region (262), and/or in particular in the sections of the penetration region (262), in particular the penetration slot (264), where no receiving element (170) is currently projecting through the penetration region (262).

90. A conveying device (222) according to embodiment 89, characterised in that one or more closing elements (284) are actuable by means of the receiving element (170), in particular are configured to be brought into an open position and/or a closed position.

91. A conveying device (222) according to one of embodiments 77 to 90, characterised in that the conveying device (222) comprises a station conveying device (244) by means of which the objects (102) are conveyable independently of the vehicles (100), wherein the station conveying device (244) is preferably integrated in a partitioning floor (248) of the station (234).

92. A conveying device (222) according to embodiment 91, characterised in that the station conveying device (244) is a roller track (245) or a chain conveyor, or comprises a roller track (245) and/or a chain conveyor.

93. A conveying device (222) according to one of embodiments 71 to 92, characterised in that the conveying device (222) comprises a stacking device (225) for stacking and/or unstacking a plurality of vehicles (100).

94. A conveying device (222) according to one of embodiments 71 to 93, characterised in that the conveying device (222) comprises one or more charging regions (158) for charging an energy store (150) of the at least one vehicle (100).

95. A conveying device (222) according to embodiment 94, characterised in that one or more charging regions (158) are arranged at one or more stations (234) of the conveying device (222) to which the objects (102) are transportable by means of the at least one vehicle (100), and/or at which the objects (102) are dischargeable and/or receivable.
96. A conveying device (222) according to one of embodiments 94 or 95, characterised in that one or more charging regions (158) are arranged, in relation to a conveying path (292) of at least one vehicle (100), between two stations (234) of the conveying device (222) to which the objects (102) are transportable by means of the at least one vehicle (100), and/or at which the objects (102) are dischargeable and/or receivable.
97. A conveying device (222) according to one of embodiments 94 to 96, characterised in that one or more charging regions (158) are arranged in or on a return conveying path (294) of at least one vehicle (100).
98. A conveying device (222) according to one of embodiments 94 to 97, characterised in that one or more charging regions (158) are arranged in or on a path section that permanently or temporarily, in particular alternately, forms a section of a conveying path (292) of one or more vehicles (100) and a section of a return conveying path (294) of this or these vehicles (100) or one or more other vehicles (100).
99. A conveying device (222) according to one of embodiments 94 to 98, characterised in that one or more charging regions (158) are arranged in or at a crossing region at which one or more conveying paths (292) and/or one or more return conveying paths (294) of one or more vehicles (100) cross.
100. A conveying device (222) according to one of embodiments 94 to 99, characterised in that one or more charging regions (158) are stationary charging regions (298) at which the at least one vehicle (100) is stationary for the purpose of charging the energy store (150) and/or during charging of the energy store (150).
101. A conveying device (222) according to one of embodiments 94 to 100, characterised in that one or more charging regions (158) are mobile charging regions (300) past which the at least one vehicle (100) is movable during charging of the energy store (150), and/or through which the at least one vehicle (100) is movable during charging of the energy store (150).
102. A conveying device (222) according to one of embodiments 94 to 101, characterised in that one or more charging regions (158) are arranged and/or formed at or in a penetration region (262) of a partitioning floor (248) of the conveying device (222).
103. A conveying device (222) according to one of embodiments 94 to 102, characterised in that one or more charging regions (158) are arranged and/or formed on an underside of a partitioning floor (248) of a station (234) of the conveying device (222).
104. A conveying device (222) according to one of embodiments 94 to 103, characterised in that one or more charging regions (158) are arranged on a vehicle-accessible subsurface (160) on which the at least one vehicle (100) is configured to move, wherein the one or more charging regions (158) are arranged and/or formed in particular directly below a partitioning floor (248) of a station (234) of the conveying device (222).
105. A conveying device (222) according to one of embodiments 94 to 104, characterised in that one or more charging regions (158) take the form of a charging bay (302) into which one or more vehicles (100) are configured to be brought for the purpose of charging the respective energy store (150), in particular in a deviation from a conveying path (292) and/or a return conveying path (294) of the vehicle (100).
106. A conveying device (222) according to embodiment 105, characterised in that one or more charging bays (302) are holding regions (304) for temporarily housing one or more vehicles (100), and/or maintenance regions (306) for carrying out maintenance work on one or more vehicles (100).
107. A conveying device (222) according to one of embodiments 94 to 106, characterised in that one or more charging regions (158) are arranged at a discharge location (242) of a station (234) and/or a receiving location (256) of a station (234) such that an energy store (150) of the vehicle (100) is chargeable in particular during a positioning procedure for positioning a vehicle (100) in relation to the station (234).
108. A conveying device (222) according to one of embodiments 94 to 107, characterised in that the conveying device (222) extends on a plurality of levels (288) and comprises one or more charging regions (158) that are arranged in a handover device (290) for handing over one or more vehicles (100) from one level (288) to another level (288).
109. A conveying device (222) according to one of embodiments 94 to 108, characterised in that the conveying device (222) comprises one or more charging nodes (308) that each comprise a plurality of charging regions (158) for charging a plurality of vehicles (100) at the same time.
110. A conveying device (222) according to embodiment 109, characterised in that one or more charging nodes (308) are arranged at points at which a plurality of conveying paths (292) and/or return conveying paths (294) cross and/or overlap.
111. A conveying device (222) according to one of embodiments 71 to 110, characterised in that, for the purpose of charging the energy store (150), at least one charging region (158) comprises one or more charge connection points (164), which each have a plurality of contact regions (278) and/or contact elements (280) for providing voltages of different voltage values.
112. A conveying device (222) according to embodiment 111, characterised in that there are provided at one or more charge connection points (164) in each case two or more than two pairs of contact regions (278) and/or contact elements (280) that serve to provide different charge voltages, in particular at the same time.
113. A conveying device (222) according to one of embodiments 71 to 112, characterised in that one or more charge connection points (164), in particular all of the charge connection points (164), respectively comprise one or more sensor devices (190) that are configured to determine in particular the presence of a vehicle (100) at, in particular above, the respective charge connection point (164).
114. A conveying device (222) according to embodiment 113, characterised in that the charge connection point (164) is controllable such that only if a vehicle (100) is identified by means of the one or more sensor devices (190) is a current and/or voltage applied, in particular activated, at the respective charge connection point (164) for charging an energy store (150) of the vehicle (100).
115. A conveying device (222) according to one of embodiments 71 to 114, characterised in that the conveying device (222) comprises one or more safety regions (270) and one or more express regions (268), wherein the one or more vehicles (100) are configured to be put in the safety mode by means of a control device (204) in the one or more safety regions (270), and
wherein the one or more vehicles (100) are configured to be put in the express mode by means of the control device (204) in the one or more express regions (268).

116. A conveying device (222) according to embodiment 115, characterised in that one or more express regions (268) comprise one or more return conveying paths (294) or return conveying path sections in which the one or more vehicles (100) in particular have no load.

117. A conveying device (222) according to one of embodiments 115 or 116, characterised in that one or more express regions (268) and/or one or more safety regions (270) are connected to one another by means of one or more passageways (312), wherein the one or more passageways (312) preferably have, at least in certain regions, a shape that is at least approximately and/or at least in certain regions complementary with a shape of one or more vehicles (100).

118. A conveying device (222) according to embodiment 117, characterised in that
a) one or more passageways (312) are arranged in or on one or more stations (234) of the conveying device (222), and/or
b) one or more passageways (312) are formed by one or more stations (234) of the conveying device (222).

119. A conveying device (222) according to one of embodiments 115 to 118, characterised in that one or more express regions (268) are formed by a double floor that is person-accessible and/or vehicle-accessible.

120. A conveying device (222) according to one of embodiments 71 to 119, characterised in that the conveying device (222) comprises a plurality of types of station (234), wherein of at least two types of station (234) a plurality of respective stations (234) are provided.

121. A conveying device (222) according to embodiment 120, characterised in that the objects (102) that are to be conveyed are conveyable by one or more vehicles (100) in a predetermined order to and/or through a respective one of the stations (234) of different types, wherein by means of a control device (204) a single station (234) of a respective type of station (234) is selectable, in particular
a) depending on a current occupancy of the individual stations (234) of a respective type of station (234), and/or
b) depending on the equipment of the individual stations (234) of a respective type of station (234), and/or
c) depending on a configuration of the individual stations (234) of a respective type of station (234), and/or
d) depending on a current maintenance condition or degree of contamination of the individual stations (234) of a respective type of station (234).

122. A conveying device (222) according to one of embodiments 71 to 121, characterised in that the conveying device (222) comprises a transfer region (400) at which one or more objects (102) are transferable from a vehicle (100) to a station conveying device (244) or another type of receiving device, wherein at least one entry region (402) through which the vehicle (100) can access a transfer location (404) of the transfer device (400) is spatially separated from at least one exit region (410) through which the vehicle (100) is configured to move away from the transfer location (404).

123. A conveying device (222) according to one of embodiments 71 to 122, characterised in that the conveying device (222) comprises a transfer region (400) at which one or more objects (102) are transferable from a vehicle (100) to a station conveying device (244) or another type of receiving device, wherein a direction of entry (412) along which the vehicle (100) is configured to enter the transfer region (400) is transverse, in particular at least approximately perpendicular, to an exit direction (414) along which the vehicle (100) is configured to exit from the transfer region (400).

124. A conveying device (222) for conveying objects (102), in particular workpieces, for example vehicle bodies (206), wherein the conveying device (222) in particular takes a form according to one of embodiments 71 to 123 and/or comprises a partitioning floor (248) that has a penetration region (262), in particular a penetration slot (264), through which one or more receiving elements (170) extend and/or are guidable for the purpose of receiving at least one object (102).

125. A conveying device (222) according to embodiment 124, characterised in that the partitioning floor (248) comprises one or more closing elements (284) by means of which the penetration region (262), in particular the penetration slot (264), is closable.

126. A conveying device (222) according to embodiment 125, characterised in that the penetration region (262), in particular the penetration slot (264), is closable by means of the one or more closing elements (284) automatically and/or temporarily and/or locally and/or in particular if no receiving element (170) projects through the penetration region (262), and/or in particular in the sections of the penetration region (262), in particular the penetration slot (264), where no receiving element (170) is currently projecting through the penetration region (262).

127. A conveying device (222) according to one of embodiments 124 to 126, characterised in that one or more closing elements (284) are actuable by means of the receiving element (170), in particular are configured to be brought into an open position and/or a closed position.

128. A conveying device (222) according to one of embodiments 124 to 127, characterised in that one or more closing elements (284) are configured to be automatically moved from an open position into a closed position, resiliently and/or under the action of gravity.

129. A conveying device (222) according to one of embodiments 124 to 128, characterised in that one or more closing elements (284) take the form of slats (508) and/or flaps and/or closure panels (510).

130. A conveying device (222) according to one of embodiments 124 to 129, characterised in that one or more closing elements (248) are deflectable in particular in a horizontal direction in order to temporarily clear the penetration region (262) for the purpose of guiding one or more receiving elements (170) through.

131. A conveying device (222) according to one of embodiments 124 to 130, characterised in that the partitioning floor (248) comprises a plurality of closing elements (284) that are arranged to overlap one another in a closed position and/or in an open position thereof.

132. A conveying device (222) according to one of embodiments 124 to 131, characterised in that the partitioning floor (248) comprises a plurality of closing elements (284) that are arranged and/or movable on mutually different levels, in particular mutually parallel levels, preferably horizontal levels.

133. A conveying device (222) according to one of embodiments 124 to 132, characterised in that one or more closing elements (284) are person-accessible.

134. A conveying device (222) according to one of embodiments 124 to 133, characterised in that one or more closing elements (284) are supported against one another and/or against one or more load-bearing panels (504) of the partitioning floor (248), in particular in a closed position and/or in an open position thereof.

135. A conveying device (222) according to one of embodiments 124 to 134, characterised in that one or more closing elements (284) are movable, in particular linearly displaceable, in a direction that runs obliquely, in particular perpendicularly, to a conveying direction (250).

136. A conveying device (222) according to one of embodiments 124 to 135, characterised in that one or more closing elements (284) are arranged to be rotatable, in particular freely rotatable and/or rotatable about 360°, on a closing element receiving means (524) of the partitioning floor (248).

137. A conveying device (222) according to one of embodiments 124 to 136, characterised in that the penetration region (262), in particular the penetration slot (264), extends along a conveying path (292) of the conveying device (222) and/or predetermines a conveying path (292) of the conveying device (222).

138. A conveying device (222) according to one of embodiments 124 to 137, characterised in that the partitioning floor (248) is accessible to persons.

139. A conveying device (222) according to one of embodiments 124 to 138, characterised in that the conveying device (222) comprises one or more vehicles (100), wherein each vehicle (100) comprises the following:
a base body (104);
a chassis (106), by means of which the base body (104) lies and/or is movable on a vehicle-accessible subsurface (160);
a drive device (110) for driving the vehicle (100);
a receiving device (168), which comprises one receiving element (170), two receiving elements (170) or more than two receiving elements (170), for receiving at least one object (102),
wherein the conveying device (222) comprises one or more stations (234) to which the objects (102) are transportable by means of the vehicles (100), and/or at which the objects (102) are dischargeable and/or receivable.

140. A processing installation (224) for processing objects (102), in particular vehicle bodies (206), wherein the processing installation (224) comprises one or more conveying devices (222) according to one of embodiments 71 to 139.

141. A processing installation (224) according to embodiment 140, characterised in that one or more stations (234) of the conveying device (222), which are connected to one another for the purpose of conveying objects (102) by means of vehicles (100) of the conveying device (222), are processing stations (236) of the processing installation (224).

142. A method for conveying objects (102), wherein the objects (102) are conveyed by means of one or more vehicles (100) according to one of embodiments 1 to 67 and/or by means of a conveying device (222) according to one of embodiments 71 to 139.

143. A method for processing objects (102), wherein the objects (102) are processed in and/or by means of a processing installation (224) according to one of embodiments 140 or 141.

The invention claimed is:

1. A conveying device for conveying objects including vehicle bodies, wherein the conveying device comprises: a partitioning floor that has a penetration region, or a penetration slot, through which one or more receiving elements extend and/or are guidable for the purpose of receiving at least one object, wherein the partitioning floor includes one or more closing elements by which the penetration region, or the penetration slot, is closable, and wherein a plurality of closing elements are arranged and movable on mutually different, mutually parallel or horizontal levels, wherein the partitioning floor includes a restoring device by which the closing elements are movable, after actuation thereof, from an open position into a closed position.

2. A conveying device according to claim 1, wherein the penetration region, or the penetration slot, is closable by the one or more closing elements automatically, temporarily, locally, if no receiving element projects through the penetration region, and/or in sections of the penetration region, or the penetration slot, where no receiving element is currently projecting through the penetration region.

3. A conveying device according to claim 1, wherein one or more closing elements are actuatable by the receiving element, or are configured to be brought into the open position and/or the closed position.

4. A conveying device according to claim 1, wherein one or more closing elements are configured to be automatically moved from the open position into the closed position, resiliently and/or under the influence of gravity.

5. A conveying device according to claim 1, wherein one or more closing elements include slats, flaps and/or closure panels.

6. A conveying device according to claim 1, wherein one or more closing elements are deflectable or deflectable in a horizontal direction to temporarily clear the penetration region for guiding one or more receiving elements through.

7. A conveying device according to claim 1, wherein the partitioning floor includes a plurality of closing elements that are arranged to overlap one another in the closed position and/or in the open position thereof.

8. A conveying device according to claim 1, wherein one or more closing elements
a) are person-accessible;
b) are supported against one another and/or against one or more load-bearing panels of the partitioning floor, are supported against one another and/or against one or more load-bearing panels of the partitioning floor in a closed position and/or in an open position thereof;
c) are movable, or linearly displaceable, in a direction that runs obliquely, or perpendicularly, to a conveying direction; and/or
d) are arranged to be rotatable, or freely rotatable and/or rotatable about 360°, on a closing element receiver of the partitioning floor.

9. A conveying device according to claim 1, wherein the penetration region, or the penetration slot, extends along a conveying path of the conveying device or predetermines a conveying path of the conveying device.

10. A conveying device according to claim 1, wherein the partitioning floor is accessible to persons.

11. A conveying device according to claim 1, wherein the conveying device includes one or more vehicles, wherein each vehicle includes the following:
- a base body;
- a chassis, by which the base body lies and/or is movable on a vehicle-accessible subsurface;
- a drive device for driving the vehicle; and
- a receiving device, which includes one receiving element, two receiving elements or more than two receiving elements, for receiving at least one object,
- wherein the conveying device includes one or more stations to which the objects are transportable by the vehicles, and/or at which the objects are dischargeable and/or receivable.

12. A conveying device according to claim 11, wherein one or more stations include a partitioning floor below which the one or more vehicles is movable, or below which the one or more vehicles is movable while one or more objects are movable above the partitioning floor and/or to move one or more objects above the partitioning floor.

13. A processing installation for processing objects including vehicle bodies, wherein the processing installation includes one or more conveying devices according to claim 1.

14. A method for conveying and/or processing objects, wherein the objects are conveyed by a conveying device according to claim 1.

15. A method for conveying and/or processing objects, wherein the objects are processed in and/or by a processing installation according to claim 13.

* * * * *